(12) United States Patent
Yasui et al.

(10) Patent No.: US 7,379,809 B2
(45) Date of Patent: May 27, 2008

(54) CONTROL SYSTEM

(75) Inventors: Yuji Yasui, Saitama-ken (JP); Hiroshi Tagami, Saitama-ken (JP); Mitsunobu Saito, Saitama-ken (JP); Kosuke Higashitani, Saitama-ken (JP); Masahiro Sato, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 38 days.

(21) Appl. No.: 10/593,443

(22) PCT Filed: Mar. 29, 2005

(86) PCT No.: PCT/JP2005/005828

§ 371 (c)(1),
(2), (4) Date: Nov. 7, 2006

(87) PCT Pub. No.: WO2005/098554

PCT Pub. Date: Oct. 20, 2005

(65) Prior Publication Data

US 2007/0198163 A1    Aug. 23, 2007

(30) Foreign Application Priority Data

Apr. 7, 2004    (JP)    ............................ 2004-113490

(51) Int. Cl.
*B60T 7/12*    (2006.01)
*F02D 13/00*    (2006.01)

(52) U.S. Cl. .................. 701/103; 123/345; 123/90.15; 73/118.2

(58) Field of Classification Search ........ 701/101–105, 701/108, 110, 114.115; 123/321, 322, 345–348, 123/568.11, 568.21, 90.1, 90.15; 73/116, 73/118.2

See application file for complete search history.

(56) References Cited

U.S. PATENT DOCUMENTS

| | | | | |
|---|---|---|---|---|
| 6,327,850 | B1 * | 12/2001 | Yasui et al. | .................... 60/285 |
| 6,370,473 | B1 * | 4/2002 | Yasui et al. | .................. 701/109 |
| 7,188,020 | B2 * | 3/2007 | Yasui et al. | .................. 701/103 |
| 2007/0131186 | A1 * | 6/2007 | Yasui et al. | ............... 123/90.16 |

\* cited by examiner

*Primary Examiner*—John T. Kwon
(74) *Attorney, Agent, or Firm*—Arent Fox, LLP.

(57) ABSTRACT

A control system which is capable of enhancing both the stability and the accuracy of control when the output of a controlled object is feedback-controlled by a plurality of control inputs. An ECU 2 of a control system 1 controls engine speed NE during idling by an ignition control input Usl_ig and an intake control input Usl_ar. The ECU 2 calculates a target engine speed NE_cmd according to an engine coolant temperature TW and the like (step 3), and determines the ignition control input Usl_ig and the intake control input Usl_ar with a plurality of predetermined target value filter-type two-degree-of-freedom sliding mode control algorithms [equations (1) to (12)] sharing one switching function one therebetween, such that the engine speed NE converges to the target engine speed NE_cmd (steps 4 to 7 and 9).

16 Claims, 31 Drawing Sheets

F I G. 7
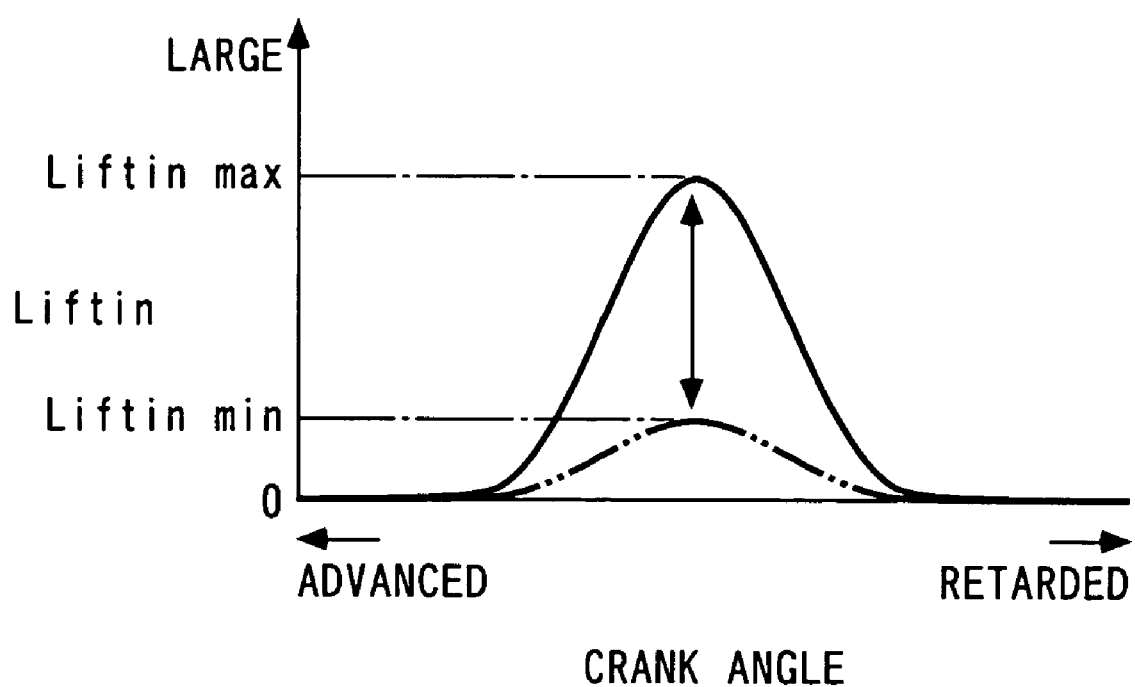

FIG. 11

$$NE\_cmd\_f(k) = -POLE\_f \cdot NE\_cmd\_f(k-1) + (1+POLE\_f) \cdot NE\_cmd(k)$$
$$\cdots\cdots (1)$$

$$\sigma ne(k) = Ene(k) + POLE \cdot Ene(k-1) \quad\cdots\cdots (2)$$

$$Ene(k) = NE(k) - NE\_cmd\_f(k-1) \quad\cdots\cdots (3)$$

$$Ueq\_ig(k) = \frac{1}{b1}\{(1-a1-POLE) \cdot NE(k) + (POLE-a2) \cdot NE(k-1)$$
$$-b2 \cdot Usl\_ig(k-1) + NE\_cmd\_f(k)$$
$$+(POLE-1) \cdot NE\_cmd\_f(k-1) - POLE \cdot NE\_cmd\_f(k-2)\} \cdots\cdots (4)$$

$$Urch\_ig(k) = \frac{-Krch\_ig}{b1} \cdot \sigma ne(k) \quad\cdots\cdots (5)$$

$$sum\_\sigma ne(k) = FGT \cdot sum\_\sigma ne(k-1) + \sigma ne(k) \quad\cdots\cdots (6)$$

$$Uadp\_ig(k) = \frac{-Kadp\_ig}{b1} \cdot sum\_\sigma ne(k) \quad\cdots\cdots (7)$$

$$Usl\_ig(k) = Ueq\_ig(k) + Urch\_ig(k) + Uadp\_ig(k) \quad\cdots\cdots (8)$$

F I G. 1 2

$$Ueq\_ar(k) = \frac{1}{b1'} \{(1-a1'-POLE) \cdot NE(k) + (POLE-a2') \cdot NE(k-1)$$
$$-b2' \cdot Usl\_ar(k-1) + NE\_cmd\_f(k)$$
$$+(POLE-1) \cdot NE\_cmd\_f(k-1) - POLE \cdot NE\_cmd\_f(k-2)\} \quad \cdots \cdots (9)$$

$$Urch\_ar(k) = \frac{-Krch\_ar}{b1'} \cdot \sigma ne(k) \quad \cdots \cdots (10)$$

$$Uadp\_ar(k) = \frac{-Kadp\_ar}{b1'} \cdot \sum_{i=0}^{k} \cdot \sigma ne(i) \quad \cdots \cdots (11)$$

$$Usl\_ar(k) = Ueq\_ar(k) + Urch\_ar(k) + Uadp\_ar(k) \quad \cdots \cdots (12)$$

$$NE(k+1) = a1 \cdot NE(k) + a2 \cdot NE(k-1) + b1 \cdot Usl\_ig(k) + b2 \cdot Usl\_ig(k-1)$$
$$\cdots \cdots (13)$$

$$NE(k+1) = a1' \cdot NE(k) + a2' \cdot NE(k-1) + b1' \cdot Usl\_ar(k) + b2' \cdot Usl\_ar(k-1)$$
$$\cdots \cdots (14)$$

F I G. 17A
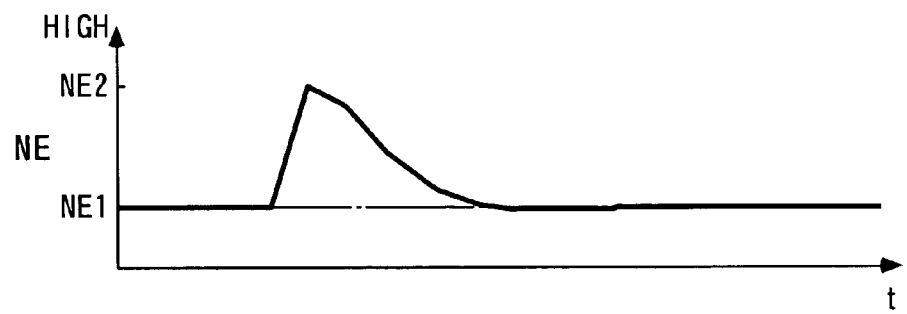
F I G. 17B
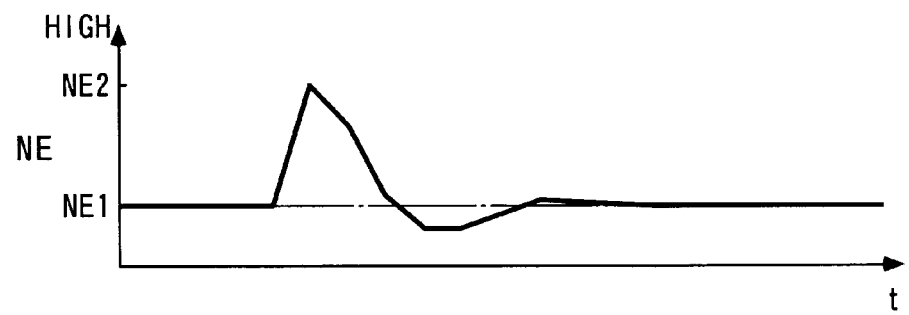
F I G. 17C
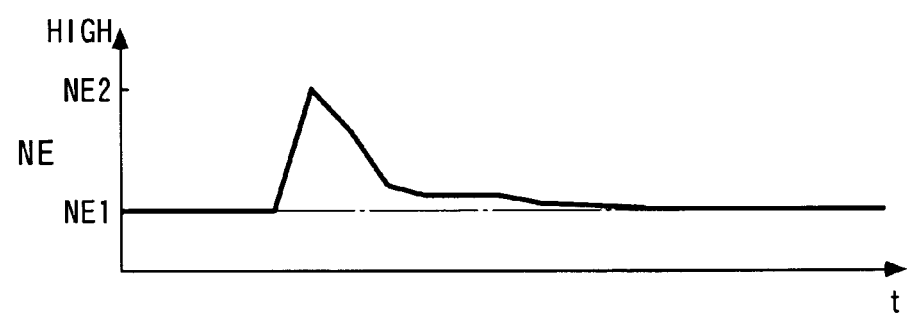
F I G. 17D
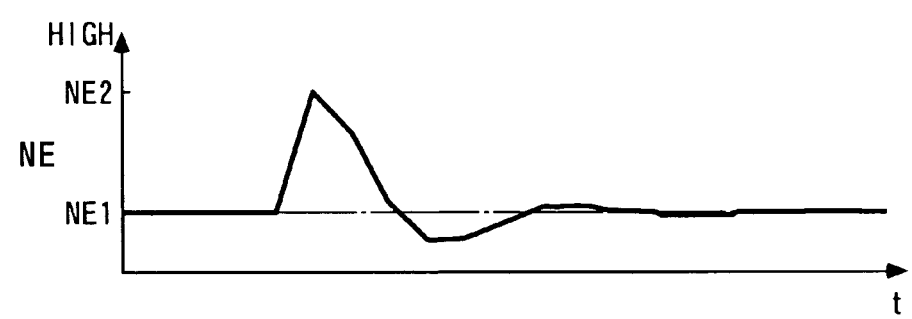

F I G. 2 3

$$\text{Liftin\_cmd\_f}(k) = -\text{POLE\_f''} \cdot \text{Liftin\_cmd\_f}(k-1)$$
$$+ (1 + \text{POLE\_f''}) \cdot \text{Liftin\_cmd}(k) \quad \cdots\cdot (15)$$

$$\sigma li(k) = Eli(k) + \text{POLE''} \cdot Eli(k-1) \quad \cdots\cdot (16)$$

$$Eli(k) = \text{Liftin}(k) - \text{Liftin\_cmd\_f}(k-1) \quad \cdots\cdot (17)$$

$$Ueq\_li(k) = \frac{1}{b1''} \{(1 - a1'' - \text{POLE''}) \cdot \text{Liftin}(k) + (\text{POLE''} - a2'') \cdot \text{Liftin}(k-1)$$
$$- b2'' \cdot \text{Uliftin}(k-1) + \text{Liftin\_cmd\_f}(k)$$
$$+ (\text{POLE''} - 1) \cdot \text{Liftin\_cmd\_f}(k-1) - \text{POLE''} \cdot \text{Liftin\_cmd\_f}(k-2)\}$$
$$\cdots\cdot (18)$$

$$Urch\_li(k) = \frac{-Krch\_li}{b1''} \cdot \sigma li(k) \quad \cdots\cdot (19)$$

$$Uadp\_li(k) = \frac{-Kadp\_li}{b1''} \cdot \sum_{i=0}^{k} \cdot \sigma li(i) \quad \cdots\cdot (20)$$

$$\text{Uliftin}(k) = Ueq\_li(k) + Urch\_li(k) + Uadp\_li(k) \quad \cdots\cdot (21)$$

F I G. 2 4
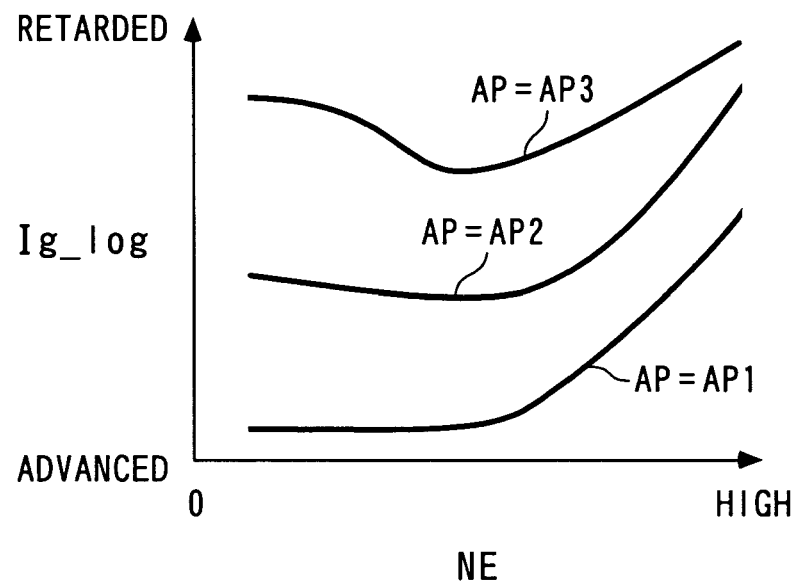
F I G. 2 5
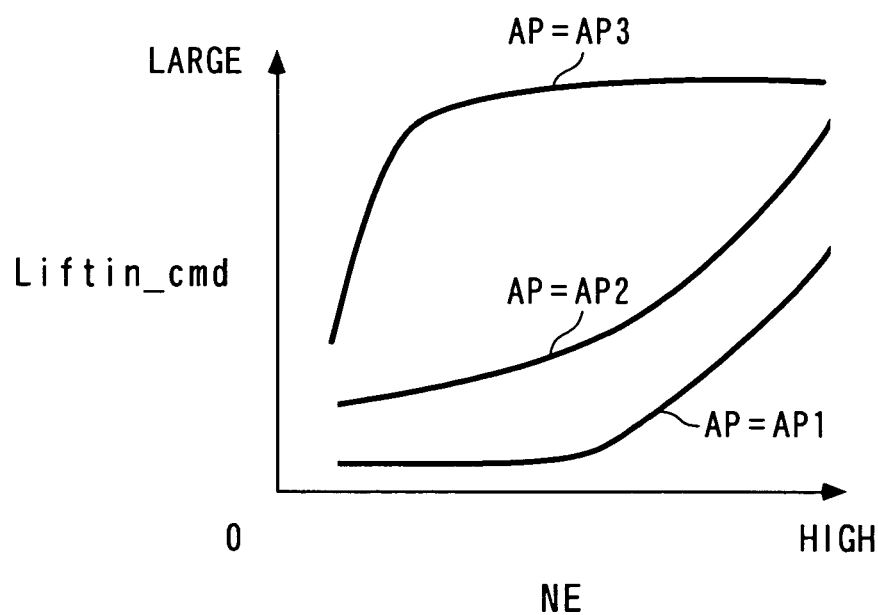

F I G. 2 7

$$NE\_cmd\_f(k) = -POLE\_f \cdot NE\_cmd\_f(k-1) + (1+POLE\_f) \cdot NE\_cmd(k)$$
$$\cdots (22)$$

$$\sigma ne(k) = Ene(k) + POLE \cdot Ene(k-1) \quad \cdots (23)$$

$$Ene(k) = NE(k) - NE\_cmd\_f(k-1) \quad \cdots (24)$$

$$Ueq\_ig(k) = \frac{1}{b1}\{(1-a1-POLE) \cdot NE(k) + (POLE-a2) \cdot NE(k-1) - b2 \cdot Usl\_ig(k-1)$$
$$+ NE\_cmd\_f(k) + (POLE-1) \cdot NE\_cmd\_f(k-1) - POLE \cdot NE\_cmd\_f(k-2)$$
$$- c1\_ig(k)\} \quad \cdots (25)$$

$$Urch\_ig(k) = \frac{-Krch\_ig}{b1} \cdot \sigma ne(k) \quad \cdots (26)$$

$$Usl\_ig(k) = Ueq\_ig(k) + Urch\_ig(k) \quad \cdots (27)$$

$$NE\_hat(k) = a1 \cdot NE(k-1) + a2 \cdot NE(k-2) + b1 \cdot Usl\_ig(k-1) + b2 \cdot Usl\_ig(k-2)$$
$$+ c1\_ig(k-1) \quad \cdots (28)$$

$$e\_dov\_ig(k) = NE(k) - NE\_hat(k) \quad \cdots (29)$$

$$c1\_ig(k) = FGT\_dov \cdot c1\_ig(k-1) + \frac{P\_ig}{1+P\_ig} \cdot e\_dov\_ig(k) \quad \cdots (30)$$

FIG. 28

$$Ueq\_ar(k) = \frac{1}{b1'} \{(1-a1'-POLE) \cdot NE(k) + (POLE-a2') \cdot NE(k-1) - b2' \cdot Usl\_ig(k-1)$$
$$+ NE\_cmd\_f(k) + (POLE-1) \cdot NE\_cmd\_f(k-1) - POLE \cdot NE\_cmd\_f(k-2)$$
$$- c1\_ar(k)\} \quad \cdots (31)$$

$$Urch\_ar(k) = \frac{-Krch\_ar}{b1'} \cdot \sigma ne(k) \quad \cdots (32)$$

$$Usl\_ar(k) = Ueq\_ar(k) + Urch\_ar(k) + Uadp\_ar(k) \quad \cdots (33)$$

$$NE\_hat(k) = a1' \cdot NE(k-1) + a2' \cdot NE(k-2) + b1' \cdot Usl\_ar(k-1) + b2' \cdot Usl\_ar(k-2)$$
$$+ c1\_ar(k-1) \quad \cdots (34)$$

$$e\_dov\_ar(k) = NE(k) - NE\_hat(k) \quad \cdots (35)$$

$$c1\_ar(k) = c1\_ar(k-1) + \frac{P\_ar}{1+P\_ar} \cdot e\_dov\_ar(k) \quad \cdots (36)$$

$$NE(k+1) = a1 \cdot NE(k) + a2 \cdot NE(k-1) + b1 \cdot Usl\_ig(k) + b2 \cdot Usl\_ig(k-1) + c1\_ig$$
$$\cdots (37)$$

$$NE(k+1) = a1' \cdot NE(k) + a2' \cdot NE(k-1) + b1' \cdot Usl\_ar(k) + b2' \cdot Usl\_ar(k-1) + c1\_ar$$
$$\cdots (38)$$

FIG. 37

$$Gcyl\_cmd\_f(k) = -POLE\_f^* \cdot Gcyl\_cmd\_f(k-1) + (1+POLE\_f^*) \cdot Gcyl\_cmd(k)$$

$$\cdots\cdots(39)$$

$$\sigma gcyl(k) = Egcyl(k) + POLE^* \cdot Egcyl(k-1) \qquad \cdots\cdots(40)$$

$$Egcyl(k) = Gcyl(k) - Gcyl\_cmd\_f(k-1) \qquad \cdots\cdots(41)$$

$$Ueq\_eg(k) = \frac{1}{b1^*}\{(1-a1^*-POLE^*) \cdot Gcyl(k) + (POLE^*-a2^*) \cdot Gcyl(k-1)$$

$$-b2^* \cdot Usl\_eg(k-1) + Gcyl\_cmd\_f(k)$$

$$+(POLE^*-1) \cdot Gcyl\_cmd\_f(k-1) - POLE^* \cdot Gcyl\_cmd\_f(k-2)\}$$

$$\cdots\cdots(42)$$

$$Urch\_eg(k) = \frac{-Krch\_eg}{b1^*} \cdot \sigma gcyl(k) \qquad \cdots\cdots(43)$$

$$sum\_\sigma gcyl(k) = FGT\_eg \cdot sum\_\sigma gcyl(k-1) + \sigma gcyl(k) \qquad \cdots\cdots(44)$$

$$Uadp\_eg(k) = \frac{-Kadp\_eg}{b1^*} \cdot sum\_\sigma gcyl(k) \qquad \cdots\cdots(45)$$

$$Usl\_eg(k) = Ueq\_eg(k) + Urch\_eg(k) + Uadp\_eg(k) \qquad \cdots\cdots(46)$$

$$Usl\_eg\_f(k) = Usl\_eg(k) + Usl\_eg\_bs(k) \qquad \cdots\cdots(47)$$

F I G. 3 8

$$Ueq\_vt(k) = \frac{1}{b1^{\#}} \{(1-a1^{\#}-POLE^{*}) \cdot Gcyl(k) + (POLE^{*}-a2^{\#}) \cdot Gcyl(k-1)$$
$$-b2^{\#} \cdot Usl\_vt(k-1) + Gcyl\_cmd\_f(k)$$
$$+(POLE^{*}-1) \cdot Gcyl\_cmd\_f(k-1) - POLE^{*} \cdot Gcyl\_cmd\_f(k-2)\}$$

$$\cdots (48)$$

$$Urch\_vt(k) = \frac{-Krch\_vt}{b1^{\#}} \cdot \sigma gcyl(k) \quad \cdots (49)$$

$$Uadp\_vt(k) = \frac{-Kadp\_vt}{b1^{\#}} \cdot \sum_{i=0}^{k} \cdot \sigma gcyl(i) \quad \cdots (50)$$

$$Usl\_vt(k) = Ueq\_vt(k) + Urch\_vt(k) + Uadp\_vt(k) \quad \cdots (51)$$

$$Usl\_vt\_f(k) = Usl\_vt(k) + Usl\_vt\_bs(k) \quad \cdots (52)$$

$$Gcyl(k+1) = a1^{*} \cdot Gcyl(k) + a2^{*} \cdot Gcyl(k-1) + b1^{*} \cdot Usl\_eg(k) + b2^{*} \cdot Usl\_eg(k-1)$$
$$\cdots (53)$$

$$Gcyl(k+1) = a1^{\#} \cdot Gcyl(k) + a2^{\#} \cdot Gcyl(k-1) + b1^{\#} \cdot Usl\_vt(k) + b2^{\#} \cdot Usl\_vt(k-1)$$
$$\cdots (54)$$

CONTROL SYSTEM

CROSS-REFERENCE TO RELATED APPLICATION

This application is a National Stage entry of International Application No. PCT/JP2005/005828, filed Mar. 29, 2005, the entire specification claims and drawings of which are incorporated herewith by reference.

FIELD OF THE INVENTION

This invention relates to a control system that feedback-controls the output of a controlled object by a plurality of control inputs.

BACKGROUND ART

Conventionally, a control system that feedback-controls an engine speed during idling of an internal combustion engine has been proposed in Patent Literature 1. This engine includes a bypass passage that bypasses a throttle valve, an idling adjusting valve for opening and closing the bypass passage, an ignition coil, and so forth. As described hereinafter, the control system controls both the intake air amount and the ignition timing during idling of the engine such that the engine speed converges to a target engine speed.

More specifically, first, during idling, the target engine speed, a basic intake air amount, and a basic ignition timing are set according to operating conditions of the engine. Next, the difference between an actual engine speed and the target engine speed is calculated, and the feedback correction amounts of the intake air amount and the ignition timing are calculated based on the difference. Then, a control input to the idling adjusting valve is calculated as a value corresponding to the sum of the basic intake air amount and the feedback correction amount of the intake air amount, and a control input to a spark plug is calculated as a value corresponding to the sum of the basic ignition timing and the feedback correction amount of the ignition timing. Further, the idling adjusting valve and the spark plug are driven by respective drive signals corresponding to the above control inputs for control of both the intake air amount and the ignition timing, whereby the engine speed is feedback-controlled such that it converges to the target engine speed.

[Patent Literature 1] Japanese Laid-Open Patent Publication (Kokai) No. H05-222997

According to the above described conventional control system, although the engine speed is feedback-controlled through two control processes by the two control inputs, there is a fear that the two control processes interfere with each other, since the characteristics of the control processes are different from each other. More specifically, when the ignition timing is controlled, response delay and dead time of the control are short, and hence it is possible to cause the engine speed to quickly converge to the target engine speed. Further, although in the ignition timing control, excellent control accuracy can be ensured due to its high resolution of control (the rate of change in the engine speed with respect to the minimum ignition control input being small), the range of change in the ignition timing is limited from with a view to avoiding degradation of the operating conditions of the engine. For example, in cases where the target engine speed is temporarily and sharply increased e.g. by racing by a driver during idling, if the ignition timing is controlled in a manner coping with the increase in the target engine speed, the retard amount of ignition timing becomes too large, which can result in reduction of combustion efficiency. To avoid this inconvenience, the range of change in the ignition timing is limited.

On the other hand, when the intake air amount is controlled, this control process is lower in resolution of control than the ignition timing control process, and hence it is possible to cope with a large change in the target engine speed. However, the engine speed cannot be controlled by the control process as finely as by the ignition timing control process, which results in degraded control accuracy. Moreover, response delay and dead time are larger in the feedback control process of the intake air amount than in the feedback control process of the ignition timing. This results in the degraded convergence of the engine speed to the target engine speed.

As to the conventional control system, there is a fear that the two control processes interfere with each other due to the above-described differences in characteristics therebetween, causing reduction of both the stability and the accuracy of the control.

Furthermore, in the general feedback control methods, such as PI control, when a sudden change in the target engine speed as mentioned above has occurred, the engine speed control tends to cause overshooting or undershooting of the target engine speed and an oscillating behavior of the controlled engine speed, and attempts to avoid these inconveniences cause reduction of the convergence rate of the engine speed to the target engine speed. In short, it is difficult to positively maintain both the converging behavior and convergence rate of the engine speed to the target engine speed in excellent conditions, which results in further degradation of both the stability and the accuracy of the control.

The present invention has been made to provide a solution to the above-described problems, and an object thereof is to provide a control system which is capable of enhancing both the stability and the accuracy of control when the output of a controlled object is feedback-controlled by a plurality of control inputs.

DISCLOSURE OF THE INVENTION

To attain the above object, in a first aspect of the invention, there is provided a control system for controlling an output of a controlled object by a plurality of control inputs, comprising target value-calculating means for calculating a target value as a target of the output of the controlled object, according to a state of the controlled object, filtering target value-calculating means for calculating one filtering target value for setting follow-up responsiveness of the output of the controlled object to the target value, by performing a predetermined filtering process on the calculated target value, and control input-calculating means for calculating the control inputs with a plurality of predetermined feedback control algorithms, respectively, in a manner such that the output of the controlled object converges to the calculated one filtering target value.

With the configuration of this control system, a target value as a target of the output of a controlled object is calculated according to the state of the controlled object; one filtering target value for setting follow-up responsiveness of the output of the controlled object to the target value is calculated by performing a predetermined filtering process on the calculated target value; and a plurality of control inputs are calculated with a plurality of predetermined feedback control algorithms, respectively, in a manner such that the output of the controlled object converges to the calculated one filtering target value. The control inputs are thus calculated with target value filter-type two-degree-of-freedom sliding mode control algorithms, and therefore it is possible to configure the predetermined filtering process and the predetermined feedback control processes, independently of each other, whereby it is possible to set the follow-up responsiveness of the output of the controlled object to the target value, and the converging behavior of the difference between the target value and the output of the controlled object, caused by disturbance or the like, separately from each other. More specifically, by properly configuring the predetermined filtering process to be performed on the target value, it is possible to ensure excellent follow-up responsiveness of the output of the controlled object to the target value, and at the same time, by properly configuring the predetermined feedback control processes, it is possible to cause the output of the controlled object to converge to the target value without causing any overshooting or oscillating behavior, to thereby stabilize the converging behavior of the output of the controlled object to the target value. Moreover, since the control inputs are calculated by sharing one filtering target value, it is possible to avoid the feedback control processes using the respective control inputs from interfering with each other. As is apparent from the above description, the control system is capable of improving both the stability and the accuracy of the control.

Preferably, the filtering target value-calculating means calculates the one filtering target value in a manner such that the follow-up responsiveness of the output of the controlled object to the target value becomes higher as a degree of change in the target value is larger.

With the configuration of this preferred embodiment, the one filtering target value is calculated such that the follow-up responsiveness of the output of the controlled object to the target value becomes higher as the degree of change in the target value is larger. Therefore, even when the target value is largely changed due to a large change in the controlled object, it is possible to cause the output of the controlled object to accurately follow the large change in the controlled object. As a result, it is possible to further enhance the control accuracy.

Preferably, the predetermined feedback control algorithms are formed by a plurality of predetermined response-specifying control algorithms, respectively, and the control input-calculating means calculates the control inputs while sharing one linear function defining a converging behavior and a convergence rate of the output of the controlled object to the one filtering target value between the predetermined response-specifying control algorithms.

With the configuration of this preferred embodiment, the control inputs are calculated with a plurality of predetermined response-specifying control algorithms while sharing one linear function defining the converging behavior and the convergence rate of the output of the controlled object to the one filtering target value between the predetermined response-specifying control algorithms. Therefore, the output of the controlled object can be caused to converge to the one filtering target value with such a converging behavior at such a convergence rate as defined by the one linear function, which characterizes the response-specifying control algorithms. As a result, it is possible to cause the output of the controlled object to converge to the target value with such a converging behavior at such a convergence rate. This makes it possible to enhance the stability of control and the control accuracy, compared with cases where general feedback control algorithms, such as PID control algorithms, are used for feedback control algorithms of the two-degree-of-freedom sliding mode control algorithms. Moreover, since the control inputs are calculated while sharing the aforementioned linear function, the control inputs are calculated such that the converging behavior and the convergence rate of the output of the controlled object to the one filtering target value become similar between the control inputs, whereby it is possible to control the output of the controlled object while avoiding the response-specifying control processes using the control inputs from interfering with each other. As is apparent from the above description, the stability and accuracy of the control can be further improved.

To attain the above object, in a second aspect of the invention, there is provided a control system for controlling an output of a controlled object by a plurality of control inputs, comprising target value-calculating means for calculating a target value as a target of the output of the controlled object, according to a state of the controlled object, and control input-calculating means for calculating the control inputs with a plurality of predetermined response-specifying control algorithms, respectively, while sharing one linear function defining a converging behavior and a convergence rate of the output of the controlled object to the one filtering target value between the predetermined response-specifying control algorithms, in a manner such that the output of the controlled object converges to the calculated target value.

With the configuration of this control system, a target value as a target of the output of a controlled object is calculated according to the state of the controlled object, and a plurality of control inputs are calculated with a plurality of predetermined response-specifying control algorithms, respectively, while sharing one linear function defining the converging behavior and the convergence rate of the output of the controlled object to the target value between the predetermined response-specifying control algorithms, in a manner such that the output of the controlled object converges to the calculated target value. This causes the control inputs to be calculated such that the converging behavior and convergence rate of the output of the controlled object to the target value become similar between the control inputs, whereby it is possible to control the output of the controlled object while avoiding the response-specifying control processes using the control inputs from interfering with each other. As a result, both the stability and the accuracy of the control can be enhanced.

Preferably, the control input-calculating means sets respective gains to be used in calculating the control inputs according to a value of the one linear function.

Generally, in the response-specifying control algorithm, when the value of one linear function defining the converging behavior and the convergence rate of the output of a controlled object to a target value is small, the degree of deviation between the target value and the output of the controlled object is small, and hence it is desirable to carry out control high in resolution (in which the rate of change in the output of the controlled object with respect to a minimum control input is small) from the viewpoint of control accuracy. On the other hand, when the value of the one linear function is large, the degree of deviation between the target value and the output of the controlled object is large, and hence it is desirable to carry out control low in resolution (in which the rate of change in the output of the controlled object with respect to the minimum control input is large) from the viewpoint of the response of control. In view of this, with the configuration of this preferred embodiment, gains to be used in calculating the respective control inputs are set according to the value of the one linear function. Therefore, in cases, for example, where the control inputs are associated with respective different control resolutions, in the calculation of the control inputs, if the value of the linear function is small, a gain to be used in calculating a control input for control with a higher resolution is set to a larger value than a gain to be used in calculating a control input for control with a lower resolution, whereby the degree of contribution of control by the control input for the control with the higher resolution is increased. As a result, the control with the higher resolution is mainly performed, thereby making it possible to enhance the control accuracy of a plurality of control processes while avoiding the control processes from interfering with each other. On the other hand, if the value of the linear function is large, the gain to be used in calculating the control input for control with the lower resolution is set to a larger value than the gain to be used in calculating the control input for control with the higher resolution, whereby the degree of contribution of control by the control input for the control with the lower resolution is increased. As a result, the control with the lower resolution is mainly performed, thereby making it possible to enhance the response of control while avoiding the control processes from interfering with each other.

Preferably, the control input-calculating means calculates at least one of the control inputs according to an integral value of the one linear function, while performing a forgetting process on the integral value of the one linear function.

With the configuration of this preferred embodiment, at least one of the control inputs is calculated according to the integral value of the one linear function, while performing a forgetting process on the integral value of the one linear function. Therefore, an increase in the integral value of the one linear function is avoided, thereby making it possible to avoid an increase in the absolute value of the at least one control input. As a result, in the case where the operating efficiency of the controlled object is degraded by an increase in the absolute value of at least one control input, this preferred embodiment makes it possible to avoid the degradation of the operating efficiency.

Preferably, the control system further comprises disturbance estimation value-calculating means for calculating a plurality of disturbance estimation values for compensating for disturbance and modeling errors adversely affecting the controlled object, with respective predetermined estimation algorithms based on a model defining relationships between each of the disturbance estimation values, each of the control inputs, and the output of the controlled object, and the predetermined estimation algorithms set respective estimation gains of the disturbance estimation values according to the value of the one linear function, the control input-calculating means calculating the control inputs according to the respective disturbance estimation values.

With the configuration of this preferred embodiment, a plurality of disturbance estimation values for compensating for disturbance and modeling errors adversely affecting the controlled object are calculated with respective predetermined estimation algorithms based on a model defining the relationships between each of the disturbance estimation values, each of the control inputs, and the output of the controlled object, and the control inputs are determined according to the respective disturbance estimation values. The control inputs thus calculated make it possible to control the output of the controlled object while properly compensating for the disturbance and modeling errors adversely affecting the controlled object. Further, as described hereinabove, in the response-specifying control algorithms, in a region area where the value of the one linear function defining the converging behavior and the convergence rate of the output of the controlled object to the target value is small, it is desirable to carry out control with a higher resolution from the viewpoint of control accuracy, whereas in a region where the value of the one linear function is large, it is desirable to carry out control with a lower resolution from the viewpoint of the response of control. In view of this, in the predetermined estimation algorithms, respective estimation gains of the disturbance estimation values are set according to the value of the one linear function. Therefore, in cases, for example, where the control inputs are associated with respective different control resolutions, in the calculation of the control inputs, if the value of the linear function is small, an estimation gain of the disturbance estimation value to be used in calculating a control input for control with a higher resolution is set to a larger value than an estimation gain of the disturbance estimation value to be used in calculating a control input for control with a lower resolution, whereby the degree of contribution of control by the control input for the control with the higher resolution is increased. As a result, the control with the higher resolution is mainly performed, thereby making it possible to enhance the control accuracy of a plurality of control processes while avoiding the control processes from interfering with each other. On the other hand, if the value of the linear function is large, the estimation gain of the disturbance estimation value to be used in calculating the control input for the control with the lower resolution is set to a larger value than the estimation gain of the disturbance estimation value to be used in calculating the control input for the control with the higher resolution, whereby the degree of contribution of control by the control input for the control with the lower resolution is increased. As a result, the control with the lower resolution is mainly performed, thereby making it possible to enhance the response of control while avoiding the control processes from interfering with each other.

Preferably, the control system further comprises disturbance estimation value-calculating means for calculating a plurality of disturbance estimation values for compensating for disturbance and modeling errors adversely affecting the controlled object, with respective predetermined estimation algorithms based on a model defining relationships between each of the disturbance estimation values, each of the control inputs, and the output of the controlled object, and the predetermined estimation algorithms perform a predetermined forgetting process on at least one of the disturbance estimation values, the control input-calculating means calculating the control inputs according to the respective disturbance estimation values.

With the configuration of this preferred embodiment, a plurality of respective disturbance estimation values for compensating for disturbance and modeling errors adversely affecting the controlled object are calculated with respective predetermined estimation algorithms based on a model defining relationships between each of the disturbance estimation values, each of the control inputs, and the output of the controlled object, and the control inputs are determined according to the respective disturbance estimation values. The control inputs thus calculated make it possible to control the output of the controlled object while properly compensating for the disturbance and modeling errors adversely affecting the controlled object. Moreover, in the predetermined estimation algorithm, the predetermined forgetting process is performed on at least one of the disturbance estimation values. Therefore, an increase in the at least one of the disturbance estimation values is avoided, thereby making it possible to avoid an increase in the absolute value of the associated at least one control input. As a result, in the case where the operating efficiency of the controlled object is degraded by an increase in the absolute value of at least one control input, this preferred embodiment makes it possible to avoid the degradation of the operating efficiency.

Preferably, the output of the controlled object is rotational speed of an internal combustion engine, and the control inputs comprise a control input for controlling an intake air amount of the engine, and a control input for controlling ignition timing of the engine.

With the configuration of this preferred embodiment, the two control inputs for controlling the intake air amount and the ignition timing of the internal combustion engine, respectively, make it possible to perform feedback control of the rotational speed of the engine without causing overshooting or the like, such that the rotational speed properly converges to a target value thereof, and at the same time avoid the intake air amount control and the ignition timing control from interfering with each other. As a result, it is possible to enhance the stability and the accuracy of the engine speed control.

Preferably, the output of the controlled object is an intake air amount of an internal combustion engine, and the control inputs comprise a control input for controlling boost pressure of the engine, and a control input for controlling an EGR amount of the engine.

With the configuration of this preferred embodiment, the two control inputs for controlling the boost pressure and the EGR amount of the internal combustion engine, respectively, make it possible to perform feedback control of the intake air amount of the engine without causing overshooting or the like, such that the intake air amount properly converges to a target value thereof, and at the same time avoid boost pressure control and EGR control from interfering with each other. As a result, it is possible to enhance the stability and the accuracy of the intake air amount control of the engine.

BRIEF DESCRIPTION OF DRAWINGS

FIG. 7 is a diagram showing a valve lift curve (solid line) which the valve lift of the intake valve assumes when the lower link of the variable valve lift mechanism is in the maximum lift position, and a valve lift curve (two-dot chain line) which the valve lift of the intake valve assumes when the lower link of the variable valve lift mechanism is in the minimum lift position;

FIG. 11 is a diagram showing a control algorithm for an ignition timing controller;

FIG. 12 is a diagram showing part of a control algorithm for an intake air amount controller, and a model;

FIG. 17(a) is a timing diagram showing a result of a simulation of idle engine speed control according to the first embodiment, and FIGS. 17(b) to 17(d) are timing diagrams showing results of simulations of comparative examples of the idle engine speed control;

FIG. 23 is a diagram showing a control algorithm used for calculation of a lift control input;

FIG. 24 is a diagram showing an example of a map used for calculation of ignition timing;

FIG. 25 is a diagram showing an example of a map used for calculation of a target valve lift;

FIG. 27 is a diagram showing a control algorithm for an ignition timing controller;

FIG. 28 is a diagram showing part of a control algorithm for an intake air amount controller, and a model;

FIG. 37 is a diagram showing a control algorithm for an EGR controller;

FIG. 38 is a diagram showing part of a control algorithm for a boost pressure controller, and a model;

BEST MODE FOR CARRYING OUT THE INVENTION

Figure 2:
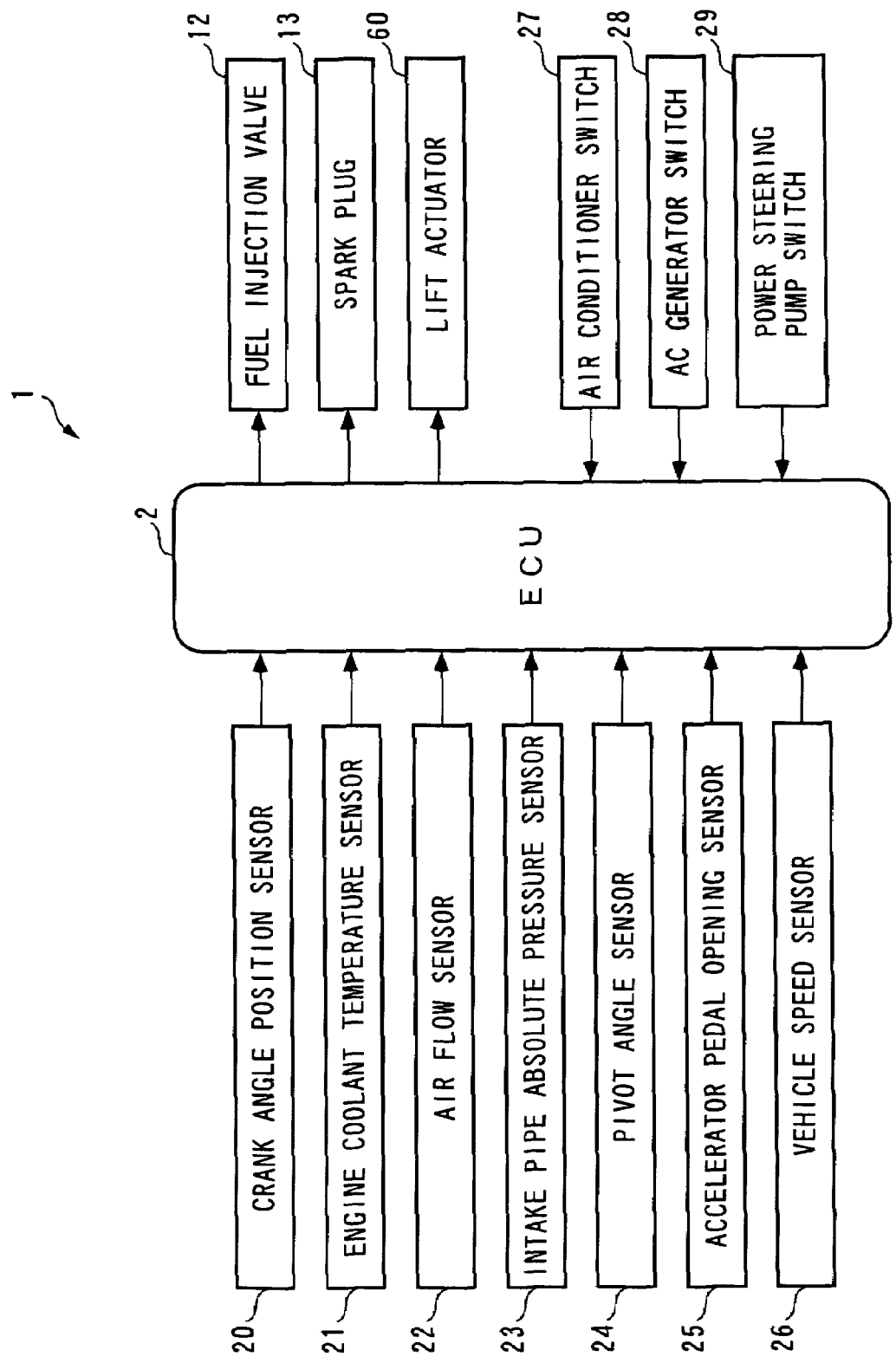
FIG. 2 is a block diagram schematically showing the arrangement of the control system.

Hereafter, a control system according a first embodiment of the present invention will be described with reference to drawings. The control system 1 includes an ECU 2, as shown in FIG. 2. As described hereinafter, the ECU 2 carries out control processes, including an idle engine speed control process, depending on operating conditions of an internal combustion engine (hereinafter simply referred to as "the engine") 3.

Figure 1:
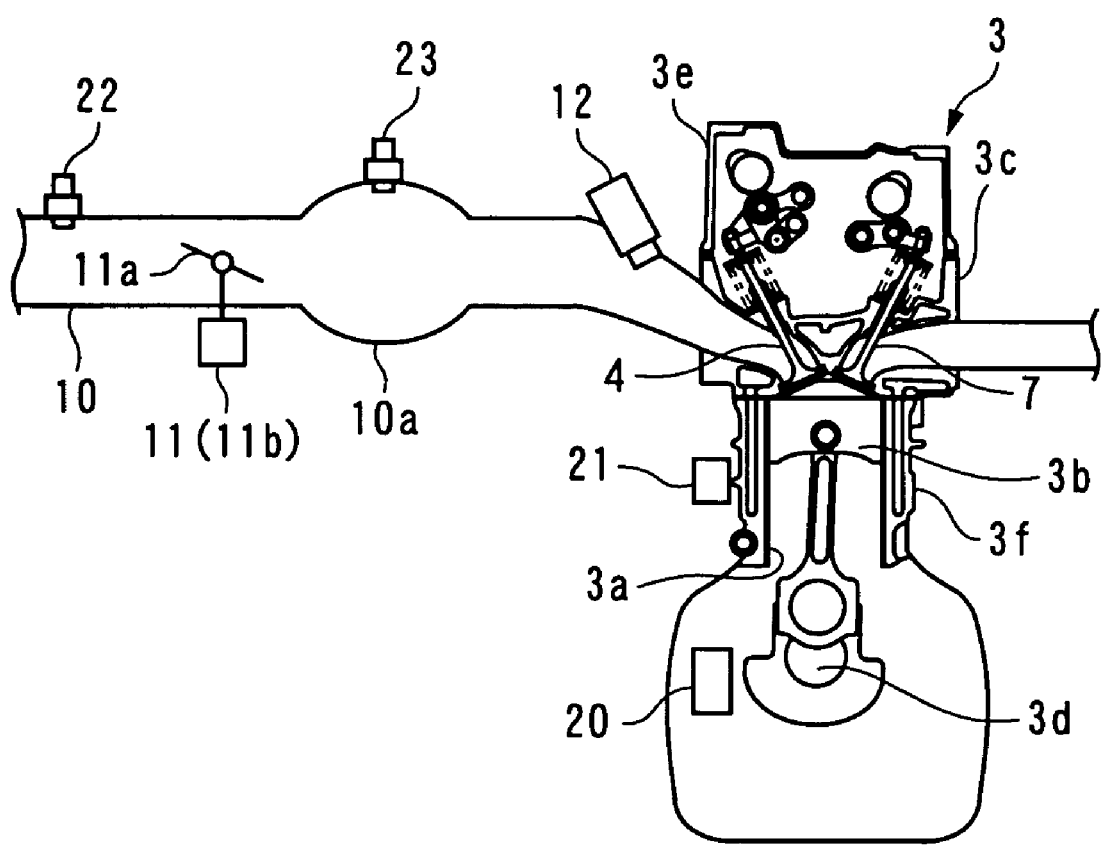
FIG. 1 is a diagram schematically showing the arrangement of an internal combustion engine to which is applied a control system according to a first embodiment of the present invention.
Figure 3:
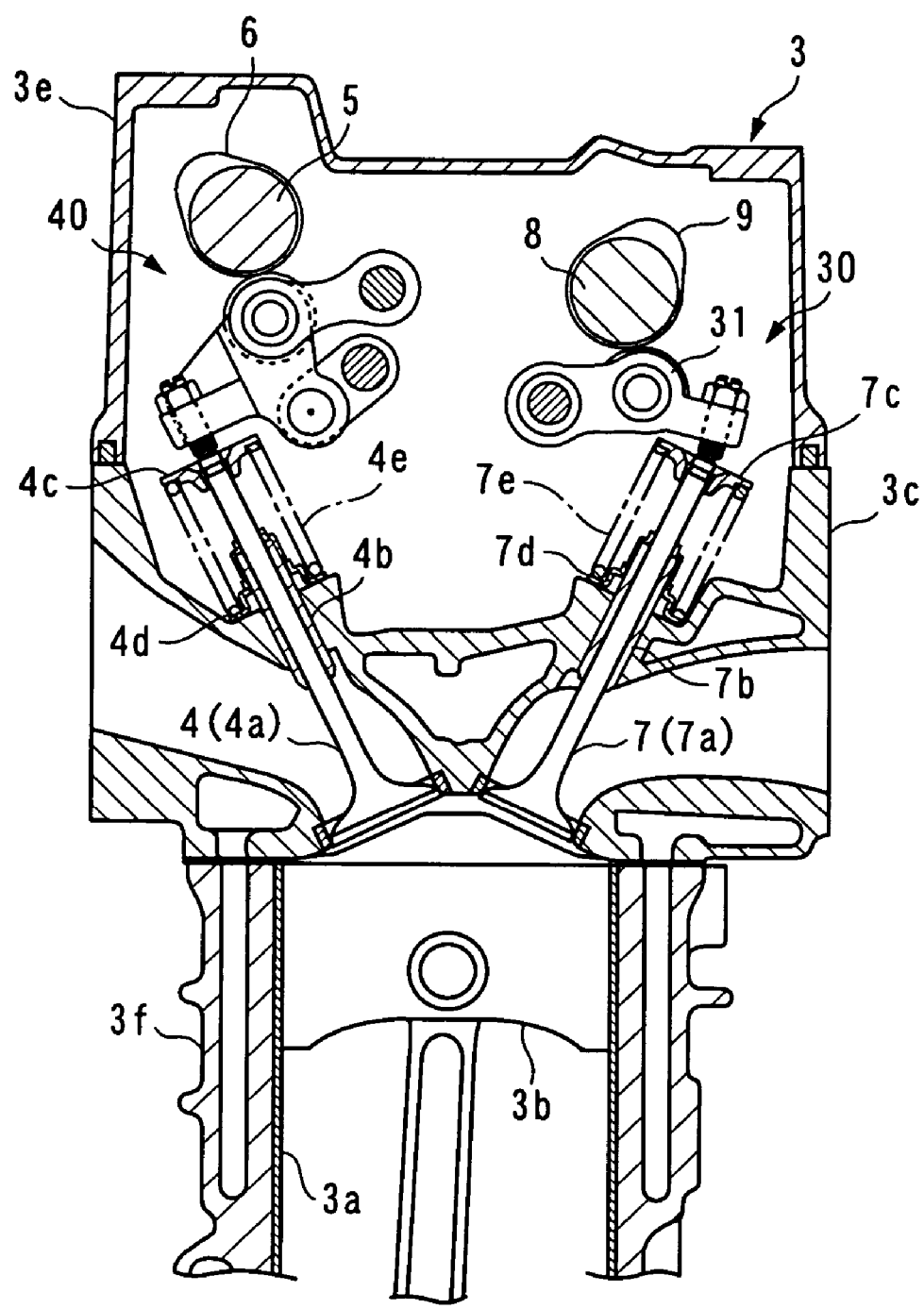
FIG. 3 is a cross-sectional view schematically showing the arrangement of a variable intake valve-actuating mechanism and an exhaust valve-actuating mechanism of the engine.

Referring to FIGS. 1 and 3, the engine 3 is an in-line multicylinder gasoline engine having a multiplicity of pairs of cylinders 3a and pistons 3b (only one pair of which is shown), and installed on a vehicle, not shown. The engine 3 includes an intake valve 4 and an exhaust valve 7 provided for each cylinder 3a, for opening and closing an intake port and an exhaust port thereof, respectively, an intake camshaft 5 and intake cams 6 that actuate the intake valves 4, a variable intake valve-actuating mechanism 40 that actuates the intake valves 4 to open and close the same, an exhaust camshaft 8 and exhaust cams 9 that actuate the exhaust valves 7, an exhaust valve-actuating mechanism 30 that actuates the exhaust valves 7 to open and close the same, and so forth.

Figure 4:
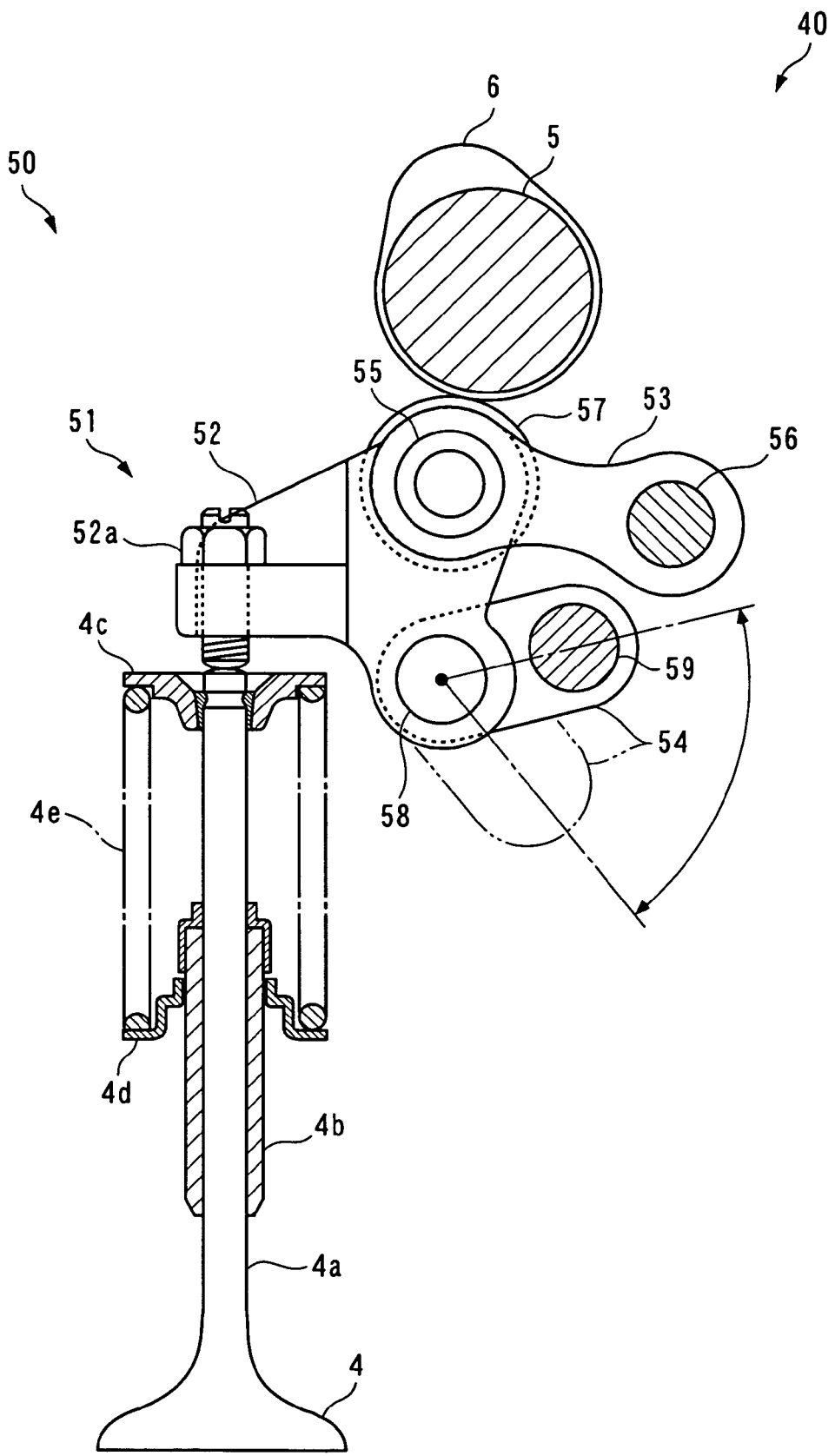
FIG. 4 is a cross-sectional view schematically showing the arrangement of a variable valve lift mechanism of the variable intake valve-actuating mechanism.

The intake valve 4 has a stem 4a thereof slidably fitted in a guide 4b. The guide 4b is rigidly fixed to a cylinder head 3c. Further, as shown in FIG. 4, the intake valve 4 includes upper and lower spring sheets 4c and 4d, and a valve spring 4e disposed therebetween, and is urged by the valve spring 4e in the valve-closing direction.

Further, the intake camshaft 5 and the exhaust camshaft 8 are rotatably mounted through the cylinder head 3c via holders, not shown. The intake camshaft 5 has an intake sprocket (not shown) coaxially fixed to one end thereof, and is connected to a crankshaft 3d by the intake sprocket and a timing belt (not shown), whereby the intake camshaft 5 performs one rotation per two rotations of the crankshaft 3d. Further, the intake cam 6 is provided on the intake camshaft 5 on each cylinder 3a such that the intake cam 6 rotates in unison with the intake camshaft 5.

Furthermore, the variable intake valve-actuating mechanism 40 is provided for actuating the intake valve 4 of each cylinder 3a so as to open and close the same, in accordance with rotation of the intake camshaft 5, and continuously changing the lift of the intake valve 4 to thereby change the amount of intake air (intake air amount), as will be described in detail hereinafter. It should be noted that in the present embodiment, "the lift of the intake valve 4" (hereinafter referred to as "the valve lift") represents the maximum lift of the intake valve 4.

On the other hand, the exhaust valve 7 has a stem 7a thereof slidably fitted in a guide 7b. The guide 7b is rigidly fixed to the cylinder head 3c. Further, the exhaust valve 7 includes upper and lower spring sheets 7c and 7d, and a valve spring 7e disposed therebetween, and is urged by the valve spring 7e in the valve-closing direction.

Further, the exhaust camshaft 8 has an exhaust sprocket (not shown) integrally formed therewith, and is connected to the crankshaft 3d by the exhaust sprocket and a timing belt, not shown, whereby the exhaust camshaft 8 performs one rotation per two rotations of the crankshaft 3d. Further, the exhaust cam 9 is disposed on the exhaust camshaft 8 for each cylinder 3a such that the exhaust cam 9 rotates in unison with the exhaust camshaft 8.

Further, the exhaust valve-actuating mechanism 30 includes rocker arms 31. Each rocker arm 31 is pivotally moved in accordance with rotation of the associated exhaust cam 9 to thereby actuate the exhaust valve 7 for opening and closing the same against the urging force of the valve spring 7e.

Further, the engine 3 is provided with a crank angle position sensor 20 and an engine coolant temperature sensor 21. The crank angle position sensor 20 delivers a CRK signal and a TDC signal, which are both pulse signals, to the ECU 2 in accordance with rotation of the crankshaft 3d. Each pulse of the CRK signal is generated whenever the crankshaft 3d rotates through a predetermined angle (e.g. 10 degrees). The ECU 2 determines the rotational speed NE of the engine 3 (hereinafter referred to as "the engine speed NE") based on the CRK signal. Further, the TDC signal indicates that each piston 3b in the associated cylinder 3a is in a predetermined crank angle position slightly before the TDC position at the start of the intake stroke, and each pulse of the TDC signal is generated whenever the crankshaft 3d rotates through a predetermined crank angle.

On the other hand, the engine coolant temperature sensor 21 is implemented e.g. by a thermistor mounted in a cylinder block 3f of the engine 3, and detects an engine coolant temperature TW which is the temperature of an engine coolant circulating through the cylinder block 3f, to deliver a signal indicative of the sensed engine coolant temperature TW to the ECU 2.

Further, in an intake pipe 10 of the engine 3, there are arranged an air flow sensor 22, a throttle valve mechanism 11, an intake pipe absolute pressure sensor 23, a fuel injection valve 12, and so forth, from upstream to downstream in the mentioned order at respective locations of the intake pipe 10. The air flow sensor 22 is formed by a hot-wire air flow meter, and detects the intake air amount Gcyl to deliver a signal indicative of the sensed intake air amount Gcyl.

The throttle valve mechanism 11 includes a throttle valve 11a, and a TH actuator 11b that actuates the throttle valve 11a to open and close the same. The throttle valve 11a is pivotally disposed across an intermediate portion of the intake pipe 10 such that the degree of opening thereof is changed by the pivotal motion thereof to thereby change the intake air amount Gcyl. The TH actuator 11b is implemented by a combination of a motor, not shown, connected to the ECU 2, and a gear mechanism, not shown, and driven by a drive signal from the ECU 2 to thereby change the degree of opening of the throttle valve 11a.

The ECU 2 holds the throttle valve 11a in a fully-open state during normal operation of the engine 3, and controls the degree of opening of the throttle valve 11a when the variable intake valve-actuating mechanism 40 is faulty, or when negative pressure is supplied to a master back (not shown).

A portion of the intake pipe 10 downstream of the throttle valve 11a forms a surge tank 10a into which is inserted an intake pipe absolute pressure sensor 23. The intake pipe absolute pressure sensor 23 is implemented e.g. by a semi-conductor pressure sensor, and detects an absolute pressure PBA in the intake pipe 10 (hereinafter referred to as "the intake pipe absolute pressure PBA"), to deliver a signal indicative of the sensed intake pipe absolute pressure PBA to the ECU 2.

The fuel injection valve 12 is driven by a drive signal indicative of a fuel injection amount, supplied from the ECU 2, and injects fuel into the intake pipe 10.

Spark plugs 13 (see FIG. 2) are mounted through the cylinder head 3c of the engine 3. Each spark plug 13 is connected to the ECU 2 via an ignition coil, not shown. When a drive signal (voltage signal) from the ECU 2 is applied in timing corresponding to ignition timing Ig_log, referred to hereinafter, the spark plug 13 causes a spark discharge, thereby burning a mixture in a combustion chamber.

Next, a description will be given of the aforementioned variable intake valve-actuating mechanism 40. As shown in FIG. 4, the variable intake valve-actuating mechanism 40 is comprised of the intake camshaft 5, the intake cams 6, and a variable valve lift mechanism 50.

The variable valve lift mechanism 50 is provided for actuating the intake valves 4 to open and close the same, in accordance with rotation of the intake camshaft 5, and continuously changing the valve lift Liftin to thereby continuously change the intake air amount Gcyl. The variable valve lift mechanism 50 is comprised of rocker arm mechanisms 51 of a four joint link type, provided for the respective cylinders 3a, and a lift actuator 60 (see FIGS. 5(a) and 5(b)) simultaneously actuating these rocker arm mechanisms 51.

Each rocker arm mechanism 51 is comprised of a rocker arm 52, and upper and lower links 53 and 54. The upper link 53 has one end pivotally mounted to an upper end of the rocker arm 52 by an upper pin 55, and the other end pivotally mounted to a rocker arm shaft 56. The rocker arm shaft 56 is mounted through the cylinder head 3c via holders, not shown.

Further, a roller 57 is pivotally disposed on the upper pin 55 of the rocker arm 52. The roller 57 is in contact with a cam surface of the intake cam 6. As the intake cam 6 rotates, the roller 57 rolls on the intake cam 6 while being guided by the cam surface of the intake cam 6. As a result, the rocker arm 52 is vertically driven, and the upper link 53 is pivotally moved about the rocker arm shaft 56.

Furthermore, an adjusting bolt 52a is mounted to an end of the rocker arm 52 toward the intake valve 4. When the rocker arm 52 is vertically moved in accordance with rotation of the intake cam 6, the adjusting bolt 52a vertically drives the stem 4a to open and close the intake valve 4, against the urging force of the valve spring 4e.

Further, the lower link 54 has one end pivotally mounted to a lower end of the rocker arm 52 by a lower pin 58, and the other end of the lower link 54 has a connection pin 59 pivotally mounted thereto. The lower link 54 is connected to a short arm 65, described hereinafter, of the lift actuator 60 by the connection pin 59.

Figure 5A:
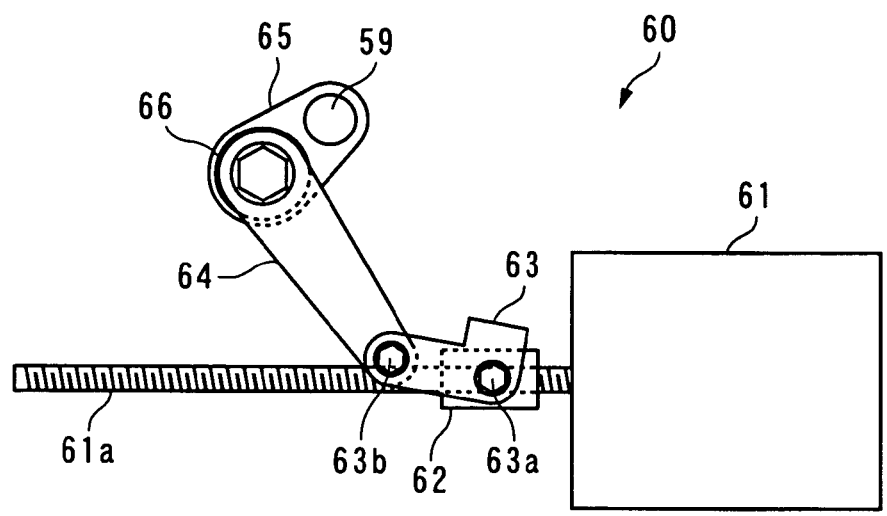
FIG. 5(a) is a diagram showing a lift actuator in a state in which a short arm thereof is in a maximum lift position.
Figure 5B:
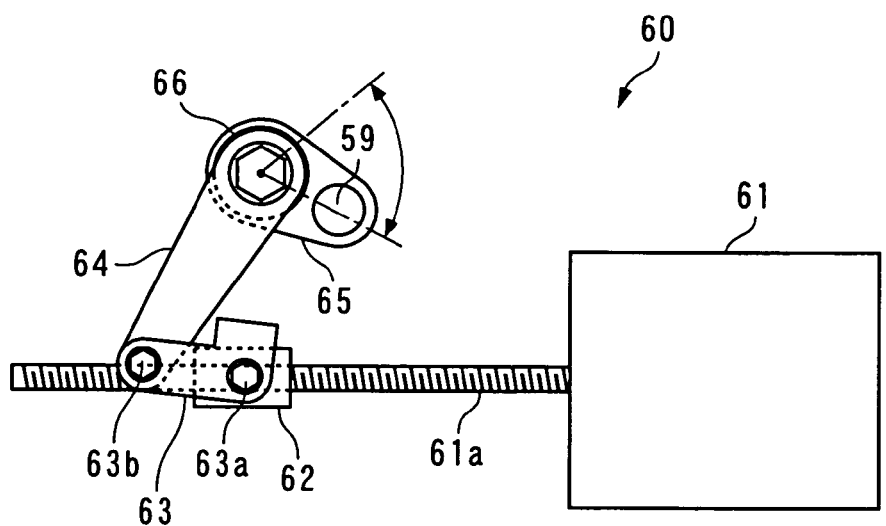
FIG. 5(b) is a diagram showing the lift actuator in a state in which the short arm thereof is in a minimum lift position.

On the other hand, as shown in FIGS. 5(a) and 5(b), the lift actuator 60 is comprised of a motor 61, a nut 62, a link 63, a long arm 64, and the short arm 65. The motor 61 is connected to the ECU 2, and disposed outside a head cover 3e of the engine 3. The rotational shaft of the motor 61 is a screw shaft 61a formed with a male screw and the nut 62 is screwed onto the screw shaft 61a. The nut 62 is connected to the long arm 64 by the link 63. The link 63 has one end pivotally mounted to the nut 62 by a pin 63a, and the other end pivotally mounted to one end of the long arm 64 by a pin 63b.

Further, the other end of the long arm 64 is attached to one end of the short arm 65 by a pivot shaft 66. The pivot shaft 66 is circular in cross section, and extends through the head cover 3e of the engine 3 such that it is pivotally supported by the head cover 3e. The long arm 64 and the short arm 65 are pivotally moved in unison with the pivot shaft 66 in accordance with pivotal motion of the pivot shaft 66.

Furthermore, the aforementioned connection pin 59 pivotally extends through the other end of the short arm 65, whereby the short arm 65 is connected to the lower link 54 by the connection pin 59.

Next, a description will be given of operation of the variable valve lift mechanism 50 configured as above. In the variable valve lift mechanism 50, when a drive signal based on a lift control input Uliftin, described hereinafter, is inputted from the ECU 2 to the lift actuator 60, the screw shaft 61a rotates, and the nut 62 is moved in accordance with the rotation of the screw shaft 61a, whereby the long arm 64 and the short arm 65 are pivotally moved about the pivot shaft 66, and in accordance with the pivotal motion of the short arm 65, the lower link 54 of the rocker arm mechanism 51 is pivotally moved about the lower pin 58. That is, the lower link 54 is driven by the lift actuator 60.

In the process, under the control of the ECU 2, the range of pivotal motion of the short arm 65 is restricted between a maximum lift position shown in FIG. 5(a) and a minimum lift position shown in FIG. 5(b), whereby the range of pivotal motion of the lower link 54 is also restricted between a maximum lift position indicated by a solid line in FIG. 4 and a minimum lift position indicated by a two-dot chain line in FIG. 4.

Figure 6A:
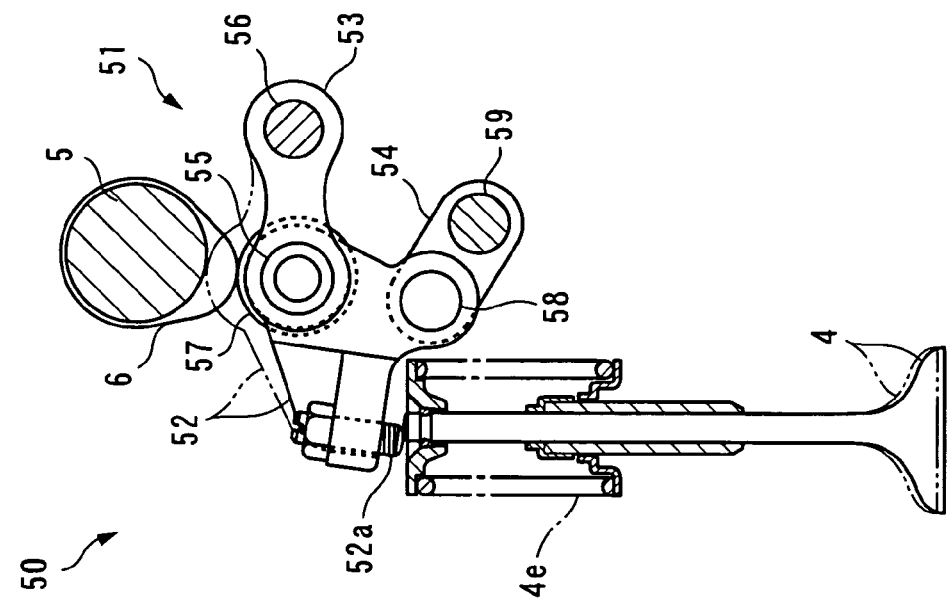
FIG. 6(a) is a diagram showing an intake valve placed in an open state when a lower link of the variable valve lift mechanism is in a maximum lift position.

The four joint link formed by the rocker arm shaft 56, the upper and lower pins 55 and 58, and the connection pin 59 is configured such that when the lower link 54 is in the maximum lift position, the distance between the center of the upper pin 55 and the center of the lower pin 58 becomes longer than the distance between the center of the rocker arm shaft 56 and the center of the connection pin 59, whereby as shown in FIG. 6(a), when the intake cam 6 rotates, the amount of movement of the adjusting bolt 52a becomes larger than the amount of movement of a contact point where the intake cam 6 and the roller 57 are in contact with each other.

Figure 6B:
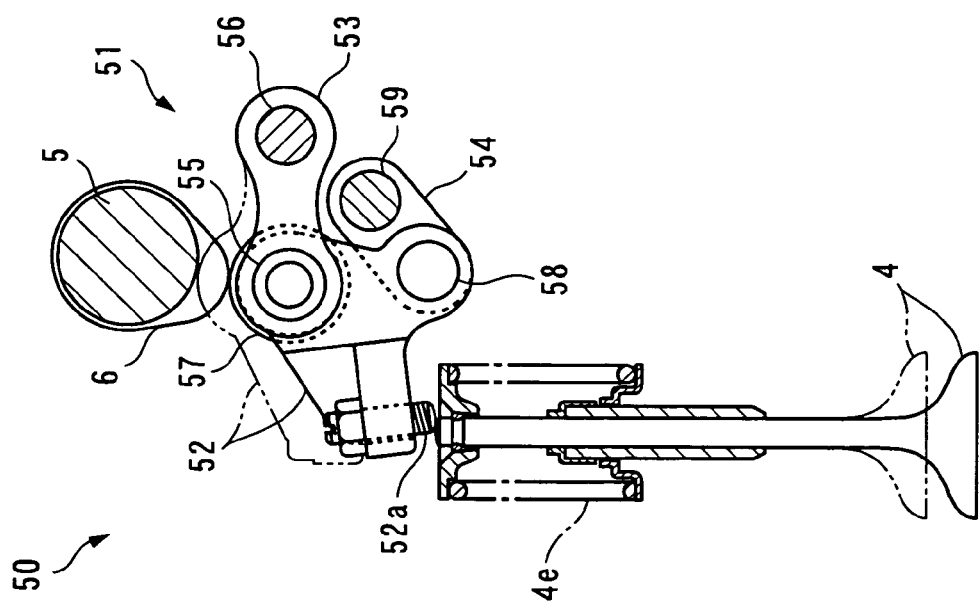
FIG. 6(b) is a diagram showing the intake valve placed in an open state when the lower link of the variable valve lift mechanism is in a minimum lift position.

On the other hand, the four joint link is configured such that when the lower link 54 is in the minimum lift position, the distance between the center of the upper pin 55 and the center of the lower pin 58 becomes shorter than the distance between the center of the rocker arm shaft 56 and the center of the connection pin 59, whereby as shown in FIG. 6(b), when the intake cam 6 rotates, the amount of movement of the adjusting bolt 52a becomes smaller than the amount of movement of the contact point where the intake cam 6 and the roller 57 are in contact with each other.

For the above reason, when the lower link 54 is in the maximum lift position, the intake valve 4 is opened with a larger valve lift Liftin than when the lower link 54 is in the minimum lift position. More specifically, during rotation of the intake cam 6, when the lower link 54 is in the maximum lift position, the intake valve 4 is opened according to a valve lift curve indicated by a solid line in FIG. 7, and the valve lift Liftin assumes its maximum value Liftinmax. On the other hand, when the lower link 54 is in the minimum lift position, the intake valve 4 is opened according to a valve lift curve indicated by a two-dot chain line in FIG. 7, and the valve lift Liftin assumes its minimum value Liftinmin.

Therefore, in the variable valve lift mechanism 50, the lower link 54 is pivotally moved by the lift actuator 60 between the maximum lift position and the minimum lift position, whereby it is possible to continuously change the valve lift Liftin between the maximum value Liftinmax and the minimum value Liftinmin, thereby making it possible to continuously change the intake air amount Gcyl within a predetermined range.

The engine 3 is provided with a pivot angle sensor 24 (see FIG. 2). The pivot angle sensor 24 detects a pivot angle of the pivot shaft 66, i.e. the short arm 65, and delivers a signal indicative of the sensed pivot angle to the ECU 2. The ECU 2 calculates the valve lift Liftin based on the output from pivot angle sensor 24.

Further, as shown in FIG. 2, connected to the ECU 2 are an accelerator pedal opening sensor 25, a vehicle speed sensor 26, an air conditioner switch (hereinafter referred to as "the AC·SW") 27, an AC generator switch (hereinafter referred to as "the ACG·SW") 28, and a power steering pump switch (hereinafter referred to as "the PSP·SW") 29.

The accelerator pedal opening sensor 25 detects a stepped-on amount AP (hereinafter referred to as "the accelerator pedal opening AP") of an accelerator pedal, not shown, of the vehicle and delivers a signal indicative of the sensed accelerator pedal opening AP to the ECU 2. Further, the vehicle speed sensor 26 is attached to an axle, not shown, of the vehicle, and detects a vehicle speed VP, which is a traveling speed of the vehicle, to deliver a signal indicative of the sensed vehicle speed VP to the ECU 2.

The AC·SW 27 outputs an ON signal to the ECU 2 when an air conditioner, not shown, is in operation, whereas when the air conditioner is in stoppage, the AC·SW 27 outputs an OFF signal to the ECU 2. Further, the ACG·SW 28 outputs an ON signal to the ECU 2 when an AC generator, not shown, is in operation, whereas when the AC generator is in stoppage, the ACG·SW 28 outputs an OFF signal to the ECU 2. Furthermore, the PSP·SW 29 outputs an ON signal to the ECU 2 when a power steering pump, not shown, is in operation, whereas when the power steering pump is in stoppage, the PSP·SW 29 outputs an OFF signal to the ECU 2. It should be noted that in the present embodiment, states of the air conditioner, the AC generator, and the power steering pump being in operation or in stoppage, and the engine coolant temperature TW correspond to the state of a controlled object.

The ECU 2 is implemented by a microcomputer comprised of a CPU, a RAM, a ROM, and an I/O interface (none of which are shown). The ECU 2 determines operating conditions of the engine 3 based on the detection signals from the above-mentioned sensors 20 to 26 and the ON/OFF signals from the above-mentioned switches 27 to 29, and executes control processes including a process for idle engine speed control. In the idle engine speed control, as will be described hereinafter, during idling of the engine 3, the ECU 2 controls the valve lift Liftin, i.e. the intake air amount Gcyl by the variable valve lift mechanism 50, and at the same time controls the ignition timing Ig_log by the spark plug 13, to thereby control the engine speed NE.

It should be noted that in the present embodiment, the ECU 2 forms target value-calculating means, filtering target value-calculating means, control input-calculating means, and disturbance estimation value-calculating means.

Figure 8:
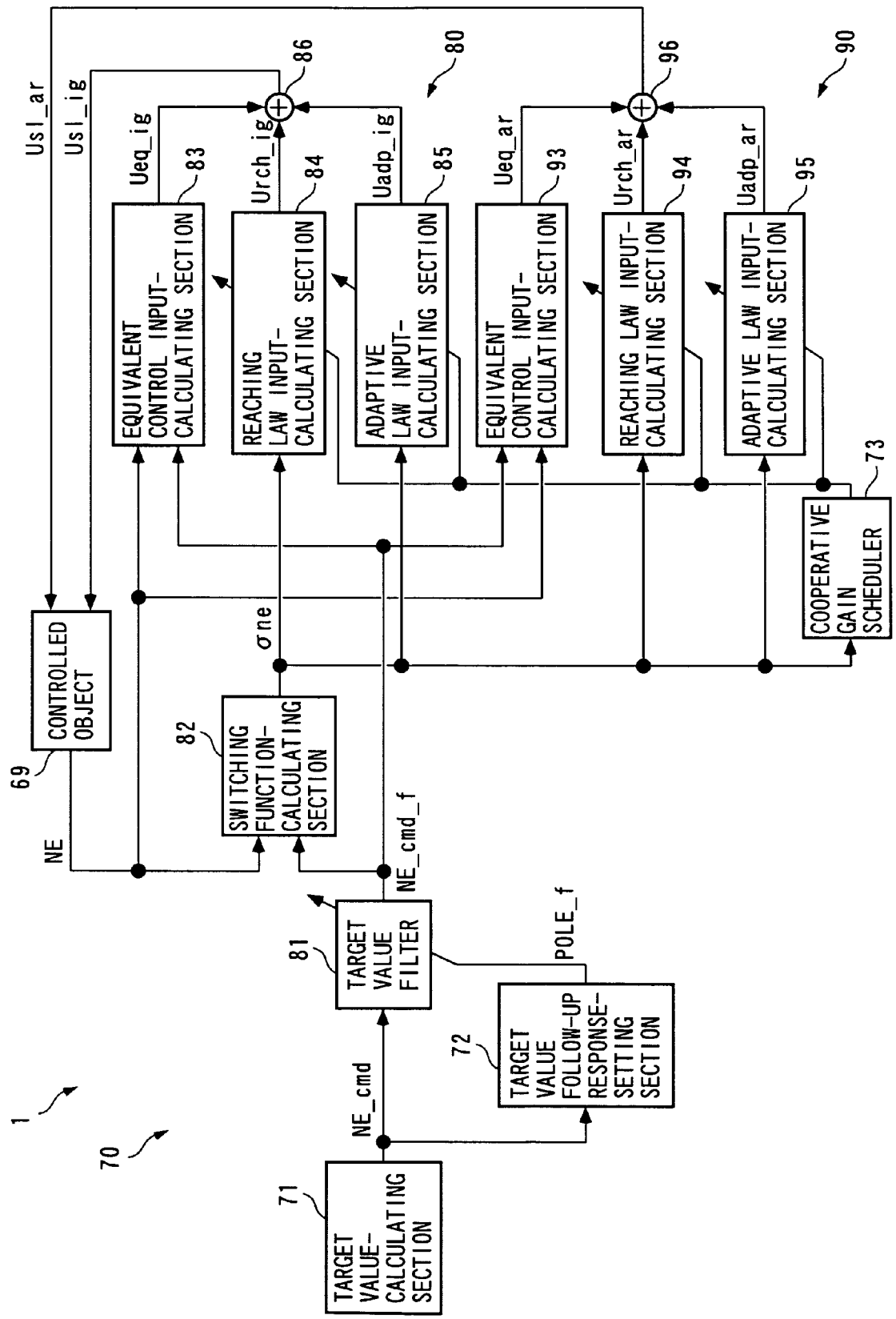
FIG. 8 is a block diagram schematically showing the configuration of an idle engine speed controller.

Next, the control system 1 according to the present embodiment will be described with reference to FIG. 8. As shown in FIG. 8, the control system 1 includes an idle engine speed controller 70 (control input-calculating means) which is implemented by the ECU 2.

As described hereinafter, in the idle engine speed controller 70 calculates an ignition control input Usl_ig and an intake control input Usl_ar as feedback correction terms with cooperative two-degree-of-freedom sliding mode control algorithms, for control of the intake air amount Gcyl and the ignition timing Ig_log while making the intake air amount Gcyl and the ignition timing Ig_log cooperative with each other. The control inputs Usl_ig and Usl_ar are inputted to a controlled object 69, whereby the engine speed NE is feedback-controlled during idling of the engine 3 such that the engine speed NE converges to a target engine speed NE_cmd. That is, the idle engine speed control is performed while making the intake air amount control and the ignition timing control cooperative with each other. It should be noted that the controlled object 69 is defined as a system to which are inputted the ignition control input Usl_ig and the intake control input Usl_ar, and from which is outputted the engine speed NE.

The idle engine speed controller 70 is comprised of a target value-calculating section 71, a target value follow-up response-setting section 72, an cooperative gain scheduler 73, an ignition timing controller 80, and an intake air amount controller 90.

Figure 9:
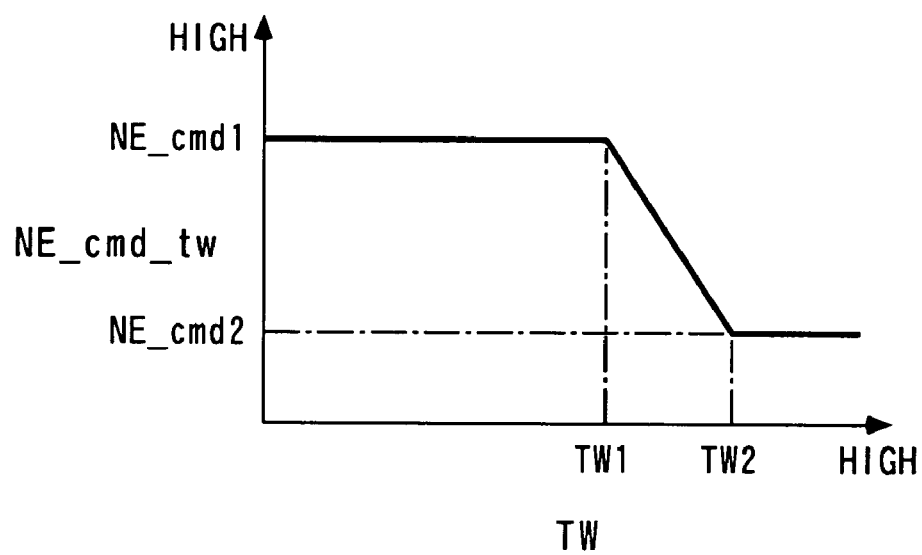
FIG. 9 is a diagram showing an example of a table used for calculation of an idling basic value.

First, the target value-calculating section 71 (target value-calculating means) calculates the target engine speed NE_cmd, which is a target value of the engine speed NE (output of the controlled object), during idling of the engine 3. More specifically, first, the target value-calculating section 71 calculates an idling basic value NE_cmd_tw for idling of the engine 3 by searching a table shown in FIG. 9 according to the engine coolant temperature TW. In FIG. 9, TW1 and TW2 are predetermined values between which the relationship of TW1<TW2 holds (e.g. TW1=40° C., and TW2=70° C.), and NE_cmd1 and NE_cmd2 are predetermined values between which the relationship of NE_cmd1>NE_cmd2 holds. In this table, the idling basic value NE_cmd_tw is set to the predetermined value NE_cmd1 within a range of TW<TW1, and it is set to the predetermined value NE_cmd2 within a range of TW>TW2. Within a range of TW1≦TW≦TW2, the idling basic value NE_cmd_tw is set to a lower value as the engine coolant temperature TW is higher. This is because when the engine coolant temperature TW is high, the combustion state of the engine 3 is stable, whereby it is possible to carry out idling of the engine 3 at a lower engine speed NE.

Then, a total correction term DNE_load is added to the idling basic value NE_cmd_tw calculated as above, whereby the target engine speed NE_cmd is calculated (NE_cmd=NE_cmd_tw+DNE_load). The total correction term DNE_load is calculated as the sum of three correction terms DNE1, DNE2, and DNE3 (DNE_load=DNE1+DNE2+DNE3). The correction terms DNE1, DNE2, and DNE3 are set depending on the ON/OFF states of the three switches 27 to 29.

More specifically, the correction term DNE1 is set to a predetermined value (e.g. 50 rpm) when the AC·SW 27 is in the ON state, whereas when the AC·SW 27 is in the OFF state, it is set to a value of 0. Further, the correction term DNE2 is set to a predetermined value (e.g. 100 rpm) when the ACG·SW 28 is in the ON state, whereas when the ACG·SW 28 is in the OFF state, it is set to a value of 0. Furthermore, the correction term DNE3 is set to a predetermined value (e.g. 100 rpm) when the PSP·SW 29 is in the ON state, whereas when the PSP·SW 29 is in the OFF state, it is set to a value of 0.

The target value follow-up response-setting section 72 (filtering target value-calculating means) calculates a target value filter-setting parameter POLE_f according to the degree of change in the target engine speed NE_cmd calculated by the target value-calculating section 71. The target value filter-setting parameter POLE_f is for setting follow-up responsiveness of the engine speed NE to the target engine speed NE_cmd, and is calculated specifically by searching a table shown in FIG. 10 according to a difference absolute value ADNE (degree of change in the target value). The difference absolute value ADNE is calculated as the absolute value of the difference between the current value NE_cmd(k) and the immediately preceding value NE_cmd (k−1) of the target engine speed (ADNE=|NE_cmd(k)−NE_cmd(k−1)|). Further, ADNE1 and ADNE2 in FIG. 10 are predetermined values between which the relationship of ADNE1<ADNE2 holds, and POLE_f1 and POLE_f2 are predetermined values between which the relationship of POLE_f1<POLE_f2 holds.

Figure 10:
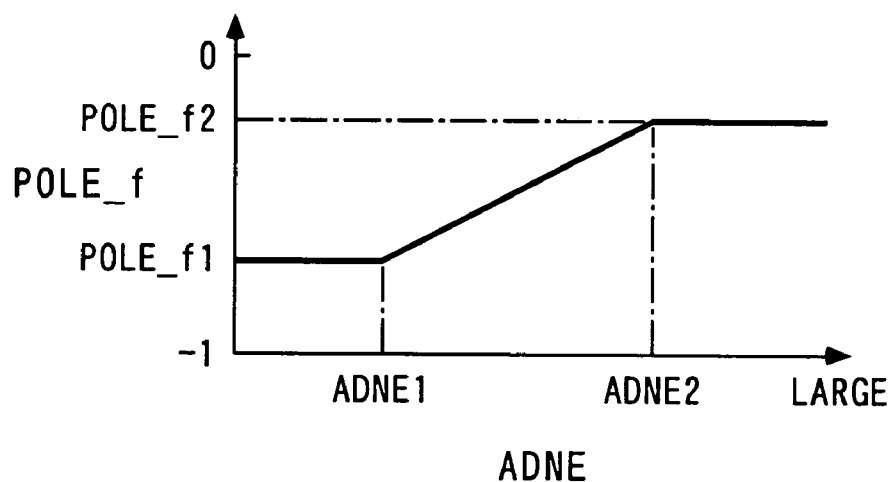
FIG. 10 is a diagram showing an example of a table used for calculation of a target value filter-setting parameter.

As shown in FIG. 10, in the above table, within a range of ADNE1≦ADNE≦ADNE2, the target value filter-setting parameter POLE_f is set to a larger value (value closer to a value of 0) as the difference absolute value ADNE is larger. This is because in calculation of a filtering value NE_cmd_f with a target value filter, the target value filter-setting parameter POLE_f is used to set the follow-up responsiveness of the engine speed NE to the target engine speed NE_cmd, as described hereinafter. Therefore, when the difference absolute value ADNE is large, and hence the degree of change in the engine speed NE is large, to cope with these conditions, the degree of reflection of the target engine speed NE_cmd in the filtering value NE_cmd_f is enhanced to thereby further improve the follow-up responsiveness of the engine speed NE to the target engine speed NE_cmd.

Further, within a range of ADNE<ADNE1, the target value filter-setting parameter POLE_f is set to the predetermined value POLE_f1, and within a range of ADNE>ADNE2, it is set to the predetermined value POLE_f2. This is because when the degree of change in the engine speed NE is considerably small or considerably large, there is a limit to setting the follow-up responsiveness of the engine speed NE to the target engine speed NE_cmd using the target value filter-setting parameter POLE_f.

Further, the cooperative gain scheduler 73 sets a reaching law gain Krch_ig and an adaptive law gain Kadp_ig, for use in the calculation of the ignition control input Usl_ig, and a reaching law gain Krch_ar and an adaptive law gain Kadp_ar, for use in the calculation of the intake control input Usl_ar. Detailed description of the cooperative gain scheduler 73 will be given hereinafter.

Next, a description will be given of the aforementioned ignition timing controller 80. As described hereinafter, the ignition timing controller 80 is provided for calculating the ignition control input Usl_ig with a target value filter-type two-degree-of-freedom sliding mode control algorithm, and is comprised of a target value filter 81, a switching function-calculating section 82, an equivalent control input-calculating section 83, a reaching law input-calculating section 84, an adaptive law input-calculating section 85, and an addition element 86.

The target value filter 81 (filtering target value-calculating means) calculates the filtering value NE_cmd_f (filtering target value) of the target engine speed with a first-order lag filter algorithm shown in an equation (1) in FIG. 11, using the target engine speed NE_cmd calculated by the target value-calculating section 71 and the target value filter-setting parameter POLE_f set by the target value follow-up response-setting section 72, described above. As a result, the filtering value NE_cmd_f is calculated as a value representative of first-order lag follow-up responsiveness to the target engine speed NE_cmd, which is determined based on the value of the target value filter-setting parameter POLE_f.

It should be noted that in the equation (1), each discrete data with a symbol (k) represents data sampled (or calculated) in synchronism with a predetermined control cycle. The symbol k represents a position in the sequence of sampling cycles of discrete data. For example, the symbol k indicates that discrete data therewith is a value sampled in the current control timing, and a symbol k−1 indicates that discrete data therewith is a value sampled in the immediately preceding control timing. This also applies to the following discrete data. It should be noted that in the following description, the symbol k and the like provided for the discrete data are omitted as required.

The switching function-calculating section 82 calculates a switching function (linear function) σne by equations (2) and (3) in FIG. 11. In the equation (2), POLE represents a switching function-setting parameter, and is set to a value within a range of −1<POLE<0. Further, Ene represents a follow-up error, and as expressed by the equation (3), is defined as the difference between the current value NE (k) of the engine speed and the immediately preceding value NE_cmd_f(k−1) of the filtering value of the target engine speed.

The follow-up error Ene is defined as above because: if Ene (k) is defined as Ene (k)=NE (k)−NE_cmd_f(k), the next value NE_cmd_f(k+1) of the filtering value of the target engine speed is necessitated in calculation of equivalent control inputs Ueq_ig and Ueq_ar, referred to hereinafter, and hence the follow-up error Ene is defined as above with a view to avoiding the necessity. Further, even when the follow-up error Ene is defined as expressed by the equation (3), the current value NE_cmd_f(k) of the filtering value of the target engine speed is used in calculation of the equivalent control inputs Ueq_ig and Ueq_ar, as described hereinafter, and reflected therein in a feedforward manner, whereby both the ignition control input Usl_ig and the intake control input Usl_ar can be calculated as values sufficiently reflecting the current value NE_cmd_f(k) of the filtering value of the target engine speed.

Further, the equivalent control input-calculating section 83 calculates the equivalent control input Ueq_ig by an equation (4) based on the engine speed NE, the filtering value NE_cmd_f, and the switching function-setting parameter POLE. In the equation (4), a1, a2, b1, and b2 represent model parameters of a model [equation (13) in FIG. 12] described hereinafter.

The reaching law input-calculating section 84 calculates a reaching law input Urch_ig by an equation (5) in FIG. 11, using the reaching law gain Krch_ig set by the cooperative gain scheduler 73.

Further, the adaptive law input-calculating section 85 calculates a forgetting integral value sum_σne, which is a value obtained by performing a forgetting process on a integral value of the switching function, by a forgetting integration process expressed by an equation (6) in FIG. 11, and calculates an adaptive law input Uadp_ig by an equation (7), using the forgetting integral value sum_σne and the adaptive law gain Kadp_ig set by the cooperative gain scheduler 73. In the equation (6), FGT represents a forgetting coefficient which is set to a value within a range of 0<FGT<1.

As expressed by the equation (6), the forgetting coefficient FGT is used to multiply the immediately preceding value sum_σne (k−1) of the forgetting integral value of the switching function. Therefore, when the equation (6) is expanded by a recurrence formula thereof, a value sum_σne (k−n) calculated n times before is multiplied by FGT$^n$ ($\approx$0). As a result, in accordance with the progress of the arithmetic operations, the forgetting integral value sum_σne of the switching function converges to a value of 0, and the adaptive law input Uadp_ig as well converges to a value of 0. The adaptive law input Uadp_ig is thus calculated using the forgetting integral value sum_σne of the switching function σne, whereby the ignition control input Usl_ig is prevented from being held on a retarded side. As a result, the ignition timing Ig_log is prevented from being held in a retarded state for a long time period in the ignition timing control described hereinafter, whereby it is possible to ensure an excellent combustion state of the engine 3. It should be noted that when the ignition timing Ig_log may be held in the retarded state for a long time period, the forgetting coefficient FGT may be set to a value of 1 in the equation (6) to thereby calculate the adaptive law input Uadp_ig based on a general integral value of the switching function σne, as with a general sliding mode control algorithm.

Further, the addition element 86 calculates the ignition control input Usl_ig by an equation (8) in FIG. 11, using the equivalent control input Ueq_ig, the reaching law input Urch_ig, and the adaptive law input Uadp_ig, calculated as above.

As described above, the ignition timing controller 80 calculates the ignition control input Usl_ig as a feedback correction term with the target value filter-type two-degree-of-freedom sliding mode control algorithm expressed by the equations (1) to (8). Further, in the ignition timing control described hereinafter, an ignition basic value Ig_base is added to the ignition control input Usl_ig, whereby the ignition timing Ig_log is calculated. It should be noted that the above equations (1) to (8) are derived by defining a model representing the relationship between the dynamic characteristics of the engine speed NE and those of the ignition control input Usl_ig by an equation (13) in FIG. 12, and using this model and a target value filter-type two-degree-of-freedom sliding mode control law such that the engine speed NE converges to the target engine speed NE_cmd.

Next, a description will be given of the aforementioned intake air amount controller 90. As described hereinafter, the intake air amount controller 90 is provided for calculating the intake control input Usl_ar with a target value filter-type two-degree-of-freedom sliding mode control algorithm, and comprised of the above-described target value filter 81, the above-described switching function-calculating section 82, an equivalent control input-calculating section 93, a reaching law input-calculating section 94, an adaptive law input-calculating section 95, and an addition element 96. That is, the intake air amount controller 90 shares the target value filter 81 and the switching function-calculating section 82 with the ignition timing controller 80, to thereby calculate the intake control input Usl_ar while sharing the filtering value NE_cmd_f of the target engine speed and the switching function σne with the ignition timing controller 80.

The equivalent control input-calculating section 93 calculates the equivalent control input Ueq_ar by an equation (9) in FIG. 12, using the engine speed NE, the filtering value NE_cmd_f, and the switching function-setting parameter POLE. In the equation (9), a1', a2', b1', and b2' represent model parameters of a model [equation (14) in FIG. 12] described hereinafter.

The reaching law input-calculating section 94 calculates a reaching law input Urch_ar by an equation (10) in FIG. 12, using the reaching law gain Krch_ar set by the cooperative gain scheduler 73.

Further, the adaptive law input-calculating section 95 calculates an adaptive law input Uadp_ar by an equation (11) in FIG. 12, using the adaptive law gain Kadp_ar set by the cooperative gain scheduler 73.

Furthermore, the addition element 96 calculates the intake control input Usl_ar by an equation (12) in FIG. 12, using the equivalent control input Ueq_ar, the reaching law input Urch_ar, and the adaptive law input Uadp_ar, calculated as above.

As described above, the intake air amount controller 90 calculates the intake control input Usl_ar as a feedback correction term with the target value filter-type two-degree-of-freedom sliding mode control algorithm expressed by the equations (1) to (3) and (9) to (12). Further, in the intake air amount control described hereinafter, a lift basic value Liftin_base is added to the intake control input Usl_ar, whereby a target valve lift Liftin_cmd is calculated. It should be noted that the above equations (1) to (3) and (9) to (12) are derived by defining a model representing the relationship between the dynamic characteristics of the engine speed NE and those of the intake control input Usl_ar by the equation (14) in FIG. 12, and using this model and the target value filter-type two-degree-of-freedom sliding mode control law such that the engine speed NE converges to the target engine speed NE_cmd.

Next, a description will be given of the aforementioned cooperative gain scheduler 73. The cooperative gain scheduler 73 calculates the above-mentioned four gains Krch_ig, Kadp_ig, Krch_ar, and Kadp_ar by searching tables shown in FIGS. 13 and 14 according to the switching function σne. It should be noted that σ1 and σ2 shown in FIGS. 13 and 14 represent positive predetermined values between which the relationship of σ1<σ2 holds.

Figure 13:
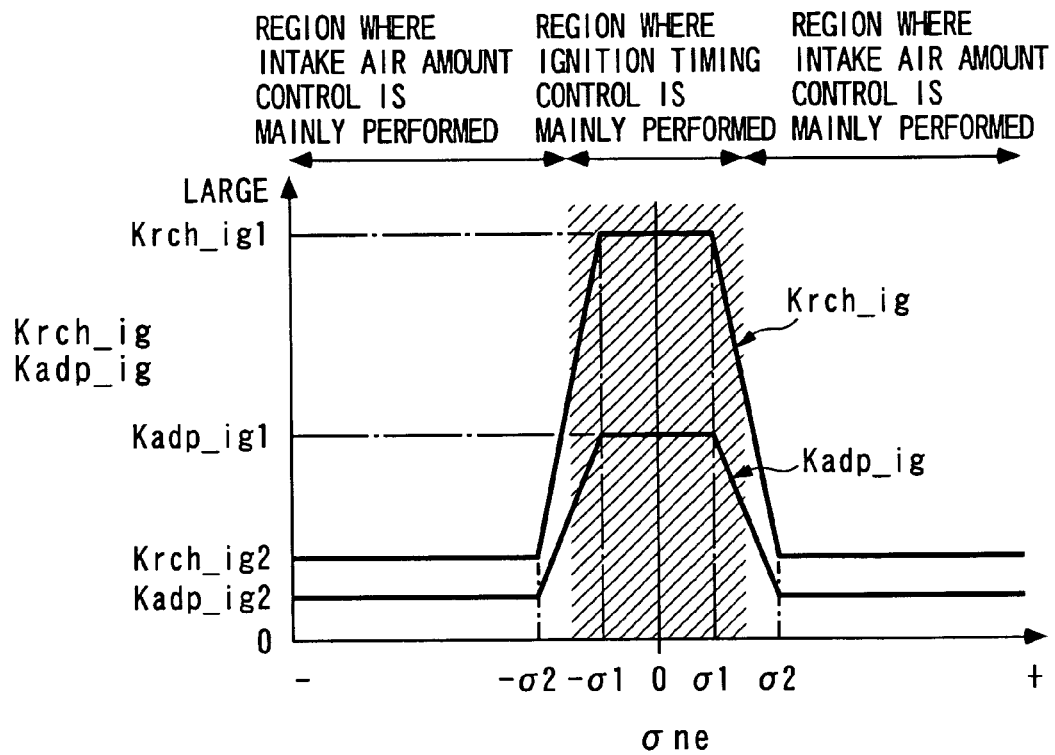
FIG. 13 is a diagram showing an example of a table used for calculation of a reaching law gain and an adaptive law gain for ignition timing control.

First, referring to the FIG. 13 table, the reaching law gain Krch_ig and the adaptive law gain Kadp_ig have values set to be symmetrical on the positive side and the negative side of the witching function σne. They are set to respective predetermined maximum values Krch_ig1 and Kadp_ig1 in a range of −σ1<σne<σ1 around a value of 0, and in ranges of σne<−σ2 and σ2<σne, they are set to respective predetermined minimum values Krch_ig2 and Kadp_ig2. Further, in ranges of −σ2≦σne≦−σ1 and σ1≦σne≦σ2, they are set to larger values, as the absolute value of σne becomes smaller.

Figure 14:
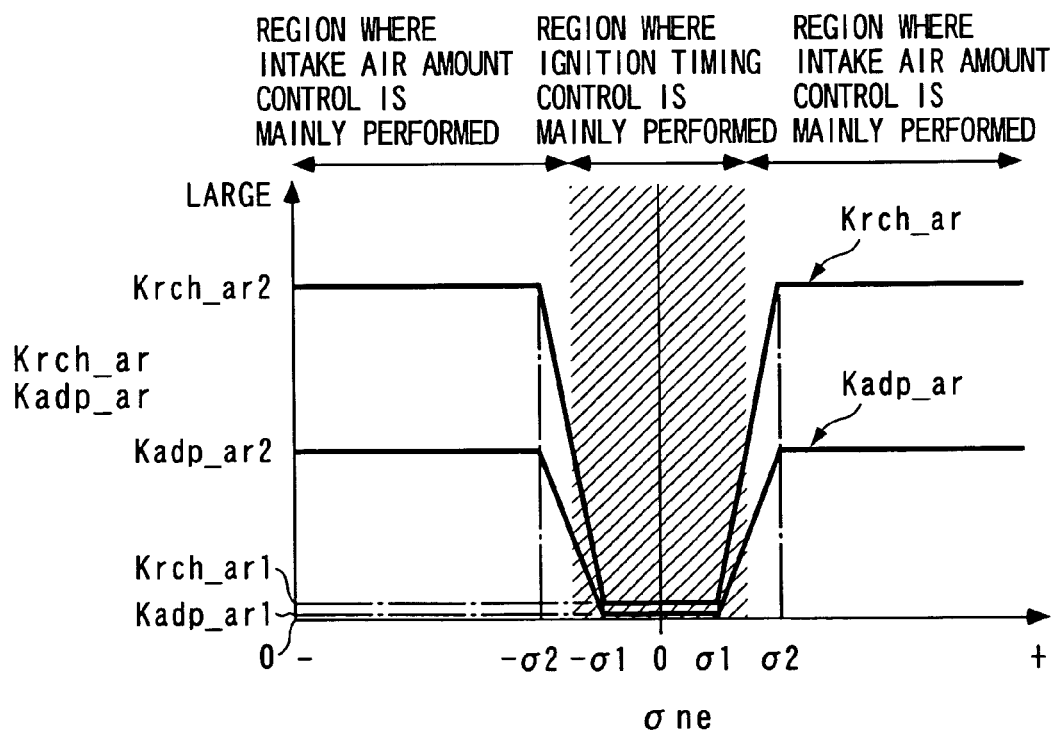
FIG. 14 is a diagram showing an example of a table used for calculation of a reaching law gain and an adaptive law gain for intake air amount control.

Referring to the FIG. 14 table, the reaching law gain Krch_ar and the adaptive law gain Kadp_ar have values set to be symmetrical on the positive side and the negative side of the witching function σne. They are set to respective predetermined minimum values Krch_ar1 and Kadp_ar1 in the range of −σ1<σne<σ1 around a value of 0, and in the ranges of σne<−σ2 and σ2<σne, they are set to respective predetermined maximum values Krch_ar2 and Kadp_ar2. Further, in the ranges of $-\sigma 2 \leq \sigma ne \leq \sigma 1$ and $\sigma 1 \leq \sigma ne \leq \sigma 2$, they are set to smaller values, as the absolute value of σne becomes smaller.

The values of the four gains Krch_ig, Kadp_ig, Krch_ar, and Kadp_ar are thus set because: As described hereinabove, the ignition timing control has the feature that it is short in response delay and dead time, and high in the resolution of control (small in the degree of change in the engine speed NE with respect to the minimum ignition control input Usl_ig), but it is limited in the range of control in view of the combustion state of the engine 3. On the other hand, the intake air amount control has the feature that it is lower in the resolution of control than the ignition timing control, and capable of coping with a large change in the target engine speed NE_cmd, but it is lower in the control accuracy of the engine speed NE, and longer in response delay and dead time than the ignition timing control, which makes the intake air amount control inferior to the ignition timing control in the convergence of the engine speed NE to the target engine speed NE_cmd.

Further, the idle engine speed controller 70 employs the target value filter-type two-degree-of-freedom sliding mode control algorithms, as described above, so that when the absolute value of the switching function σne is close to a value of 0, the difference between the follow-up behavior of the engine speed NE to the target engine speed NE_cmd, set by the target value filter 81, and an actual follow-up behavior thereof is small, and the difference between the converging behavior of the follow-up error Ene to a value of 0, designated by the switching function σne, and an actual converging behavior thereof is small. Therefore, when the absolute value of the switching function σne is close to a value of 0, to enhance the resolution and control accuracy of the idle engine speed control, the degree of contribution of the ignition timing control to the idle engine speed control is increased and at the same time the degree of contribution of the intake air amount control to the idle engine speed control is decreased. Inversely, when the absolute value of the switching function σne is large, the difference between the follow-up behavior set by the target value filter 81 and the actual follow-up behavior is large, and the difference between the converging behavior designated by the switching function σne and the actual converging behavior is large, and hence to enhance the response of the idle engine speed control, the degree of contribution of the intake air amount control to the idle engine speed control is increased, and at the same time the degree of contribution of the ignition timing control to the idle engine speed control is decreased.

Figure 15:
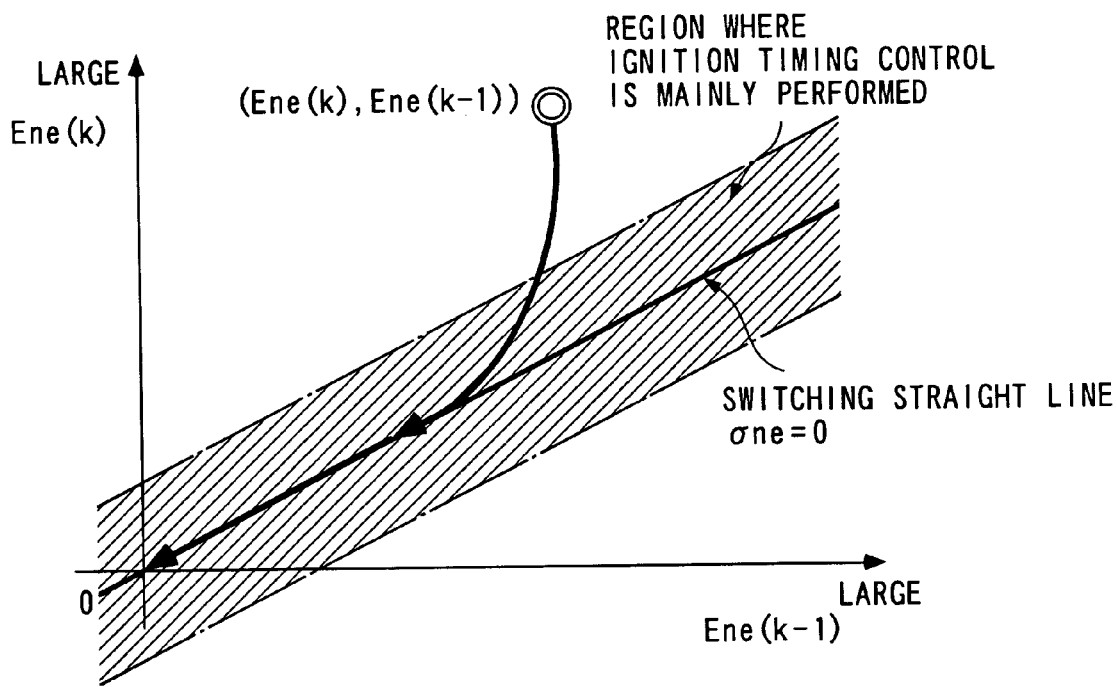
FIG. 15 is a diagram showing a phase plane and a switching line, which is useful in explaining control regions.
Figure 16:
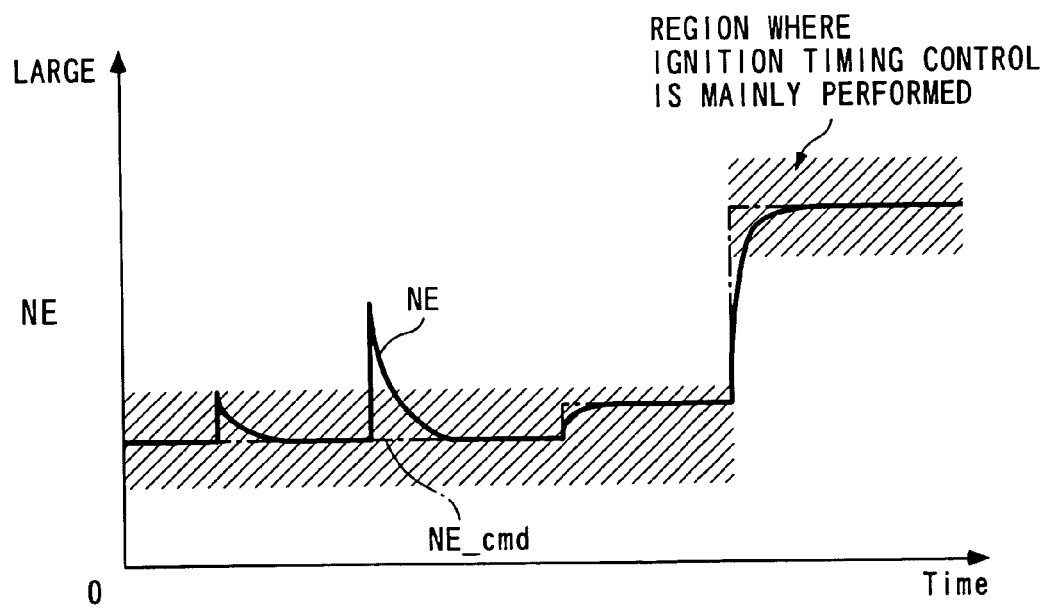
FIG. 16 is a timing diagram showing the relationship between the engine speed and the target engine speed of the engine, which is useful in explaining control regions.

For the above reasons, in the case of the cooperative control performed by the idle engine speed controller 70 of the present embodiment for the ignition timing control and the intake air amount control, the ignition timing control is mainly performed in a region indicated by hatching in FIGS. 13 and 14 and the intake air amount control is mainly performed in the other regions. Further, as shown in FIG. 15, as for the switching function σne, the ignition timing control is mainly performed in a region where values of the switching function σne are close to a switching straight line (region indicated by hatching in FIG. 15), and the intake air amount control is mainly performed in the other regions. Similarly, as shown in FIG. 16, in the relationship between the engine speed NE and the target engine speed NE_cmd, the ignition timing control is mainly performed in a region where the degree of deviation therebetween is small (region indicated by hatching in FIG. 16), and the intake air amount control is mainly performed in the other region.

Next, a description will be given of the results of simulations of the idle engine speed control by the idle engine speed controller 70 configured as described above. First, FIGS. 17(*a*) to 17(*d*) show the results of simulations of control in which the target engine speed NE_cmd is changed between a target value NE1 (e.g. 800 rpm) and a target value NE2 (e.g. 900 rpm) higher than the target value NE1 in a manner similar to the input of a pulse. More specifically, FIG. 17(*a*) shows the result of a simulation of the idle engine speed control according to the present embodiment. FIG. 17(*b*) shows the result of a simulation of a comparative example of the control in which the cooperative gain scheduler 73 of the idle engine speed controller 70 is omitted, and the above-mentioned four gains are set to fixed gains.

Further, FIG. 17(*c*) shows the result of a simulation of a comparative example of the control in which the above-mentioned four gains are set to fixed gains, and the absolute value of the switching function-setting parameter POLE in the ignition timing control is set to a smaller value than in the intake air amount control, such that a convergence rate of the ignition timing control at which the follow-up error Ene converges to a value of 0 becomes higher than that of the intake air amount control. FIG. 17(*d*) shows the result of a simulation of a comparative example of the control in which the four gains are set to fixed gains, and inversely to the FIG. 17(*c*) example, values of two switching function-setting parameters POLE are set such that the convergence rate of the intake air amount control at which the follow-up error Ene converges to a value of 0 becomes higher than that of the ignition timing control.

Referring to the results of the above four simulations, in the case of the comparative example shown in FIG. 17(*b*) it is apparent that even when the same switching function σne is used in the intake air amount control and the ignition timing control, since the four gains are set to fixed gains, there occurs undershooting when the engine speed NE converges to the target value NE1, whereby the converging behavior becomes unstable and the convergence rate decreases.

Further, in the case of the comparative example show in FIG. 17(*c*), it is apparent that when the aforementioned four gains are set to fixed gains, and the convergence rate of the ignition timing control at which the follow-up error Ene converges to a value of 0 is set to be higher than that of the intake air amount control, there occurs no undershooting when the engine speed NE converges to the target value NE1, but a state continues long in which the engine speed NE largely deviates from the target value NE1, and hence the convergence rate decreases. Furthermore, it is apparent from FIG. 17(*d*) that when the convergence rate of the ignition timing control at which the follow-up error Ene converges to a value of 0 is set to be lower than that of the intake air amount control, there occurs undershooting when the engine speed NE converges to the target value NE1, so that the converging behavior becomes unstable and the convergence rate decreases.

In contrast, in the case of the result of the simulation of the idle engine speed control according to the present embodiment shown in FIG. 17(*a*), it is apparent that there occurs no undershooting when the engine speed NE converges to the target value NE1, so that the converging behavior is stabilized and the convergence rate is higher than in the comparative examples. More specifically, it is apparent that in the calculation of the ignition control input Usl_ig and the intake control input Usl_ar, by showing the filtering value NE_cmd_f of the target engine speed and the switching function σne, and at the same time using the four gains Krch_ig, Kadp_ig, Krch_ar, and Kadp_ar which are gain-scheduled by the cooperative gain scheduler 73, as in the case of the idle engine speed controller 70 according to the present embodiment, it is possible to ensure both a stable converging behavior and a rapid convergence when the engine speed NE is caused to converge to the target engine speed NE_cmd.

Figure 18:
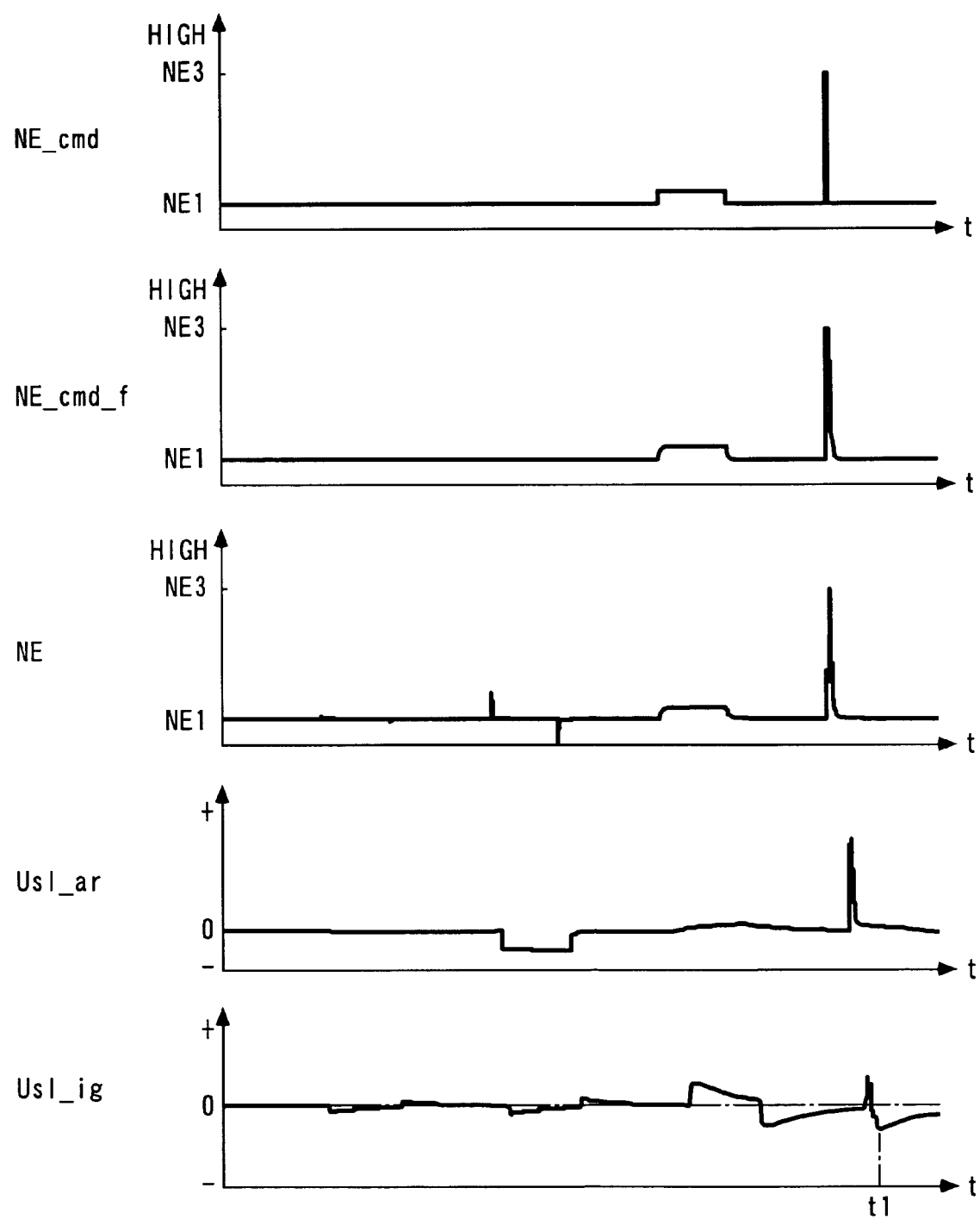
FIG. 18 is a timing diagram showing a result of a simulation of the idle engine speed control according to the first embodiment.
Figure 19:
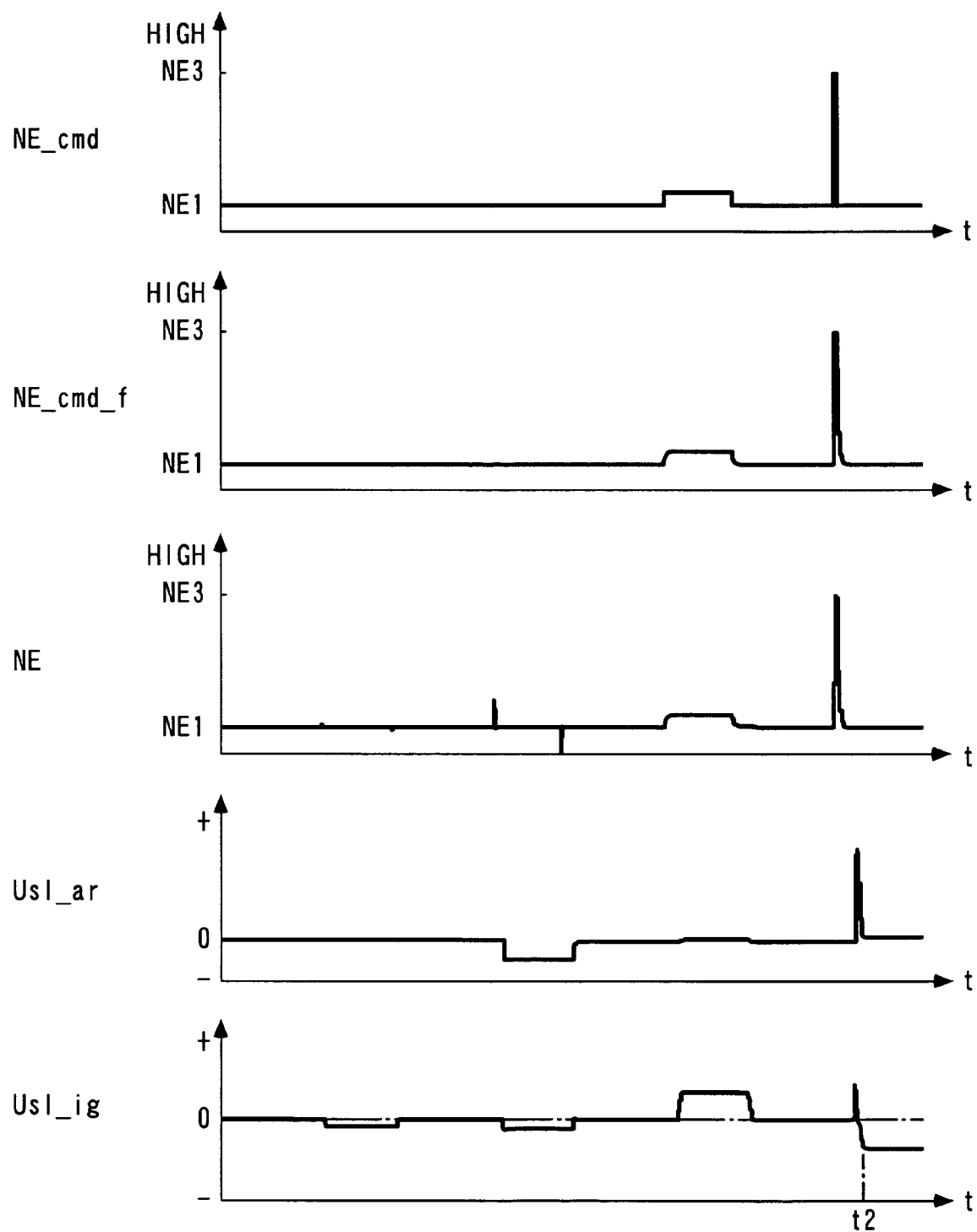
FIG. 19 is a timing diagram showing a result of a simulation of a comparative example of the idle engine speed control.

Further, FIG. 18 shows the results of a simulation of the idle engine speed control by the idle engine speed controller 70 according to the present embodiment. FIG. 19 shows the results of a simulation of a comparative example of the control for comparison with the FIG. 18 example, in which when the adaptive law input Uadp_ig is calculated by the ignition timing controller 80 of the idle engine speed controller 70, the forgetting coefficient FGT is set to 1, which means that the adaptive law input Uadp_ig is calculated through an ordinary integration process, without performing the forgetting integration process. It should be noted that in FIGS. 18 and 19, values on the positive side and the negative side of the ignition control input Usl_ig represent advance amounts and retard amounts, respectively, and values on the positive side and the negative side of the intake control input Usl_ar represent increasing correction amounts and decreasing correction amounts of the intake air amount, respectively.

First, referring to FIG. 19, it is apparent that in the idle engine speed control of the comparative example, in response to a slight variation in the target engine speed NE_cmd, the frequency of change in the ignition control input Usl_ig is higher than that of change in the intake control input Usl_ar. More specifically, it is apparent that since the ignition timing control is higher in resolution than the intake air amount control, the ignition timing control is mainly performed in the cooperative control of the ignition timing control and the intake air amount control. Further, it is apparent that when the target engine speed NE_cmd is temporarily and sharply changed between the target value NE1 and a target value NE3 (e.g. 1300 rpm) in a manner similar to the input of an impulse, e.g. due to an abrupt operation of the accelerator pedal, the ignition control input Usl_ig is retarded (time t2) so as to compensate for the change in the target engine speed NE_cmd, and kept retarded thereafter, resulting in the reduced combustion efficiency.

In contrast, as shown in FIG. 18, in the idle engine speed control according to the present embodiment, in response to a slight variation in the target engine speed NE_cmd, both the ignition control input Usl_ig and the intake control input Usl_ar are apparently frequently changed. More specifically, it is apparent that in the cooperative control of the ignition timing control and the intake air amount control, the mainly-performed control is frequently switched between the ignition timing control and the intake air amount control. Further, it is apparent that when the target engine speed NE_cmd is temporarily and sharply changed between the target value NE1 and a target value NE3 (e.g. 1300 rpm), although the ignition control input Usl_ig is retarded (time t1) so as to compensate for the change in the target engine speed NE_cmd, the ignition control input Usl_ig is progressively advanced toward a value of 0, thereby making it possible to avoid reduction of the combustion efficiency.

Figure 20:
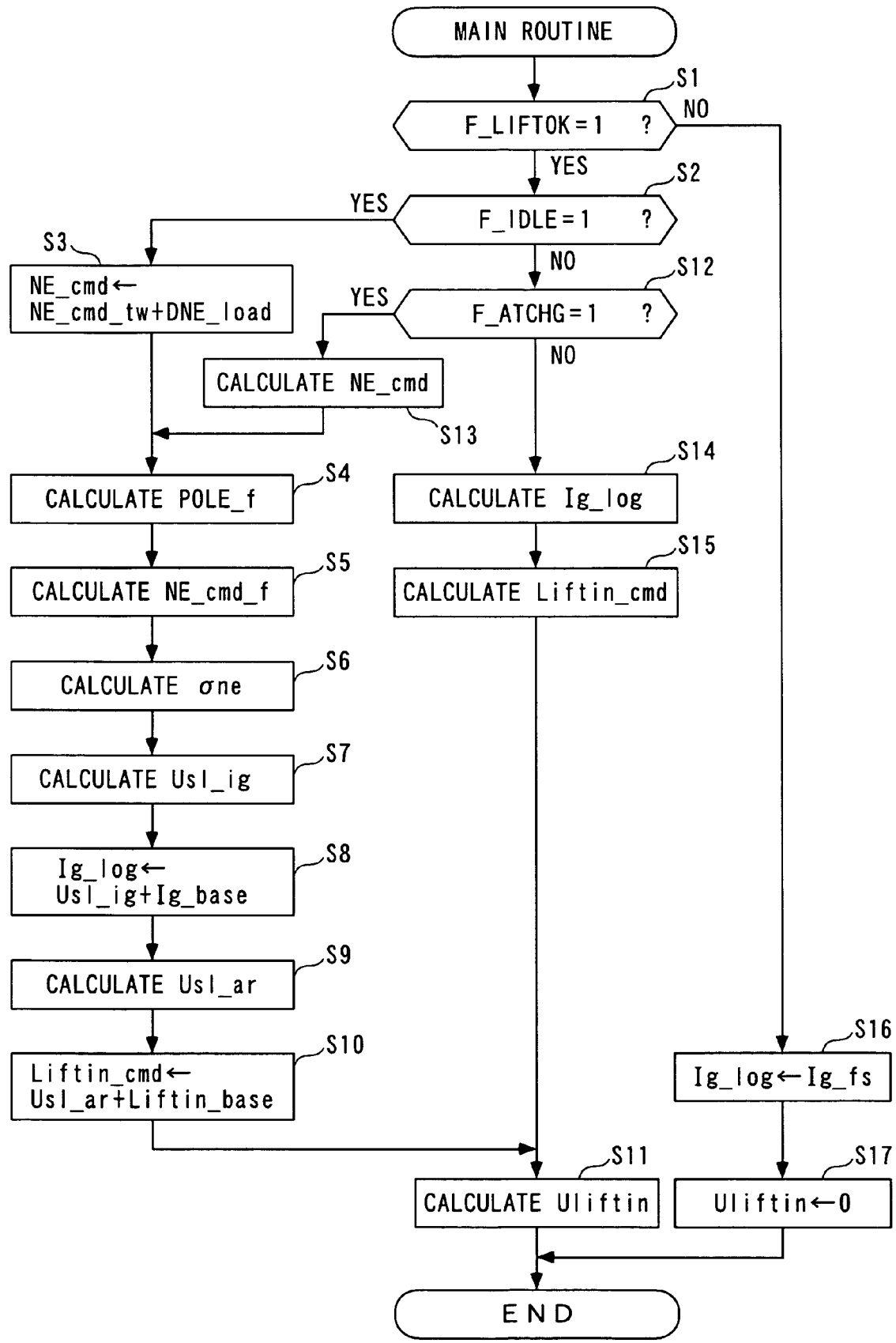
FIG. 20 is a flowchart showing details of an ignition timing control process and an intake air amount control process, including an idle engine speed control process.

Next, an ignition timing control process and an intake air amount control process, including an idle engine speed control process, executed by the ECU 2, will be described with reference to FIG. 20. A control process comprising these processes is carried out at a predetermined period set by a timer.

In this process, first, in a step 1 (shown as S1 in abbreviated form in FIG. 7; the following steps are also shown in abbreviated form), it is determined whether or not a lift normal flag F_LIFTOK is equal to 1. The lift normal flag F_LIFTOK is set to 1 when the variable valve lift mechanism 50 is normal, whereas when the variable valve lift mechanism 50 is faulty, it is set to 0.

If the answer to the question of the step 1 is affirmative (YES), i.e. if the variable valve lift mechanism 50 is normal, the process proceeds to a step 2, wherein it is determined whether or not an idling flag F_IDLE is equal to 1. When idling conditions are satisfied, i.e. when the following three conditions (f1) to (f3) are all satisfied, the idling flag F_IDLE is set to 1, and otherwise set to 0.

(f1) The accelerator pedal opening AP is equal to a value indicating a fully-closed state.

(f2) The vehicle speed VP is not larger than a predetermined value (e.g. 3 km).

(f3) The engine speed NE is not smaller than a predetermined value (e.g. 200 rpm)

If the answer to the question of the step 2 is affirmative (YES), it is judged that the idle engine speed control should be performed, and the process proceeds to a step 3, wherein the target engine speed NE_cmd for idling is set to the sum of the idling basic value NE_cmd_tw and the total correction term DNE_load. As described above, the idling basic value NE_cmd_tw is calculated by searching the FIG. 9 table according to the engine coolant temperature TW, and the total correction term DNE_load is calculated according to the ON/OFF states of the three switches 27 to 29.

Then, in a step 4, the target value filter-setting parameter POLE_f is calculated by searching the FIG. 10 table according to the difference absolute value ADNE, as described hereinbefore.

Next, in a step 5, the filtering value NE_cmd_f of the target engine speed is calculated by the aforementioned equation (1), and thereafter in a step 6, the switching function one is calculated by the aforementioned equations (2) and (3).

Figure 21:
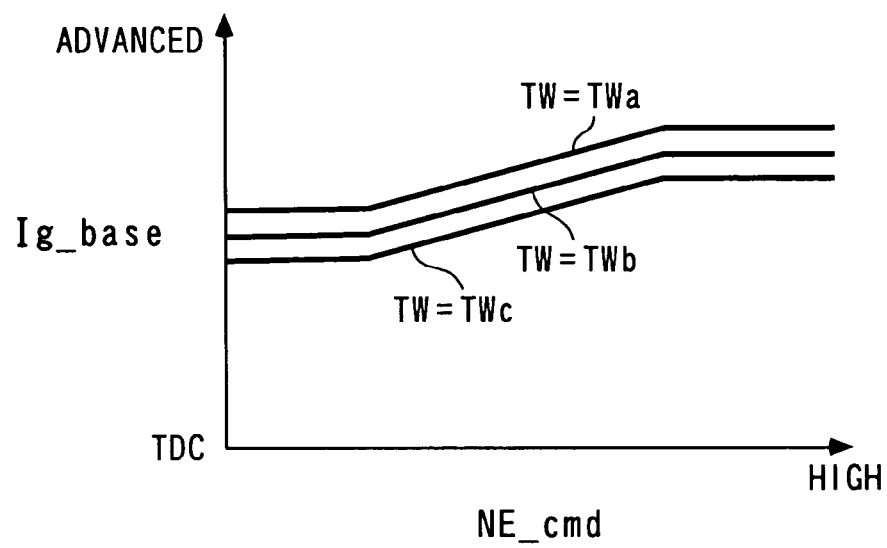
FIG. 21 is a diagram showing an example of a map used for calculation of an ignition basic value.

Then, in a step 7, the ignition control input Usl_ig is calculated by the above described equations (4) to (8). After that, the process proceeds to a step 8, wherein the ignition timing Ig_log is set to a value obtained by adding the ignition basic value Ig_base to the ignition control input Usl_ig calculated in the step 7. The ignition basic value Ig_base is calculated by searching a map shown in FIG. 21 according to the target engine speed NE_cmd and the engine coolant temperature TW. In FIG. 21, TWa to TWc represent predetermined values between which the relationship of TWa<TWb<TWc holds. This also applies to the following description.

As shown in FIG. 21, in this map, the ignition basic value Ig_base is set to a more advanced value as the target engine speed NE_cmd is higher or as the engine coolant temperature TW is lower. This is to cope with an increase in the amount of work required of the engine 3 because as the target engine speed NE_cmd is higher, the amount of work required of the engine 3 increases. Also, this is to cope with reduction of the combustion stability because as the engine coolant temperature TW is lower, the combustion stability of the engine 3 lowers.

In a step 9 following the step 8, the intake control input Usl_ar is calculated using the above-mentioned equations (9) to (12).

Then, the process proceeds to a step 10, wherein the target valve lift Liftin_cmd is set to a value obtained by adding the lift basic value Liftin_base to the intake control input Usl_ar determined in the above step 8. The lift basic value Liftin_base is calculated by searching a map shown in FIG. 22 according to the target engine speed NE_cmd and the engine coolant temperature TW.

Figure 22:
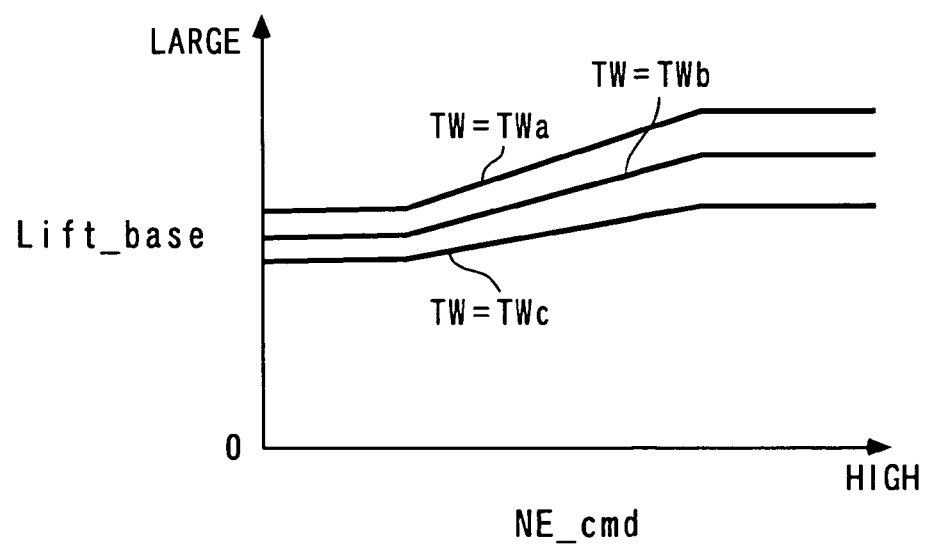
FIG. 22 is a diagram showing an example of a map used for calculation of a lift basic value.

As shown in FIG. 22, in its map, the lift basic value Liftin_base is set to a larger value as the target engine speed NE is higher or as the engine coolant temperature TW is lower. This is to cope with an increase in the amount of work required of the engine 3, because as the target engine speed NE_cmd is higher, the amount of work required of the engine 3 increases, as described above. Further, as the engine coolant temperature TW is lower, the combustion stability lowers, as described above, and the friction of the engine 3 increases, and hence the lift basic value Liftin_base is set as described above, to cope with the lowering combustion stability and increasing engine function.

Next, the process proceeds to a step 11, wherein the lift control input Uliftin is calculated with a target value filter-type two-degree-of-freedom sliding mode control algorithm as defined by equations (15) to (21) shown in FIG. 23 according to the valve lift Liftin and the target valve lift Liftin_cmd.

In the above equations (15) to (21), Liftin cmd_f represents a filtering value of the target valve lift, σli a switching function, Eli a follow-up error, Ueq_µl an equivalent control input, Urch_µl a reaching law input, Krch a reaching law gain, Uadp an adaptive law input, and Kadp an adaptive law gain, respectively. Further, POLE_f" represents a target value filter-setting parameter set such that the relationship of −1<POLE_f"<0 holds, and POLE" represents a switching function-setting parameter set such that −1<POLE"<0 holds. Furthermore, a1", a2", b1", and b2" represent model parameters of a model (not shown) defining the dynamic characteristics of the valve lift Liftin and the lift control input Uliftin.

The ignition timing Ig_log and the lift control input Uliftin used for the idle engine speed control are calculated, as described above, followed by terminating the process. As a result, the ignition timing control is carried out via the spark plug 13 in timing corresponding to the ignition timing Ig_log, and the intake valves 4 are actuated by the variable valve lift mechanism 50 such that the valve lift Liftin becomes equal to a valve lift corresponding to the lift control input Uliftin, whereby the intake air amount Gcyl is controlled.

On the other hand, if the answer to the question of the step 2 is negative (NO), i.e. if the idling conditions are not satisfied, the process proceeds to a step 12, wherein it is determined whether or not a transmission flag F_ATCHG is equal to 1. When an automatic transmission, not shown, is shifting gears, the transmission flag F_ATCHG is set to 1, and otherwise set to 0.

If the answer to the question of the step 12 is affirmative (YES), i.e. if the automatic transmission is shifting gears, in a step 13, the target engine speed NE_cmd is calculated according to the vehicle speed VP, a transmission ratio, and the slippage rate of a torque converter, not shown. Then, the steps 4 to 11 are carried out, as described above, followed by terminating the process.

On the other hand, if the answer to the question of the step 12 is negative (NO), i.e. if the automatic transmission is not shifting gears, the process proceeds to a step 14, wherein the ignition timing Ig_log is calculated by searching a map shown in FIG. 24 according to the target engine speed NE_cmd. In FIG. 24, AP1 to AP3 represent predetermined accelerator pedal openings AP between which the relationship of AP1<AP2<AP3 holds. This applies to the following descriptions. In this map, as the accelerator pedal opening AP is larger, the ignition timing Ig_log is set to a more retarded value, and except when the engine speed is in a medium rotational speed region where AP=AP3 holds, as the engine speed NE is higher, the ignition timing Ig_log is set to a more retarded value. This is because when the engine speed NE or the load on the engine 3 is higher, knocking becomes liable to occur, and hence to avoid the occurrence of knocking, it is necessary to retard the ignition timing Ig_log.

Then, in a step 15, the target valve lift Liftin_cmd is determined by searching a map shown in FIG. 25 according to the target engine speed NE_cmd and the accelerator pedal opening AP. In this map, as the accelerator pedal opening AP is larger or as the engine speed NE is higher, the target valve lift Liftin_cmd is set to a larger value. This is because when the engine speed NE or the load on the engine 3 is high, the valve lift Liftin, i.e. the intake air amount Gcyl is controlled to a larger value with a view to securing the output of the engine 3 corresponding to the high engine speed or the high load on the engine.

Next, as described hereinabove, the lift control input Uliftin is calculated in the step 11, followed by terminating the process.

On the other hand, if the answer to the question of the step 1 is negative (NO), i.e. if the variable valve lift mechanism 50 is faulty, the process proceeds to a step 16, wherein the ignition timing Ig_log is set to a failure time value Ig_fs. The failure time value Ig_fs is calculated with a predetermined feedback control algorithm such that the engine speed NE becomes equal to a predetermined failure time target engine speed NE_cmd_fs (e.g. 1500 rpm).

Then, in a step 17, the lift control input Uliftin is set to a value of 0, followed by terminating the process. As a result, the intake valves 4 are actuated by the variable valve lift mechanism 50 such that the valve lift Liftin becomes equal to the minimum value Liftinmin.

As described above, according to the control system 1 of the present embodiment, since the ignition control input Usl_ig and the intake control input Usl_ar are calculated with the target value filter-type two-degree-of-freedom sliding mode control algorithms, it is possible to set the follow-up responsiveness of the engine speed NE to the target engine speed NE_cmd, and the converging behavior and the convergence rate, separately from each other. This makes it possible to ensure excellent follow-up responsiveness of the engine speed NE to the target engine speed NE_cmd, and at the same time cause the engine speed NE to converge to the target engine speed NE_cmd without causing overshooting or oscillating behavior, thereby making it possible to stabilize the converging behavior of the engine speed NE to the target engine speed NE_cmd.

Moreover, since the ignition control input Usl_ig and the intake control input Usl_ar are calculated by sharing one filtering value NE_cmd_f between the target value filter-type two-degree-of-freedom sliding mode control algorithms, it is possible to avoid the ignition timing control process and the intake air amount control process from interfering with each other in the idle engine speed control. What is more, since the ignition control input Usl_ig and the intake control input Usl_ar are calculated by sharing one switching function σne, it is possible to more effectively avoid the ignition timing control process and the intake air amount control process from interfering with each other.

Further, the target value filter 81 sets the target value filter-setting parameter POLE_f to a larger value (value closer to a value of 0) as the difference absolute value ADNE is larger within the range of ADNE1≦ADNE≦ADNE2, whereby the degree of reflection of the target engine speed NE_cmd in the filtering value NE_cmd_f is increased, so that when the difference absolute value ADNE is large and hence the degree of change in the engine speed NE is large, the follow-up responsiveness of the engine speed NE to the target engine speed NE_cmd can be further enhanced accordingly.

Furthermore, in the calculation of the ignition control input Usl_ig, the adaptive law input Uadp_ig is calculated through the forgetting integration process of the switching function one, so that in the ignition timing control, the ignition timing Ig_log is prevented from being held in an excessively retarded state, whereby it is possible to ensure an excellent combustion state of the engine 3.

Further, the four gains Krch_ig, Kadp_ig, Krch_ar, and Kadp_ar are set by the cooperative gain scheduler 73, whereby when the absolute value of the switching function one is close to a value of 0, that is, as described hereinabove, when the difference between the follow-up behavior of the engine speed NE to the target engine speed NE_cmd, set by the target value filter 81, and the actual follow-up behavior thereof is small, and the difference between the converging behavior of the follow-up error Ene to a value of 0, designated by the switching function one, and the actual converging behavior thereof is small, it is possible to increase the degree of contribution of the ignition timing control to the idle engine speed control, and at the same time decrease the degree of contribution of the intake air amount control to the idle engine speed control. This makes it possible to enhance the resolution and control accuracy of the idle engine speed control. Inversely, when the absolute value of the switching function one is large, i.e. when the difference between the follow-up behavior set by the target value filter 81 and the actual follow-up behavior is large, and the difference between the converging behavior designated by the switching function one and the actual converging behavior is large, to enhance the response of the idle engine speed control, it is possible to increase the degree of contribution of the intake air amount control to the idle engine speed control, and at the same time decrease the degree of contribution of the ignition timing control to the idle engine speed control, thereby making it possible to enhance the response of the idle engine speed control. Thus, both the stability and the accuracy of the idle engine speed control can be improved.

Figure 26:
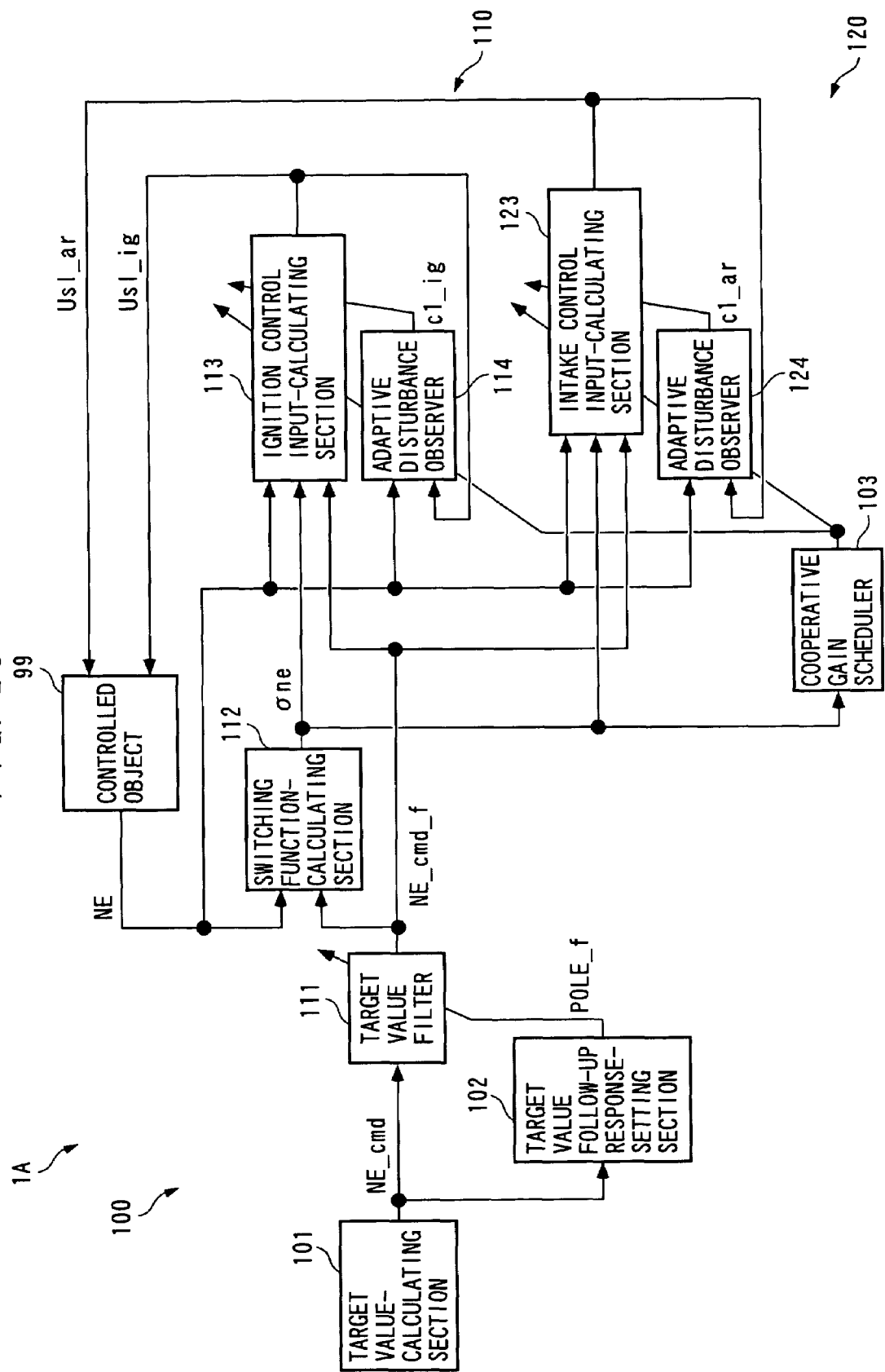
FIG. 26 is a block diagram schematically showing the configuration of an idle engine speed controller of a control system according to a second embodiment of the present invention.

Next, a control system 1A according to a second embodiment of the present invention will be described. The control system 1A is configured similarly to the control system 1 of the first embodiment described above, except for part thereof. Therefore, the following description will be mainly given of the different points from the control system 1 of the first embodiment. Referring to FIG. 26, the control system 1A includes an idle engine speed controller 100. The idle engine speed controller 100 (control input-calculating means) is formed specifically by the ECU 2.

As will be described hereinafter, the idle engine speed controller 100 calculates the ignition control input Usl_ig for controlling the ignition timing Ig_log and the intake control input Usl_ar for controlling the intake air amount Gcyl with cooperative two-degree-of-freedom sliding mode control algorithms, while making the intake air amount Gcyl and the ignition timing Ig_log cooperative with each other. The control inputs Usl_ig and Usl_ar are inputted to a controlled object 99, whereby the engine speed NE is feedback-controlled during idling of the engine 3 such that the engine speed NE converges to the target engine speed NE_cmd. It should be noted that the controlled object 99 is defined as a system to which are inputted the ignition control input Usl_ig and the intake control input Usl_ar, and from which is outputted the engine speed NE.

The idle engine speed controller 100 is comprised of a target value-calculating section 101 (target value-calculating means), a target value follow-up response-setting section 102 (filtering target value-calculating means), a cooperative gain scheduler 103, an ignition timing controller 110, and an intake air amount controller 120. The target value-calculating section 101 and the target value follow-up response-setting section 102 are configured similarly to the target value-calculating section 71 and the target value follow-up response-setting section 72 described hereinabove, and therefore description thereof is omitted.

The cooperative gain scheduler 103 sets the reaching law gain Krch_ig and an estimation gain P_ig, referred to hereinafter, for use in the calculation of the ignition control input Usl_ig, and the reaching law gain Krch_ar and an estimation gain P_ar, referred to hereinafter, for use in the calculation of the intake control input Usl_ar. Detailed description of the cooperative gain scheduler 103 will be given hereinafter.

Next, a description will be given of the ignition timing controller 110. As described hereinafter, the ignition timing controller 110 is provided for calculating the ignition control input Usl_ig with a target value filter-type two-degree-of-freedom sliding mode control algorithm with a disturbance-compensating function, and is comprised of a target value filter 111, a switching function-calculating section 112, an ignition control input-calculating section 113, and an adaptive disturbance observer 114.

The target value filter 111 (filtering target value-calculating means) calculates, similarly to the target value filter 81, described hereinbefore, the filtering value NE_cmd_f of the target engine speed by an equation (22) shown in FIG. 27. The switching function-calculating section 112 calculates, similarly to the switching function-calculating section 82, described hereinbefore, the switching function one by equations (23) and (24) shown in FIG. 27.

Further, the ignition control input-calculating section 113 calculates the equivalent control input Ueq_ig by an equation (25) shown in FIG. 27, the reaching law input Urch_ig by an equation (26) shown in the same, and the ignition control input Usl_ig by an equation (27) shown in the same. In the equation (25), a1, a2, b2, and b2 represent model parameters of a model [equation (37) in FIG. 28] described hereinafter. Further, c1_ig represents a disturbance estimation value for compensating for modeling errors and disturbance, and is calculated by the adaptive disturbance observer 114, as described hereinafter.

More specifically, the adaptive disturbance observer 114 (disturbance estimation value-calculating means) calculates an identified value NE_hat of the engine speed NE by an equation (28) shown in FIG. 27, a follow-up error e_dov_ig by an equation (29) shown in the same, and the disturbance estimation value c1_ig by an equation (30) shown in the same. In the equation (30), FGT_dov represents a forgetting coefficient, and is set to a value within a range of 0<FGT_dov<1. Further, P_ig represents an estimation gain, and is set as described hereinafter by the cooperative gain scheduler 103.

As expressed by the equation (30), the forgetting coefficient FGT_dov multiplies the immediately preceding value c1_ig (k−1) of the disturbance estimation value. Therefore, when the equation (30) is expanded by a recurrence formula thereof, a value c1_ig (k−n) calculated n times before is multiplied by FGT_dov" (≈0). As a result, in accordance with the progress of the arithmetic operations, the disturbance estimation value c1_ig converges to a value of 0. The disturbance estimation value c1_ig is thus calculated through the forgetting process, whereby the ignition control input Usl_ig is prevented from being held on a retarded side. As a result, the ignition timing Ig_log is prevented from being held in an excessively retarded state in the ignition timing control, whereby it is possible to ensure an excellent combustion state of the engine 3. It should be noted that when the ignition timing Ig_log may be held in the retarded state, the forgetting coefficient FGT_dov may be set to a value of 1 in the equation (30), as with a general adaptive disturbance observer.

As described above, the ignition timing controller 110 calculates the ignition control input Usl_ig with a target value filter-type two-degree-of-freedom sliding mode control algorithm with a disturbance-compensating function expressed by the equations (22) to (30). It should be noted that the above equations (22) to (30) are derived by defining a model representing the relationship between the dynamic characteristics of the engine speed NE and those of the ignition control input Usl_ig by an equation (37) in FIG. 28, and using this model, and the target value filter-type two-degree-of-freedom sliding mode control law and an adaptive disturbance observer theory.

Next, a description will be given of the intake air amount controller 120 mentioned above. The intake air amount controller 120 is provided for calculating the intake control input Usl_ar with a target value filter-type two-degree-of-freedom sliding mode control algorithm with a disturbance-compensating function, and comprised of the above-described target value filter 111, the above-described switching function-calculating section 112, an intake control input-calculating section 123, and an adaptive disturbance observer 124.

The intake control input-calculating section 123 calculates the equivalent control input Ueq_ar by an equation (31) shown in FIG. 28, the equivalent control input Ueq_ar by an equation (32) shown in the same, and the intake control input Usl_ar by an equation (33) shown in the same. In the equation (31), a1', a2', b1', and b2' represent model parameters of a model [equation (38) in FIG. 28] described hereinafter. Further, c1_ar represents a disturbance estimation value for compensating for modeling errors and disturbance, and is calculated by the adaptive disturbance observer 124 as will be described hereinafter.

More specifically, the adaptive disturbance observer 124 (disturbance estimation value-calculating means) calculates the identified value NE_hat of the engine speed NE by an equation (34) shown in FIG. 28, a follow-up error e_dov_ar by an equation (35) shown in the same, and the disturbance estimation value c1_ar by an equation (36) shown in the same. In the equation (36), P_ar represents an estimation gain, and is set as described hereinafter by the cooperative gain scheduler 103.

As described above, the intake air amount controller 120 calculates the intake control input Usl_ar with the target value filter-type two-degree-of-freedom sliding mode control algorithm with the disturbance-compensating function expressed by the equations (22) to (24) and (31) to (36). It should be noted that the above equations (22) to (24) and (31) to (36) are derived by defining a model representing the relationship between the dynamic characteristics of the engine speed NE and those of the intake control input Usl_ar by the equation (38) in FIG. 28, and using this model, and the target value filter-type two-degree-of-freedom sliding mode control law and the adaptive disturbance observer theory.

Next, a description will be given of the cooperative gain scheduler 103. The cooperative gain scheduler 103 calculates the above-mentioned four gains Krch_ig, P_ig, Krch_ar, and P_ar by searching tables shown in FIGS. 29 and 30 according to the switching function σne. It should be noted that σ3 and σ4 shown in FIGS. 29 and 30 represent positive predetermined values between which the relationship of σ3<σ4 holds.

Figure 29:
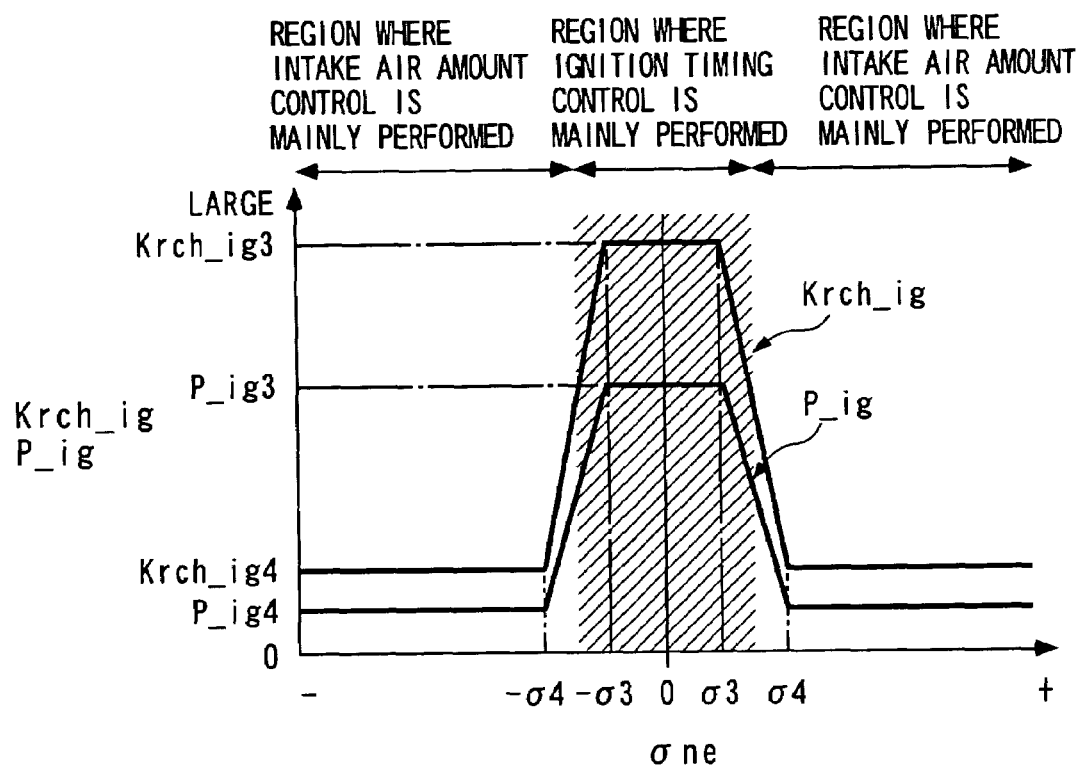
FIG. 29 is a diagram showing an example of a table used for calculation of a reaching law gain and an estimation gain for ignition timing control.

First, referring to the FIG. 29 table, the reaching law gain Krch_ig and the estimation gain P_ig have values set to be symmetrical on the positive side and the negative side of the witching function σne. In ranges of −σ4<σne<−σ3, and σ3<σne<σ4, they are set to larger values as the absolute value of σne becomes smaller. Further, the reaching law gain Krch_ig and the estimation gain P_ig are set to respective maximum values Krch_ig3 and P_ig3 in a predetermined range (−σ3≦σne≦σ3) around a value of 0, and in ranges of σne≦σ4 and σ4≦σne, they are set to respective minimum values Krch_ig4 and P_ig4.

Figure 30:
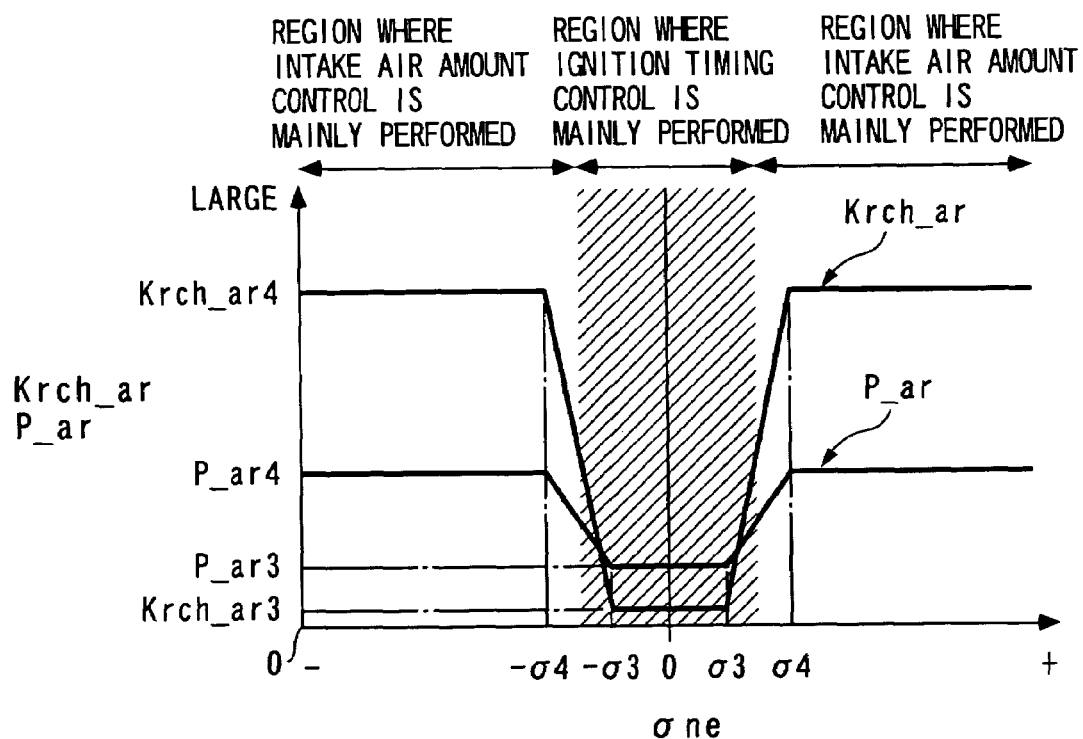
FIG. 30 is a diagram showing an example of a table used for calculation of a reaching law gain and an estimation gain for intake air amount control.

On the other hand, referring to a table sown in FIG. 30, the reaching law gain Krch_ar and the estimation gain P_ar have values set to be symmetrical on the positive side and the negative side of the witching function σne. In the ranges of −σ4<σne<−σ3 and σ3<σne<σ4, they are set to smaller values as the absolute value of σne becomes smaller. Further, the reaching law gain Krch_ar and estimation gain P_ar are set to respective minimum values Krch_ar3 and P_ar3 in a predetermined range (−σ3≦σne≦σ3) around a value of 0, and in the ranges of σne≦−σ4 and σ4≦σne, they are set to respective maximum values Krch_ar4 and P_ar4.

The values of the gains are set as above for the same reasons given in the description of the cooperative gain scheduler 73. More specifically, when the absolute value of the switching function σne is close to a value of 0, the degree of deviation of the engine speed NE from the target engine speed NE_cmd is small. Therefore, to enhance the resolution and control accuracy of the idle engine speed control, the values of the gains are set as above to increase the degree of contribution of the ignition timing control to the idle engine speed control and at the same time decrease the degree of contribution of the intake air amount control to the idle engine speed control. Inversely, when the absolute value of the switching function σne is large, the follow-up error σne is largely changed and the degree of deviation of the engine speed NE from the target engine speed NE_cmd is large. Therefore, to enhance the response of the idle engine speed control, the values of the gains are set as above to increase the degree of contribution of the intake air amount control to the idle engine speed control and at the same time decrease the degree of contribution of the ignition timing control to the idle engine speed control.

For the reasons described above, in the case of the cooperative control of the ignition timing control and the intake air amount control in the present embodiment, the ignition timing control is mainly performed in the region indicated by hatching in FIGS. 29 and 30, and the intake air amount control is mainly performed in the other regions.

According to the control system 1A of the present embodiment, configured as above, it is possible to obtain the same advantageous effects as provided by the control system 1 according to the first embodiment. Further, the reaching law gains Krch_ig and Krch_ar and the estimation gains P_ig and P_ar are set by the cooperative gain scheduler 103, whereby when the degree of deviation of the engine speed NE from the target engine speed NE_cmd is small, it is possible to increase the degree of contribution of the ignition timing control to the idle engine speed control and at the same time decrease the degree of contribution of the intake air amount control to the idle engine speed control, thereby making it possible to enhance the resolution and control accuracy of the idle engine speed control. Inversely, when the degree of deviation of the engine speed NE from the target engine speed NE_cmd is large, to enhance the response of the idle engine speed control, it is possible to increase the degree of contribution of the intake air amount control to the idle engine speed control and at the same time decrease the degree of contribution of the ignition timing control to the idle engine speed control, thereby making it possible to enhance the response of the idle engine speed control. What is more, since the ignition control input Usl_ig and the intake control input Usl_ar are calculated using the disturbance estimation values c1_ig and c1_ar which have been calculated by the adaptive disturbance observers 114 and 124, respectively, it is possible to perform the idle engine speed control while avoiding adverse influence of modeling errors and disturbance. This makes it possible to further improve the stability and the accuracy of the idle engine speed control than in the control system 1 according to the first embodiment.

Figure 31:
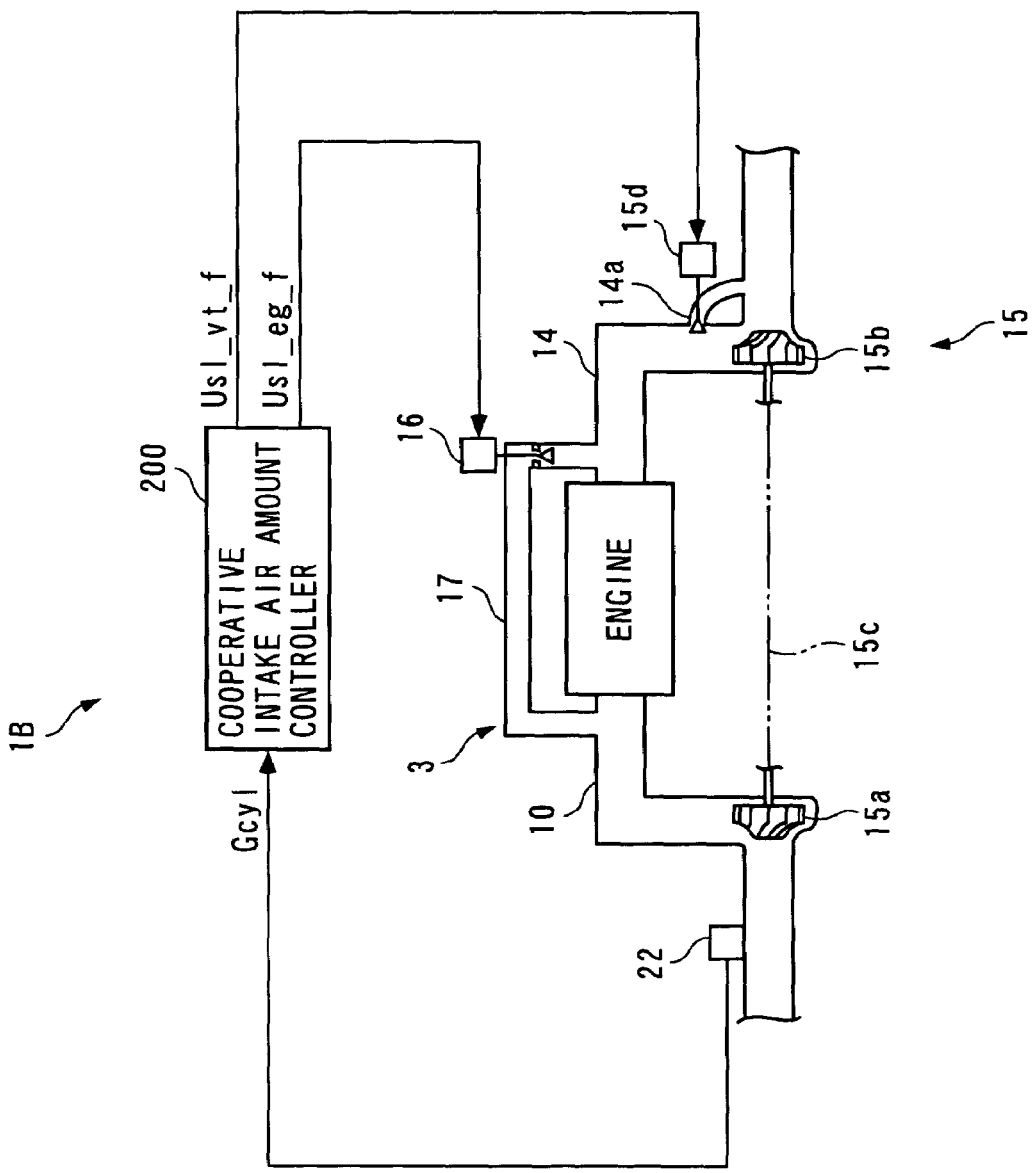
FIG. 31 is a diagram schematically showing the arrangement of a control system according to a third embodiment of the present invention and an internal combustion engine to which is applied the control system.

Next, a control system 1B according to a third embodiment of the present invention will be described with reference to FIG. 31. The control system 1B is provided for controlling the intake air amount Gcyl (output of a controlled object) by cooperative control of EGR control and boost pressure control, and includes a cooperative intake air amount controller 200 (control input-calculating means) which will be described hereinafter. An engine 3 to which the control system 1B is applied is configured similarly to the engine 3 to which the first embodiment is applied, except for part thereof, and hence component elements of the engine 3 identical to those of the engine 3 to which the first embodiment is applied are designated by identical reference numerals, detailed description thereof being omitted. The engine 3 includes a turbocharger system 15 and an EGR control valve 16.

The turbocharger system 15 is comprised of a compressor blade 15a housed in a compressor housing provided in an intermediate portion of the intake pipe 10, a turbine blade 15b housed in a turbine housing provided in an intermediate portion of an exhaust pipe 14, a shaft 15c integrally formed with the two blades 15a and 15b for connection thereof, and a wastegate valve 15d.

In the turbocharger system 15, when the turbine blade 15b is driven for rotation by exhaust gases flowing through the exhaust pipe 14, the compressor blade 15a integrally formed with the turbine blade 15b is also rotated, whereby intake air within the intake pipe 19 is pressurized, that is, supercharging is carried out.

Further, the wastegate valve 15d is provided for opening and closing a bypass exhaust passage 14a that bypasses the turbine blade 15b disposed across the exhaust pipe 14, and implemented by a solenoid control valve connected to the ECU 2. The wastegate valve 15d changes the degree of opening thereof in response to a drive signal representative of a final boost pressure control input Usl_vt_f, described hereinafter, supplied from the ECU 2, to thereby change the flow rate of exhaust gases flowing through the bypass exhaust passage 14a, in other words, the flow rate of exhaust gases for driving the turbine blade 15b, thereby changing the boost pressure. Thus, the boost pressure is controlled.

Further, the EGR control valve 16 is provided for opening and closing an EGR passage 17 extending between the intake pipe 10 and the exhaust pipe 14 to thereby performed EGR in which exhaust gases are recirculated from the exhaust pipe 14 to the intake pipe 10. The EGR control valve 16 is implemented by a linear solenoid valve, and connected to the ECU 2. In response to a drive signal representative of a final EGR control input Usl_eg_f, described hereinafter, inputted from the ECU 2, the EGR control valve 16 linearly changes a valve lift thereof, whereby the EGR amount is controlled.

Figure 32:
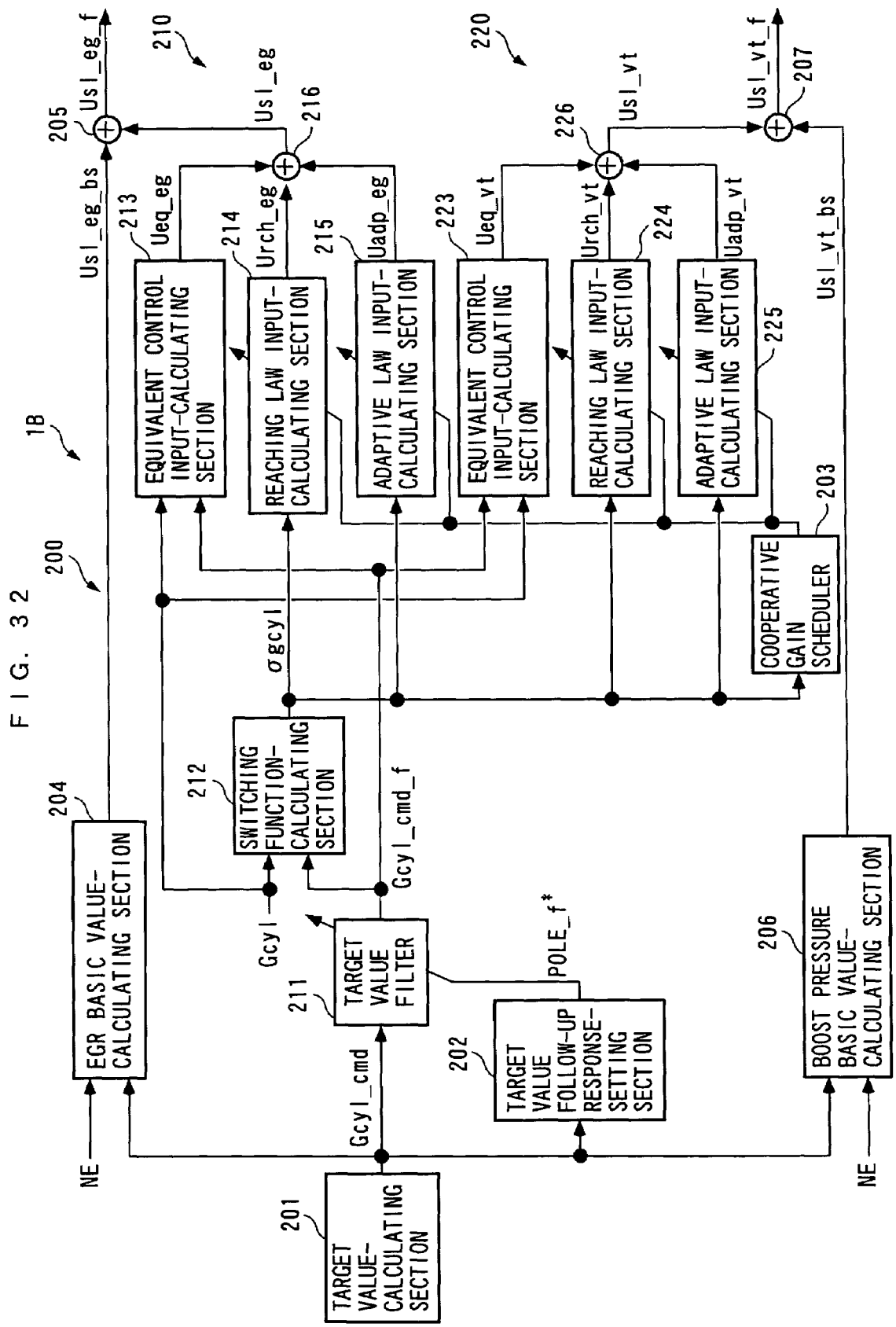
FIG. 32 is a block diagram schematically showing the configuration of a cooperative intake air amount controller.

Next, the cooperative intake air amount controller 200 will be described with reference to FIG. 32. As referred to hereinafter, the cooperative intake air amount controller 200 is provided for feedback controlling the EGR amount and the boost pressure while making them cooperative with each other, with a control algorithm based on cooperative two-degree-of-freedom sliding mode control algorithms, to thereby feedback control the intake air amount Gcyl such that the intake air amount Gcyl converges to a target intake air amount Gcyl_cmd.

The cooperative intake air amount controller 200 is comprised of a target value-calculating section 201 (target value-calculating means), a target value follow-up response-setting section 202 (filtering target value-calculating means), a cooperative gain scheduler 203, an EGR basic value-calculating section 204, an addition element 205, a boost pressure basic value-calculating section 206, an addition element 207, an EGR controller 210, and a boost pressure controller 220.

Figure 33:
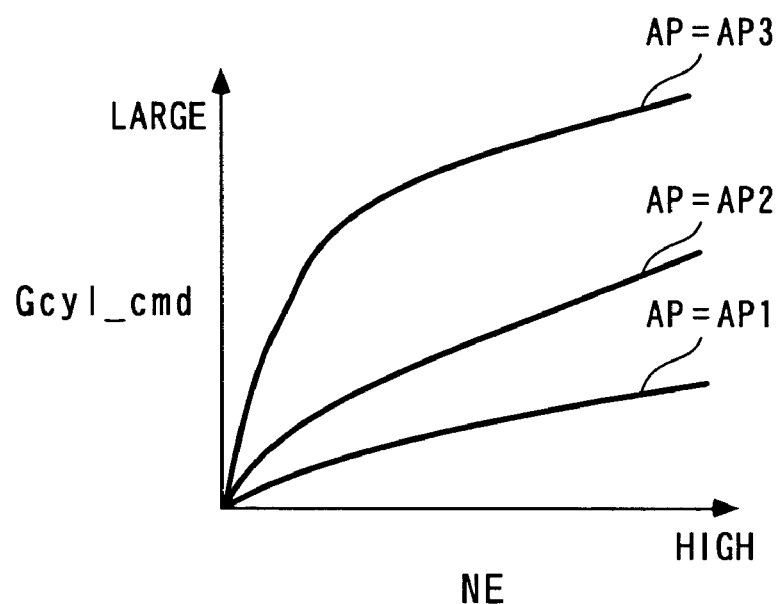
FIG. 33 is a diagram showing an example of a map used for calculation of a target intake air amount.

First, the target value-calculating section 201 calculates the target intake air amount Gcyl_cmd, which is a target value of the intake air amount Gcyl. More specifically, the target value-calculating section 201 calculates the target intake air amount Gcyl_cmd by searching a map shown in FIG. 33 according to the accelerator pedal opening AP and the engine speed NE. In this map, as the engine speed NE is higher or as the accelerator pedal openings AP is larger, the target intake air amount Gcyl_cmd is set to a larger value. This is because as the engine speed NE is higher or as the accelerator pedal openings AP is larger, the engine 3 is in a higher-load region and hence a larger intake air amount is required. It should be noted that in the present embodiment, the accelerator pedal openings AP and the engine speed NE correspond to the state of a controlled object.

Then, the target value follow-up response-setting section 202 calculates a target value filter-setting parameter POLE_f*, similarly to the target value follow-up response-setting section 72 described hereinabove. The target value filter-setting parameter POLE_f* is for setting the follow-up responsiveness of the intake air amount Gcyl to the target intake air amount Gcyl_cmd, and is calculated specifically by searching a table shown in FIG. 34 according to a difference absolute value ADGCYL (degree of change in the target value). The difference absolute value ADGCYL is calculated as the absolute value of the difference between the current value Gcyl_cmd(k) and the immediately preceding value Gcyl_cmd(k−1) of the target intake air amount (ADGCYL=|Gcyl_cmd(k)−Gcyl_cmd(k−1)|). Further, ADGCYL1 and ADGCYL2 in FIG. 34 are predetermined values between which the relationship of ADGCYL1<ADGCYL2 holds, and POLE_f1* and POLE_f2 are predetermined values between which the relationship of POLE_f1*<POLE_f2* holds.

Figure 34:
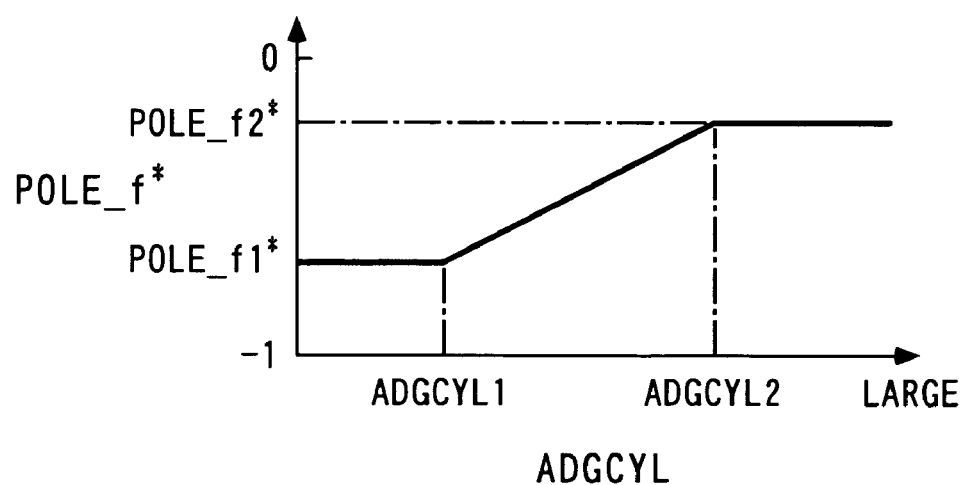
FIG. 34 is a diagram showing an example of a table used for calculation of a target value filter-setting parameter.

As shown in FIG. 34, in the above table, within a range of ADGCYL1≦ADGCYL≦ADGCYL2, the target value filter-setting parameter POLE_f* is set to a larger value (value closer to a value of 0) as the difference absolute value ADGCYL is larger. This is because in the calculation of a target value filter 211 by a filtering value Gcyl_cmd_f, the target value filter-setting parameter POLE_f is used so as to set the follow-up responsiveness of the intake air amount Gcyl to the target intake air amount Gcyl_cmd, and hence when the difference absolute value ADGCYL is large and the degree of change in the intake air amount Gcyl is large, to cope with these conditions, the degree of reflection of the target intake air amount Gcyl_cmd in the filtering value Gcyl_cmd_f is increased to thereby further improve the follow-up responsiveness of the intake air amount Gcyl to the target intake air amount Gcyl_cmd.

Further, within ranges of ADGCYL<ADGCYL1 and ADGCYL2<ADGCYL, the target value filter-setting parameter POLE_f* is set to respective predetermined values POLE_f1* and POLE_f2* irrespective of the difference absolute value ADGCYL. This is because when the degree of change in the intake air amount Gcyl is considerably small or considerably large, there is a limit to enhancing the follow-up responsiveness of the intake air amount Gcyl to the target intake air amount Gcyl_cmd by setting the target value filter-setting parameter POLE_f.

Further, the cooperative gain scheduler 203 calculates, similarly to the above described cooperative gain scheduler 73, a reaching law gain Krch_eg and an adaptive law gain Kadp_eg, for use in the calculation of an EGR control input Usl_eg, and a reaching law gain Krch_vt and an adaptive law gain Kadp_vt, for use in the calculation of a boost pressure control input Usl_vt. More specifically, the four gains Krch_eg, Kadp_eg, Krch_vt, and Kadp_vt are calculated by searching tables shown in FIGS. 35 and 36 according to the value of a switching function σgcyl, described hereinafter. It should be noted that σg1 and σg2 in FIGS. 35 and 36 represent positive values between which the relationship of σg1<σg2 holds.

Figure 35:
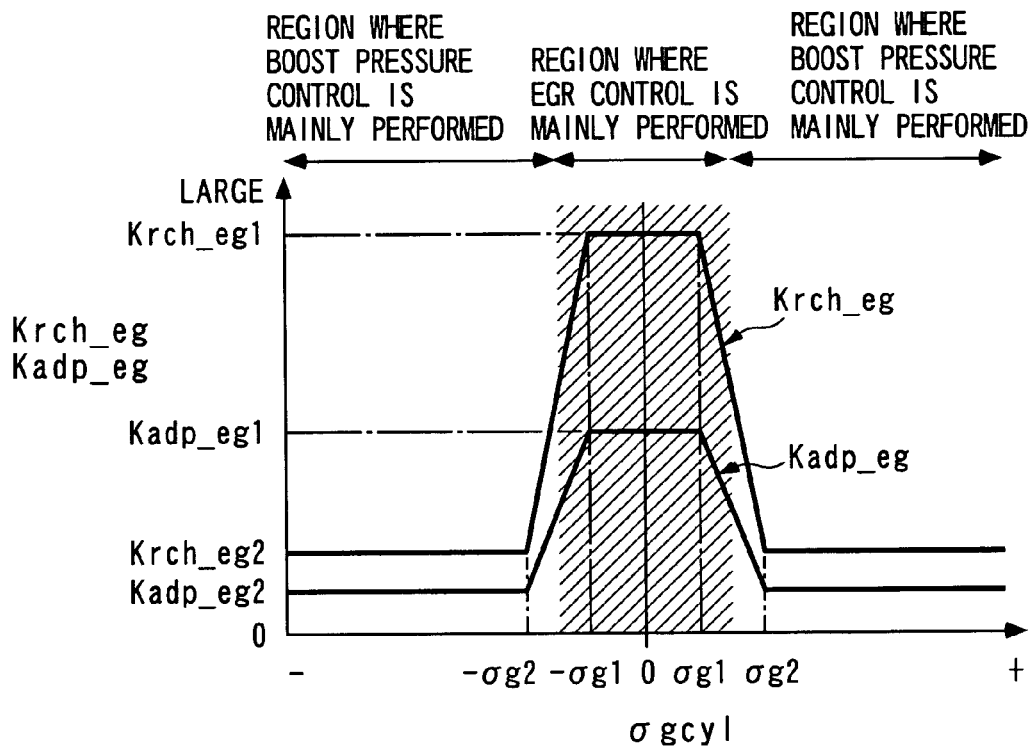
FIG. 35 is a diagram showing an example of a table used for calculation of a reaching law gain and an adaptive law gain for EGR control.

First, referring to the FIG. 35 table, the reaching law gain Krch_eg and adaptive law gain Kadp_eg have values set to be symmetrical on the positive side and the negative side of the witching function σgcyl. They are set to respective predetermined maximum values Krch_eg1 and Kadp_eg1 in a range of −σg1<σgcyl<σg1 around a value of 0, and in ranges of σgcyl<−σg2 and σg2<σgcyl, they are set to respective predetermined minimum values Krch_eg2 and Kadp_eg2. Further, in ranges of −σg2≦σgcyl≦−σg1 and σg1≦σgcyl≦σg2, they are set to larger values as the absolute value of σgcyl becomes smaller.

Figure 36:
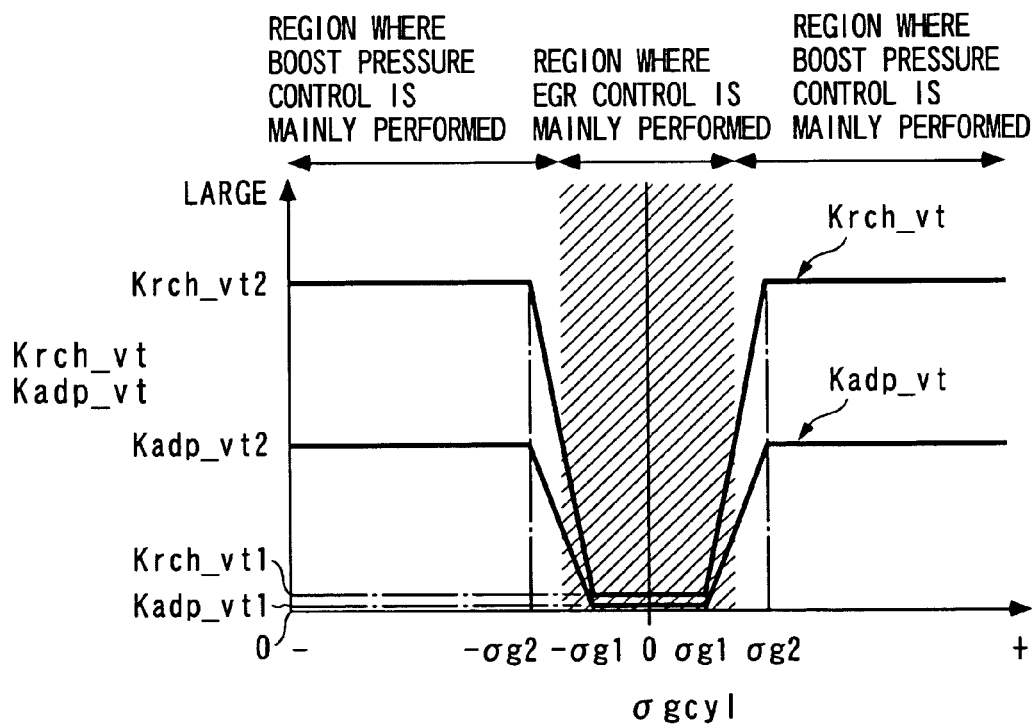
FIG. 36 is a diagram showing an example of a table used for calculation of a reaching law gain and an adaptive law gain for boost pressure control.

On the other hand, referring to the FIG. 36 table, the reaching law gain Krch_vt and adaptive law gain Kadp_vt have values set to be symmetrical on the positive side and the negative side of the witching function σgcyl. They are set to respective predetermined minimum values Krch_vt1 and Kadp_vt1 in the range of −σg1<σgcyl<σg1 around a value of 0, and in the ranges of σgcyl<−σg2 and σg2<σgcyl, they are set to respective predetermined maximum values Krch_vt2 and Kadp_vt2. Further, in the ranges of −σg2≦σgcyl≦−σg1 and σg1≦σgcyl≦σg2, they are set to smaller values, as the absolute value of σgcyl becomes smaller.

The values of the four gains Krch_eg, Kadp_eg, Krch_vt, and Kadp_vt are thus set because: The EGR control has the feature that it is high in the resolution of control (small in the degree of change in the intake air amount Gcyl with respect to the minimum EGR control input Usl_eg), but it is limited in the range of control with a view to avoiding degradation of the combustion state of the engine 3. On the other hand, the boost pressure control has the feature that it is lower in the resolution of control than the EGR control, and capable of coping with a large change in the target intake air amount Gcyl_cmd, but it is lower in the control accuracy of the intake air amount Gcyl than the EGR control, and hence the boost pressure control is inferior to the EGR control in the convergence of the intake air amount Gcyl to the target intake air amount Gcyl_cmd.

Therefore, when the absolute value of the switching function σgcyl is close to a value of 0, the degree of deviation of the intake air amount Gcyl from the target intake air amount Gcyl_cmd is small. Therefore, to enhance the resolution and control accuracy of the intake air amount control, the four gains are set as above to increase the degree of contribution of the EGR control to the intake air amount control and at the same time decrease the degree of contribution of the boost pressure control to the intake air amount control. Inversely, when the absolute value of the switching function σgcyl is large, the follow-up error Egcyl is largely changed and the degree of deviation of the intake air amount Gcyl from the target intake air amount Gcyl_cmd is large. Therefore, to enhance the response of the intake air amount control, the four gains are set as above to increase the degree of contribution of the boost pressure control to the intake air amount control and at the same time decrease the degree of contribution of the EGR control to the intake air amount control.

For the above reasons, in the case of the cooperative control of the EGR control and the intake air amount control by the cooperative intake air amount controller 200 according to the present embodiment, the EGR control is mainly performed in the region indicated by hatching in FIGS. 35 and 36, and the boost pressure control is mainly performed is the other regions.

Next, a description will be given of the aforementioned EGR controller 210. As will be described hereinafter, the EGR controller 210 is provided for calculating the EGR control input Usl_eg with a target value filter-type two-degree-of-freedom sliding mode control algorithm, and comprised of the target value filter 211, a switching function-calculating section 212, an equivalent control input-calculating section 213, a reaching law input-calculating section 214, an adaptive law input-calculating section 215, and an addition element 216.

The target value filter 211 (filtering target value-calculating means) calculates, similarly to the target value filter 81 described hereinabove, the filtering value Gcyl_cmd_f (filtering target value) of the target intake air amount with a first-order lag filter algorithm shown in an equation (39) in FIG. 37, using the target intake air amount Gcyl_cmd calculated by the target value-calculating section 201 and the target value filter-setting parameter POLE_f* set by the target value follow-up response-setting section 202.

Further, the switching function-calculating section 212 calculates, similarly to the switching function-calculating section 82 described hereinabove, the switching function (linear function) σgcyl by equations (40) and (41) shown in FIG. 37. In the equation (40), POLE* represents a switching function-setting parameter, and is set to a value within a range of −1<POLE*<0. Further, Egcyl represents a follow-up error which is defined by the equation (41).

Furthermore, the equivalent control input-calculating section 213 calculates the equivalent control input Ueq_ig by an equation (42) shown in FIG. 37, based on the intake air amount Gcyl, the filtering value Gcyl_cmd_f, and the switching function-setting parameter POLE*. In the equation (42), a1*, a2*, b1*, and b2* represent model parameters of a model [equation (53) in FIG. 38] described hereinafter.

On the other hand, the reaching law input-calculating section 214 calculates a reaching law input Urch_eg by an equation (43) in FIG. 37, using the reaching law gain Krch_eg set by the cooperative gain scheduler 203.

The adaptive law input-calculating section 215 calculates a forgetting integral value sum_σgcyl of the switching function (integral value of the linear function) through a forgetting integration process expressed by an equation (44) in FIG. 37, and further, an adaptive law input Uadp_eg by an equation (45), using the forgetting integral value sum_σgcyl and the adaptive law gain Kadp_eg set by the cooperative gain scheduler 203. In the equation (44), FGT_eg represents a forgetting coefficient which is set to a value within a range of 0<FGT_eg<1.

By performing the above forgetting integration process, in accordance with the progress of the arithmetic operations, the forgetting integral value sum_σgcyl of the switching function converges to a value of 0, and the adaptive law input Uadp_eg as well converges to a value of 0, as described hereinabove. The forgetting integration process is thus employed in the calculation of the adaptive law input Uadp_eg because: It is desirable to control the EGR amount to an appropriate value dependent on an operating region of the engine 3 with as high accuracy as possible, with a view to reduction of the amount of NOx emission and enhancement of the fuel economy, and hence the forgetting integration process is employed to avoid occurrence of a state where the EGR amount is deviated from the appropriate value for a long time period to thereby quickly control the EGR amount to the appropriate value. It should be noted that when the EGR amount may be held at a fixed amount, the forgetting coefficient FGT_eg may be set to a value of 1 in the equation (44) to calculate the adaptive law input Uadp_eg based on a general integral value of the switching function σgcyl, as with a general sliding mode control algorithm.

Furthermore, the addition element 216 calculates the EGR control input Usl_eg by an equation (46) in FIG. 37, using the equivalent control input Ueq_eg, the reaching law input Urch_eg, and the adaptive law input Uadp_eg, calculated as above.

As described above, the EGR control input Usl_eg is calculated with the target value filter-type two-degree-of-freedom sliding mode control algorithm expressed by the equations (39) to (46). It should be noted that the above equations (39) to (46) are derived by defining a model representing the relationship between the dynamic characteristics of the intake air amount Gcyl and those of the EGR control input Usl_eg by the equation (53) in FIG. 38, and using this model and the target value filter-type two-degree-of-freedom sliding mode control law such that the intake air amount Gcyl converges to the target intake air amount Gcyl_cmd.

Figure 39:
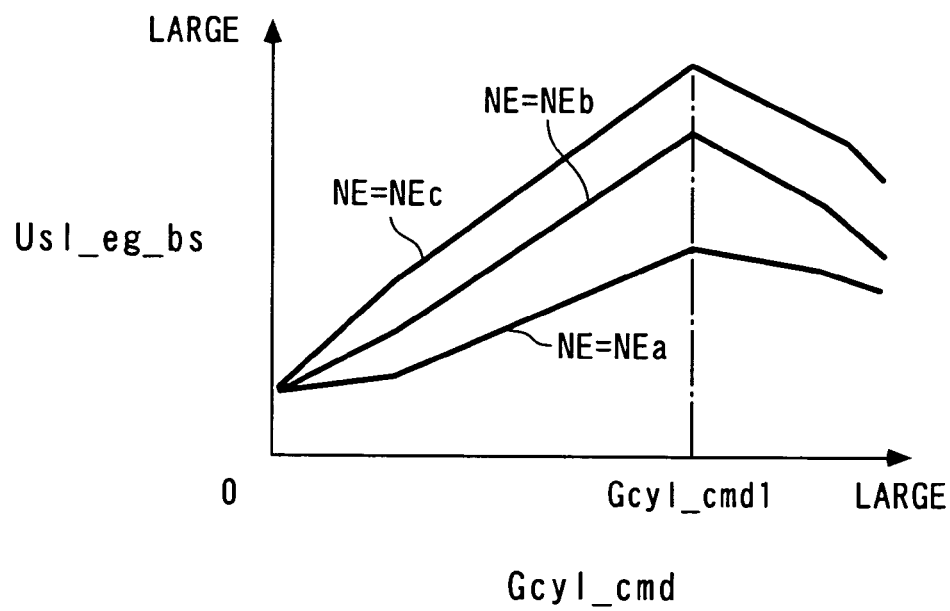
FIG. 39 is a diagram showing an example of a map used for calculation of an EGR basic value.

On the other hand, the aforementioned EGR basic value-calculating section 204 calculates an EGR basic value Usl_eg_bs by searching a map shown in FIG. 39 according to the engine speed NE and the target intake air amount Gcyl_cmd. As shown in FIG. 39, in this map, the EGR basic value Usl_eg_bs is set to a larger value as the engine speed NE is higher. Further, in a range where the target intake air amount Gcyl_cmd is not larger than a predetermined value Gcyl_cmd1, the EGR basic value Usl_eg_bs is set to a larger value as the target intake air amount Gcyl_cmd is larger, whereas in a range where the target intake air amount Gcyl_cmd is larger than the predetermined value Gcyl_cmd1, the EGR basic value Usl_eg_bs is set to a smaller value as the target intake air amount Gcyl_cmd is larger.

The EGR basic value Usl_eg_bs is thus set: in the low-load region of the engine 3, so as to control the EGR amount to a small value with a view to avoiding the combustion state of the engine 3 from becoming unstable; in the high-load region of the engine 3, so as to control the EGR amount to a small value with a view to ensuring the output of the engine 3; and in the medium-load region of the engine 3, so as to control the EGR amount to a large value with a view to reduction of the amount of NOx emission and improvement of fuel economy.

Furthermore, the aforementioned addition element 205 calculates the final EGR control input Usl_eg_f by an equation (47) in FIG. 37, using the EGR control input Usl_eg and the EGR basic value Usl_eg_bs, calculated as above.

Next, a description will be given of the above-mentioned boost pressure controller 220. As will be described hereinafter, the boost pressure controller 220 is provided for calculating the boost pressure control input Usl_vt with a target value filter-type two-degree-of-freedom sliding mode control algorithm, and comprised of the above-described target value filter 211, the above-described switching function-calculating section 212, an equivalent control input-calculating section 223, a reaching law input-calculating section 224, an adaptive law input-calculating section 225, and an addition element 226. More specifically, the boost pressure controller 220 shares the target value filter 211 and the switching function-calculating section 212 with the EGR controller 210, to thereby calculate the boost pressure control input Usl_vt while sharing the filtering value Gcyl_cmd_f of the target intake air amount and the switching function σgcyl with the EGR controller 210.

Further, the equivalent control input-calculating section 223 calculates an equivalent control input Ueq_vt by an equation (48) in FIG. 38, using the intake air amount Gcyl, the filtering value Gcyl_cmd_f, and the switching function-setting parameter POLE*. In the equation (48), $a1^{\#}$, $a2^{\#}$, $b1^{\#}$, and $b2^{\#}$ represent model parameters of a model [equation (54) in FIG. 38] described hereinafter.

On the other hand, the reaching law input-calculating section 224 calculates a reaching law input Urch_vt by an equation (49) in FIG. 38, using the reaching law gain Krch_vt set by the cooperative gain scheduler 203.

The adaptive law input-calculating section 225 calculates an adaptive law input Uadp_vt calculated by an equation (50) in FIG. 38, using the adaptive law gain Kadp_vt set by the cooperative gain scheduler 203.

Further, the addition element 226 calculates the boost pressure control input Usl_vt by an equation (51) in FIG. 38, using the equivalent control input Ueq_vt, the reaching law input Urch_vt, and the adaptive law input Uadp_vt, calculated as above.

As described above, in the boost pressure controller 220, the boost pressure control input Usl_vt is calculated with a target value filter-type two-degree-of-freedom sliding mode control algorithm expressed by the equations (39) to (41) and (48) to (51). It should be noted that the above equations (39) to (41) and (48) to (51) are derived by defining a model representing the relationship between the dynamic characteristics of the intake air amount Gcyl and those of the boost pressure control input Usl_vt by the equation (54) in FIG. 38, and using this model and the target value filter-type two-degree-of-freedom sliding mode control law such that the intake air amount Gcyl converges to the target intake air amount Gcyl_cmd.

Figure 40:
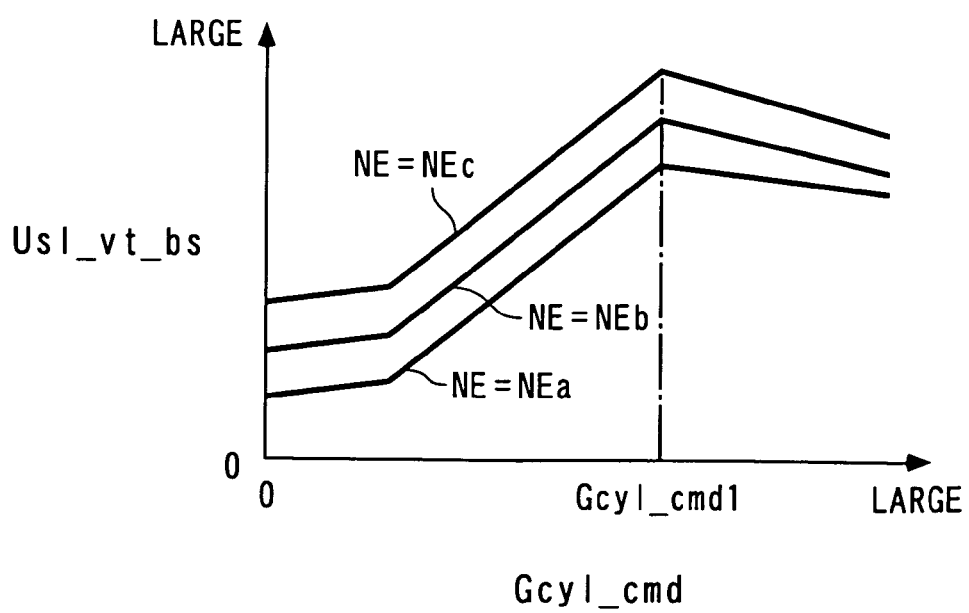
FIG. 40 is a diagram showing an example of a map used for calculation of a boost pressure basic value.

On the other hand, the aforementioned boost pressure basic value-calculating section 206 calculates a boost pressure basic value Usl_vt_bs by searching a map shown in FIG. 40 according to the engine speed NE and the target intake air amount Gcyl_cmd. As shown in FIG. 40, in this map, the boost pressure basic value Usl_vt_bs is set to a larger value as the engine speed NE is higher. Further, in a range where the target intake air amount Gcyl_cmd is not larger than the predetermined value Gcyl_cmd1, the boost pressure basic value Usl_vt_bs is set to a larger value as the target intake air amount Gcyl_cmd is larger, whereas in a range where the target intake air amount Gcyl_cmd is larger than the predetermined value Gcyl_cmd1, the boost pressure basic value Usl_vt_bs is set to a smaller value as the target intake air amount Gcyl_cmd is larger.

The boost pressure basic value Usl_vt_bs is thus set: in the low-load region of the engine 3, so as to control the boost pressure to a small value with a view to avoiding occurrence of variation in the torque of the engine 3 due to unnecessary rise in the boost pressure; in the high-load region of the engine 3, so as to control the boost pressure to a small value with a view to avoiding the output of the engine 3 from becoming too large due to an excessive rise in the boost pressure; and in the medium-load region of the engine 3, so as to control the boost pressure to a large value with a view to ensuring the output of the engine 3.

Furthermore, the aforementioned addition element 207 calculates the final boost pressure control input Usl_vt_f by an equation (52) in FIG. 38, using the boost pressure control input Usl_vt and the boost pressure basic value Usl_vt_bs, calculated as above.

As described above, according to the control system 1B of the present embodiment, since the EGR control input Usl_eg and the boost pressure control input Usl_vt are calculated with the target value filter-type two-degree-of-freedom sliding mode control algorithms, it is possible to set the follow-up responsiveness of the intake air amount Gcyl to the target intake air amount Gcyl_cmd, and the converging behavior and convergence rate, separately from each other. This makes it possible to ensure excellent follow-up responsiveness of the intake air amount Gcyl to the target intake air amount Gcyl_cmd, and at the same time cause the intake air amount Gcyl to converge to the target intake air amount Gcyl_cmd without causing overshooting or oscillating behavior, thereby making it possible to stabilize the converging behavior of the intake air amount Gcyl to the target intake air amount Gcyl_cmd.

Moreover, since the EGR control input Usl_eg and the boost pressure control input Usl_vt are calculated with the target value filter-type two-degree-of-freedom sliding mode control algorithms while sharing one filtering value Gcyl_cmd_f therebetween, it is possible to avoid the EGR control process and the boost pressure control process from interfering with each other in the intake air amount control. In addition, since the EGR control input Usl_eg and the boost pressure control input Usl_vt are calculated by sharing one switching function σgcyl, it is possible to more effectively avoid the EGR control process and the boost pressure control process from interfering with each other.

Further, the target value filter 221 sets, within the range of ADGCYL1≦ADGCYL≦ADGCYL 2, the target value filter-setting parameter POLE_f* to a larger value (value closer to a value of 0) as the difference absolute value ADGCYL is larger, whereby the degree of reflection of the target intake air amount Gcyl_cmd in the filtering value Gcyl_cmd_f is increased, so that when the difference absolute value ADGCYL is large, and hence the degree of change in the intake air amount Gcyl is large, the follow-up respon-siveness of the intake air amount Gcyl to the target intake air amount Gcyl_cmd can be further enhanced accordingly.

Furthermore, in the calculation of the EGR control input Usl_eg, since the adaptive law input Uadp_eg is calculated through the forgetting integration process of the switching function σgcyl, in the EGR control, the EGR amount is prevented from being held at an unsuitable value, whereby it is possible to ensure an excellent combustion state of the engine 3.

Further, the four gains Krch_eg, Kadp_eg, Krch_vt, and Kadp_vt are set by the cooperative gain scheduler 203, whereby when the degree of deviation of the intake air amount Gcyl from the target intake air amount Gcyl_cmd is small, it is possible to increase the degree of contribution of the EGR control to the intake air amount control and at the same time decrease the degree of contribution of the boost pressure control to the intake air amount control. This makes it possible to enhance the resolution and control accuracy of the intake air amount control. Inversely, when the degree of deviation of the intake air amount Gcyl from the target intake air amount Gcyl_cmd is large, to enhance the response of the intake air amount control, it is possible to increase the degree of contribution of the boost pressure control to the intake air amount control and at the same time decrease the degree of contribution of the EGR control to the intake air amount control. This makes it possible to enhance the response of the intake air amount control. As is apparent from the above description, it is possible to improve both of the stability and the accuracy of the intake air amount control.

Although the above-described embodiments are examples which employ the sliding mode control algorithms as response-specifying control algorithms, the response-specifying control algorithms are not necessarily limited to these, but they can be any suitable response-specifying control algorithms, such as back-stepping control algorithms, which are capable of specifying the converging behavior and convergence rate of the output of a controlled object to a target value.

Further, although the above-described embodiments are examples which employ the sliding mode control algorithms as feedback control algorithms, the feedback control algorithms are not necessarily limited to these, but they can be any suitable feedback control algorithms, such as PID control algorithms and PI control algorithms.

Further, although the above-described embodiments are example in which the control system of the present invention is applied to an combustion engine which performs the idle engine speed control or the intake air amount control, this is not limitative, but the control system of the present invention can be applied to an combustion engine which controls the output of a controlled object by a plurality of control inputs.

INDUSTRIAL APPLICABILITY

The control system according to the present invention can be applied to feedback control of the output of a controlled object by a plurality of control inputs, such as idle engine speed control or intake air amount control, to thereby cause the output of the controlled object to a target value without causing overshooting or oscillating behavior to stabilize the converging behavior of the output of the controlled object to the target value, and at the same time avoid a plurality of feedback control processes by the control inputs from interfering with each other. Therefore, the control system according to the invention can improve both the stability and accuracy of the control, and therefore is useful as a control system for the above-mentioned type of control, which is used in various industrial fields.

The invention claimed is:

1. A control system for controlling an output of a controlled object by a plurality of control inputs, comprising:
   target value-calculating means for calculating a target value as a target of the output of the controlled object, according to a state of the controlled object;
   filtering target value-calculating means for calculating one filtering target value for setting follow-up responsiveness of the output of the controlled object to the target value, by performing a predetermined filtering process on the calculated target value; and
   control input-calculating means for calculating the control inputs with a plurality of predetermined feedback control algorithms, respectively, in a manner such that the output of the controlled object converges to the calculated one filtering target value.

2. A control system as claimed in claim 1, wherein said filtering target value-calculating means calculates the one filtering target value in a manner such that the follow-up responsiveness of the output of the controlled object to the target value becomes higher as a degree of change in the target value is larger.

3. A control system as claimed in claim 1, wherein the predetermined feedback control algorithms are formed by a plurality of predetermined response-specifying control algorithms, respectively, and
   wherein said control input-calculating means calculates the control inputs while sharing one linear function defining a converging behavior and a convergence rate of the output of the controlled object to the one filtering target value between the predetermined response-specifying control algorithms.

4. A control system as claimed in claim 1, wherein the output of the controlled object is rotational speed of an internal combustion engine, and
   wherein the control inputs comprise a control input for controlling an intake air amount of the engine, and a control input for controlling ignition timing of the engine.

5. A control system as claimed claim 1, wherein the output of the controlled object is an intake air amount of an internal combustion engine, and
   wherein the control inputs comprise a control input for controlling boost pressure of the engine, and a control input for controlling an EGR amount of the engine.

6. A control system as claimed in claim 3, wherein said control input-calculating means sets respective gains to be used in calculating the control inputs according to a value of the one linear function.

7. A control system as claimed in claim 3, wherein said control input-calculating means calculates at least one of the control inputs according to an integral value of the one linear function, while performing a forgetting process on the integral value of the one linear function.

8. A control system as claimed in claim 3, further comprising disturbance estimation value-calculating means for calculating a plurality of disturbance estimation values for compensating for disturbance and modeling errors adversely affecting the controlled object, with respective predetermined estimation algorithms based on a model defining relationships between each of the disturbance estimation values, each of the control inputs, and the output of the controlled object, and
   wherein the predetermined estimation algorithms set respective estimation gains of the disturbance estimation values according to the value of the one linear function, and
   wherein said control input-calculating means calculates the control inputs according to the respective disturbance estimation values.

9. A control system as claimed in claim 3, further comprising disturbance estimation value-calculating means for calculating a plurality of disturbance estimation values for compensating for disturbance and modeling errors adversely affecting the controlled object, with respective predetermined estimation algorithms based on a model defining relationships between each of the disturbance estimation values, each of the control inputs, and the output of the controlled object, and
   wherein the predetermined estimation algorithms perform a predetermined forgetting process on at least one of the disturbance estimation values, and
   wherein said control input-calculating means calculates the control inputs according to the respective disturbance estimation values.

10. A control system for controlling an output of a controlled object by a plurality of control inputs, comprising:
    target value-calculating means for calculating a target value as a target of the output of the controlled object, according to a state of the controlled object; and
    control input-calculating means for calculating the control inputs with a plurality of predetermined response-specifying control algorithms, respectively, while sharing one linear function defining a converging behavior and a convergence rate of the output of the controlled object to the one filtering target value between the predetermined response-specifying control algorithms, in a manner such that the output of the controlled object converges to the calculated target value.

11. A control system as claimed in claim 10, wherein said control input-calculating means sets respective gains to be used in calculating the control inputs, according to a value of the one linear function.

12. A control system as claimed in claim 10, wherein said control input-calculating means calculates at least one of the control inputs according to an integral value of the one linear function, while performing a forgetting process on the integral value of the one linear function.

13. A control system as claimed in claim 10, further comprising disturbance estimation value-calculating means for calculating a plurality of disturbance estimation values for compensating for disturbance and modeling errors adversely affecting the controlled object, with respective predetermined estimation algorithms based on a model defining relationships between each of the disturbance estimation values, each of the control inputs, and the output of the controlled object, and
    wherein the predetermined estimation algorithms set respective estimation gains of the disturbance estimation values according to the value of the one linear function, and
    wherein said control input-calculating means calculates the control inputs according to the respective disturbance estimation values.

14. A control system as claimed in claim 10, further comprising disturbance estimation value-calculating means for calculating a plurality of disturbance estimation values for compensating for disturbance and modeling errors adversely affecting the controlled object, with respective predetermined estimation algorithms based on a model defining relationships between each of the disturbance estimation values, each of the control inputs, and the output of the controlled object, and wherein the predetermined estimation algorithms perform a predetermined forgetting process on at least one of the disturbance estimation values, and wherein said control input-calculating means calculates the control inputs according to the respective disturbance estimation values.

15. A control system as claimed in claim 10, wherein the output of the controlled object is rotational speed of an internal combustion engine, and wherein the control inputs comprise a control input for controlling an intake air amount of the engine, and a control input for controlling ignition timing of the engine.

16. A control system as claimed claim 10, wherein the output of the controlled object is an intake air amount of an internal combustion engine, and wherein the control inputs comprise a control input for controlling boost pressure of the engine, and a control input for controlling an EGR amount of the engine.

* * * * *